US011479499B2

(12) United States Patent
Aitken et al.

(10) Patent No.: US 11,479,499 B2
(45) Date of Patent: Oct. 25, 2022

(54) CALCIUM-CONTAINING HIGH-INDEX PHOSPHATE GLASSES

(71) Applicant: CORNING INCORPORATED, Corning, NY (US)

(72) Inventors: Bruce Gardiner Aitken, Corning, NY (US); Jian Luo, Painted Post, NY (US); Lina Ma, Corning, NY (US); Alexander I Priven, Chungchongnam-do (KR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/576,078

(22) Filed: Jan. 14, 2022

(65) Prior Publication Data

US 2022/0234941 A1    Jul. 28, 2022

Related U.S. Application Data

(60) Provisional application No. 63/140,414, filed on Jan. 22, 2021.

(51) Int. Cl.
*C03C 3/21* (2006.01)

(52) U.S. Cl.
CPC ..................... *C03C 3/21* (2013.01)

(58) Field of Classification Search
CPC ....................................................... C03C 3/21
See application file for complete search history.

(56) References Cited

U.S. PATENT DOCUMENTS

| | | |
|---|---|---|
| 3,490,928 A | 1/1970 | Brewster et al. |
| 3,836,375 A | 9/1974 | Broemer et al. |
| 4,115,131 A | 9/1978 | Ishibashi et al. |
| 4,261,751 A | 4/1981 | Nakamura |
| 4,342,943 A | 8/1982 | Weaver |
| 6,333,282 B1 | 12/2001 | Nakahata et al. |
| 6,743,743 B2 | 6/2004 | Sato |
| 6,786,064 B2 | 9/2004 | Hayashi et al. |
| 6,875,714 B2 | 4/2005 | Izuki |
| 7,060,640 B2 | 6/2006 | Ogino et al. |
| 7,140,205 B2 | 11/2006 | Fujiwara et al. |
| 7,312,169 B2 | 12/2007 | Yamamoto et al. |
| 7,451,620 B2 | 11/2008 | Zou et al. |
| 7,531,474 B2 | 5/2009 | Shiraishi |
| 7,553,785 B2 | 6/2009 | Ritter et al. |
| 7,603,876 B2 | 10/2009 | Shiraishi |
| 7,638,448 B2 | 12/2009 | Wolff et al. |
| 7,767,605 B2 | 8/2010 | Ogino et al. |
| 8,207,074 B2 | 6/2012 | Kitaoka |
| 8,389,428 B2 | 3/2013 | Wada et al. |
| 8,486,536 B2 | 7/2013 | Zou et al. |
| 8,647,994 B2 | 2/2014 | Fujiwara |
| 8,716,157 B2 | 5/2014 | Fujiwara et al. |
| 8,945,713 B2 | 2/2015 | Satou et al. |
| 9,550,698 B2 | 1/2017 | Fujiwara |
| 9,828,280 B2 | 11/2017 | Mikami et al. |
| 9,834,465 B2 | 12/2017 | Mikami |
| 2003/0216242 A1* | 11/2003 | Arbab ..................... C03C 3/087 501/71 |
| 2005/0049132 A1* | 3/2005 | Shiraishi ................. C03C 4/02 501/901 |
| 2005/0164862 A1* | 7/2005 | Shiraishi ................. C03C 3/21 501/45 |
| 2010/0206687 A1* | 8/2010 | Saito ....................... F16C 3/02 198/780 |
| 2010/0221727 A1* | 9/2010 | Hainfeld .............. C12Q 1/6827 435/7.1 |
| 2015/0344352 A1* | 12/2015 | Yang ...................... C03C 3/118 501/35 |
| 2018/0099487 A1* | 4/2018 | Koh ....................... C03C 3/093 |
| 2018/0319700 A1* | 11/2018 | Ding ...................... C03C 3/091 |
| 2019/0177212 A1* | 6/2019 | Dejneka ............... C03C 21/001 |
| 2020/0022616 A1* | 1/2020 | Bier ..................... G01R 33/483 |
| 2021/0025984 A1* | 1/2021 | Schultz .................. C03C 3/091 |
| 2021/0221727 A1* | 7/2021 | Verlaak .................. C03B 19/08 |

FOREIGN PATENT DOCUMENTS

| | | | |
|---|---|---|---|
| CN | 102159512 A | * 8/2011 | ............. C03B 11/00 |
| CN | 102515527 A | 6/2012 | |
| CN | 107614449 A | 1/2018 | |

(Continued)

OTHER PUBLICATIONS

Cardinal et al., "Non linear optical properties of some niobium (V) oxide glasses", Eur.J.Solid State Inorg.Chem., 1996, vol. 33, No. 7, pp. 597-605.

Cardinal T, et al., "Correlations between structural properties of Nb2Os—-NaPO3—Na2B407 glasses and non-linear optical activities", J.Non-Cryst.Solids, 1997, vol. 222, pp. 228-234.

Farley et al., "Elastic properties of semiconductiong phosphate glasses", Phys.Status Solidi A, 1975, vol. 28, No. 1, pp. 199-203.

Malakho et al., "Crystallization and second harmonic generation in thermally poled niobium borophosphate glasses", J.Solid State Chem., 2005, vol. 178, No. 6, pp. 1888-1897.

Rachkovskaya et al., "Semiconducting niobate-phosphate glasses. Structure and properties", J.Non-Cryst.Solids, 1987, vol. 90, No. 1-3, pp. 617-620.

Teixeira et al., "Structure, thermal behavior, chemical durability, and optical properties of the Na2O—Al2O3—TiO2—Nb2O5—P2O5 glass system", J.Am.Ceram Soc , 2007, vol. 90, No. 1, pp. 256-263.

(Continued)

*Primary Examiner* — Elizabeth A. Bolden

(74) *Attorney, Agent, or Firm* — Kevin L. Bray

(57) ABSTRACT

Glass compositions include phosphorus oxide ($P_2O_5$), niobia ($Nb_2O_5$), titania ($TiO_2$), potassium oxide ($K_2O$) and calcium oxide (CaO) as essential components and may optionally include barium oxide (BaO), sodium oxide ($Na_2O$), lithium oxide ($Li_2O$), tungsten oxide ($WO_3$), bismuth oxide ($Bi_2O_3$), tantalum oxide ($Ta_2O_5$), silica ($SiO_2$) and other components. The glasses may be characterized by high refractive index at 587.56 nm at comparably low density at room temperature.

20 Claims, 9 Drawing Sheets

(56) References Cited

FOREIGN PATENT DOCUMENTS

| | | | |
|---|---|---|---|
| CN | 110770183 A | 2/2020 | |
| DE | 2719250 C3 | 2/1980 | |
| JP | 2003-160355 A | 6/2003 | |
| JP | 2003-165743 A | 6/2003 | |
| JP | 2003-238197 A | 8/2003 | |
| JP | 2003-300751 A | 10/2003 | |
| JP | 2003-335549 A | 11/2003 | |
| JP | 2005-008518 A | 1/2005 | |
| JP | 2006-111499 A | 4/2006 | |
| JP | 2007-015904 A | 1/2007 | |
| JP | 2009-263191 A | 11/2009 | |
| JP | 2010-006675 A | 1/2010 | |
| JP | 2010-083701 A | 4/2010 | |
| JP | 2011-057509 A | 3/2011 | |
| JP | 2011057509 A * | 3/2011 | |
| JP | 2011144064 A * | 7/2011 | ........... A47B 3/0803 |
| JP | 2011-219278 A | 11/2011 | |
| JP | 2012-017261 A | 1/2012 | |
| TW | 201210975 A | 3/2012 | |
| TW | 201500318 A | 1/2015 | |
| TW | 201524930 A | 7/2015 | |
| WO | 2010/074109 A1 | 7/2010 | |
| WO | 2010/126141 A1 | 11/2010 | |
| WO | 2011/086855 A1 | 7/2011 | |
| WO | 2015/087718 A1 | 6/2015 | |
| WO | 2019/151321 A1 | 8/2019 | |
| WO | 2019/151404 A1 | 8/2019 | |
| WO | 2020/117651 A1 | 6/2020 | |

OTHER PUBLICATIONS

International Search Report and Written Opinion of the International Searching Authority; PCT/US2022/011408 dated Apr. 12, 2022, 10 pages; European Patent Office.

* cited by examiner

CALCIUM-CONTAINING HIGH-INDEX PHOSPHATE GLASSES

This application claims the benefit of priority under 35 U.S.C. § 119 of U.S. Provisional Application Ser. No. 63/140,414 filed on Jan. 22, 2021, the content of which is relied upon and incorporated herein by reference in its entirety.

FIELD

The present disclosure generally relates to phosphate glasses having a high refractive index and low density. Also, it relates to glasses with high optical dispersion.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glass-forming ability of the material. For example, crystallization and/or liquid-liquid phase separation can occur during cooling of the glass melt at cooling rates that are generally acceptable in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density, however, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic. Furthermore, phosphate glasses exhibiting a high refractive index also tend to have an increase in optical dispersion, which may be usable for some applications.

In view of these considerations, there is a need for phosphate glasses having a high refractive index and low density, optionally in combination with a high transmittance in the visible and near UV-range, and/or which are made from compositions that provide good glass-forming ability.

SUMMARY

According to an embodiment of the present disclosure, a glass comprising a plurality of components is disclosed, the glass has a composition of the components comprising greater than or equal to 10.0 mol. % and less than or equal to 40.0 mol. % $P_2O_5$, greater than or equal to 0.5 mol. % and less than or equal to 50.0 mol. % $TiO_2$, greater than or equal to 0.5 mol. % and less than or equal to 35.0 mol. % $K_2O$, greater than or equal to 0.5 mol. % and less than or equal to 35.0 mol. % CaO, greater than or equal to 0.0 mol. % and less than or equal to 50.0 mol. % $Nb_2O_5$, greater than or equal to 0.0 mol. % and less than or equal to 15.0 mol. % MgO, greater than or equal to 0.0 mol. % and less than or equal to 10.0 mol. % $Al_2O_3$, greater than or equal to 0.0 mol. % and less than or equal to 4.5 mol. % $Li_2O$, greater than or equal to 0.0 mol. % and less than or equal to 1.0 mol. % $V_2O_5$, greater than or equal to 4.0 mol. % RO, greater than or equal to 0.0 mol. % and less than or equal to 20.0 mol. % for a sum of $TeO_2+SnO_2+SnO$, greater than or equal to 0.0 mol. % and less than or equal to 15.0 mol. % for a sum of $SiO_2+GeO_2$ and may optionally contain one or more components selected from $Na_2O$, $WO_3$, $Bi_2O_3$, $B_2O_3$, BaO, SrO, ZnO, PbO, $ZrO_2$, $Tl_2O$, $Ag_2O$, $Cs_2O$, $Ga_2O_3$, $La_2O_3$, $MoO_3$ and $Ta_2O_5$, the glass satisfying the condition: $P_n-(1.54+0.1*P_d)>0.00$, where $P_n$ is a refractive index parameter calculated from the glass composition in terms of mol. % of the components according to the Formula (I):

$$P_n = -0.0043794*P_2O_5 + 0.0072428*Nb_2O_5 + 0.0037304*TiO_2 - 0.00039553*BaO - 0.0032012*K_2O - 0.00060689*CaO - 0.0024218*Na_2O - 0.0014988*Li_2O + 0.0028587*WO_3 + 0.0083295*Bi_2O_3 - 0.0031637*B_2O_3 - 0.0030702*SiO_2 - 0.00030248*ZnO + 0.0020025*ZrO_2 - 0.0018173*MgO - 0.0032886*Al_2O_3 + 0.0024221*TeO_2 + 0.0038137*PbO - 0.0016392*GeO_2 + 0.0063024*Tl_2O + 0.0048765*Ag_2O + 1.81451, \quad (I)$$

$P_d$ is a density parameter, calculated from the glass composition in terms of mol. % of the components according to the Formula (II):

$$P_d [g/cm^3] = 3.98457 - 0.015773*Al_2O_3 - 0.014501*B_2O_3 + 0.019328*BaO + 0.060758*Bi_2O_3 - 0.0012685*CaO + 0.023111*CdO + 0.0053184*Cs_2O + 0.011488*Ga_2O_3 - 0.0015416*GeO_2 - 0.013342*K_2O + 0.058319*La_2O_3 - 0.007918*Li_2O - 0.0021423*MgO - 0.0024413*MoO_3 - 0.0082226*Na_2O + 0.0084961*Nb_2O_5 - 0.020501*P_2O_5 + 0.038898*PbO - 0.012720*SiO_2 + 0.013948*SrO + 0.047924*Ta_2O_5 + 0.011248*TeO_2 - 0.0092491*V_2O_5 + 0.028913*WO_3 + 0.0074702*ZnO + 0.0096721*ZrO_2, \quad (II)$$

where RO is a total sum of divalent metal oxides and a symbol "*" means multiplication.

According to another embodiment of the present disclosure, a glass comprising a plurality of components is disclosed, the glass has a composition of the components comprising greater than or equal to 10.0 mol. % and less than or equal to 40.0 mol. % $P_2O_5$, greater than or equal to 1.0 mol. % and less than or equal to 50.0 mol. % $TiO_2$, greater than or equal to 1.0 mol. % and less than or equal to 35.0 mol. % $K_2O$, greater than or equal to 1.0 mol. % and less than or equal to 35.0 mol. % CaO, greater than or equal to 0.0 mol. % and less than or equal to 50.0 mol. % $Nb_2O_5$, greater than or equal to 0.0 mol. % and less than or equal to 15.0 mol. % MgO, greater than or equal to 0.0 mol. % and less than or equal to 10.0 mol. % $Al_2O_3$, greater than or equal to 0.0 mol. % and less than or equal to 1.0 mol. % $V_2O_5$, greater than or equal to 4.0 mol. % RO, greater than or equal to 0.0 mol. % and less than or equal to 20.0 mol. % for a sum of $TeO_2+SnO_2+SnO$, greater than or equal to 0.0 mol. % and less than or equal to 15.0 mol. % for a sum of $SiO_2+GeO_2$ and may optionally contain one or more components selected from $Na_2O$, $Li_2O$, $WO_3$, $Bi_2O_3$, $B_2O_3$, BaO, SrO, ZnO, PbO, $ZrO_2$, $Tl_2O$, $Ag_2O$, $Ga_2O_3$, $MoO_3$ and $Ta_2O_5$, the glass satisfying the conditions: $P_n > 1.75$ and $P_v - (64.5 - 23.4*P_n) < 0.00$, where $P_n$ is a refractive index parameter calculated from the glass composition in terms of mol. % of the components according to the Formula (I):

$$P_n = -0.0043794*P_2O_5 + 0.0072428*Nb_2O_5 + 0.0037304*TiO_2 - 0.00039553*BaO - 0.0032012*K_2O - 0.00060689*CaO - 0.0024218*Na_2O - 0.0014988*Li_2 + 0.0028587*WO_3 + 0.0083295*Bi_2O_3 - 0.0031637*B_2O_3 - 0.0030702*SiO_2 - 0.00030248*ZnO + 0.0020025*ZrO_2 - 0.0018173*MgO - 0.0032886*Al_2O_3 + 0.0024221*TeO_2 + 0.0038137*PbO - 0.0016392*GeO_2 + 0.0063024*Tl_2O + 0.0048765*Ag_2O + 1.81451,$$ (I)

$P_v$ is a dispersion parameter, calculated from the glass composition in terms of mol. % of the components according to the Formula (III):

$$P_v = \exp(2.11 + 0.0438*(\exp(3.25980 + 0.0072248*Al_2O_3 + 0.0055494*B_2O_3 + 0.0024164*BaO - 0.00849*Bi_2O_3 + 0.0029812*CaO + 0.0092768*CdO + 0.0099821*Ga_2O_3 - 0.0038579*GeO_2 + 0.0028062*K_2O + 0.0031951*Li_2O + 0.0027011*MgO + 0.007976*MoO_3 + 0.0028705*Na_2O - 0.013374*Nb_2O_5 + 0.0072007*P_2O_5 - 0.0049796*PbO + 0.0032241*SiO_2 + 0.0050024*SrO - 0.002136*Ta_2O_5 - 0.0032329*TeO_2 - 0.009788*TiO_2 + 0.0074782*V_2O_5 - 0.0057095*WO_3 + 0.0032826*ZnO + 0.009302*ZrO_2))),$$ (III)

where RO is a total sum of divalent metal oxides and a symbol "*" means multiplication.

These and other aspects, objects, and features of the present disclosure will be understood and appreciated by those skilled in the art upon studying the following specification, claims, and appended drawings.

DETAILED DESCRIPTION

Figure 1:
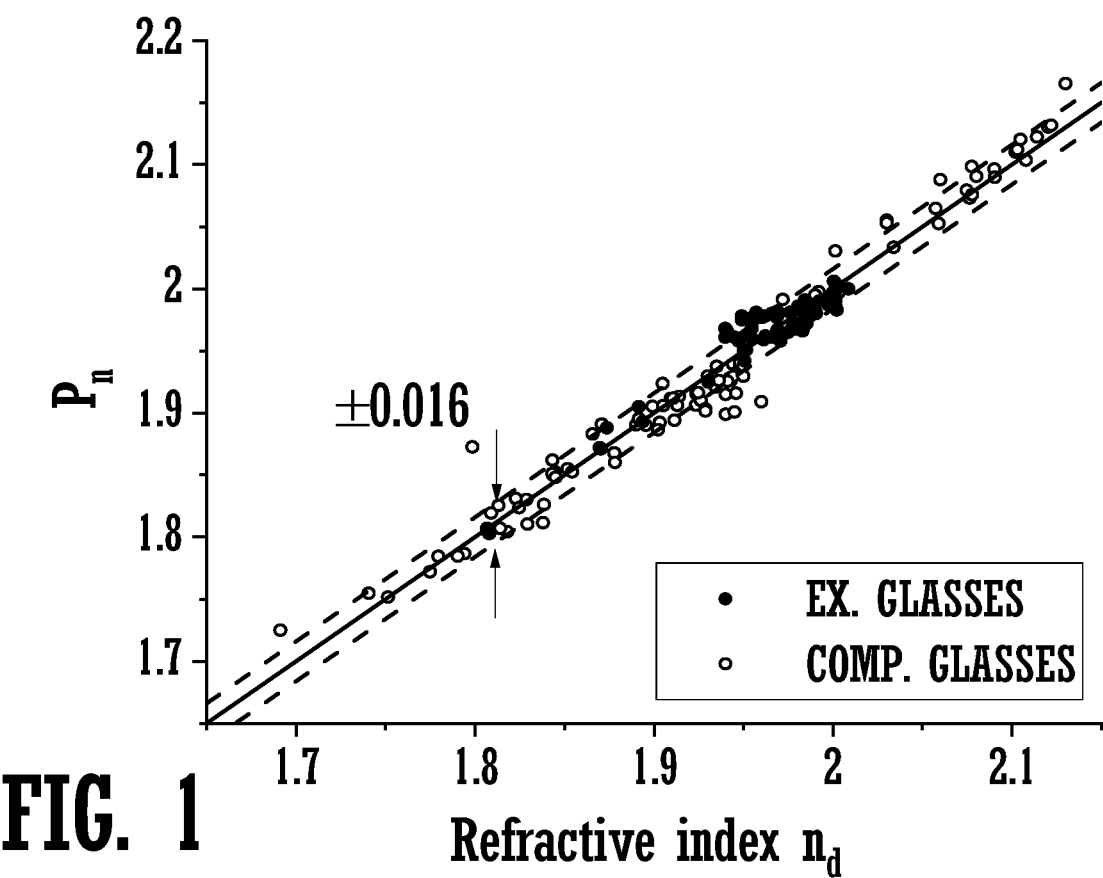
FIG. 1 is a plot illustrating the relationship between the refractive index $n_d$ and the refractive index parameter $P_n$ calculated by formula (I) for some Comparative Glasses and some Exemplary Glasses according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including, without limitation, matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol %.

As used herein, the term "tramp", when used to describe a particular constituent component in a glass composition, refers to a constituent component that is not intentionally added to the glass composition and is present in an amount of less than 0.05 mol %. Tramp components may be unintentionally added to the glass composition as an impurity in another constituent component and/or through migration of the tramp component into the composition during processing of the glass composition.

The term "glass former" is used herein to refer to a component that, being solely present in the glass composition (i.e., without other components, except for tramps), is able to form a glass when cooling the melt at a rate of not greater than about 200° C./min to about 300° C./min.

The term "modifier", as used herein, refers to the oxides of monovalent or divalent metals, i.e., $R_2O$ or $RO$, where "R" stands for a cation. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting glass composition is recalculated assuming that two moles of $CeO_2$ is equivalent to one mole of $Ce_2O_3$, and the resulting glass composition is presented in terms of $Ce_2O_3$. As used herein, the term "$RE_mO_n$" is used to refer to the total content of rare earth metal oxides in all redox states present, and the term "$RE_2O_3$" is used to refer to the total content of rare earth metal oxides in the "+3" redox state.

The measured density values for the glasses reported herein were measured at room temperature in units of $g/cm^3$ by Archimedes method in water with an error of 0.001 $g/cm^3$. As used herein, density measurements at room temperature (specified as $d_{RT}$ and expressed herein in units of $g/cm^3$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the error of 0.001 $g/cm^3$, and thus is not expected to impact the room temperature density measurements reported herein.

As used herein, the term "refraction" refers to the relationship of the refractive index to the density according to the ratio: $(n_d-1)/d_{RT}$, where the refractive index $n_d$ is measured at 587.56 nm and the density $d_{RT}$ is measured in $g/cm^3$ at 25° C. The ratio $(n_d-1)/d_{RT}$, or refraction, may characterize the relationship between the refractive index $n_d$ and the density $d_{RT}$. The higher the refraction value, the higher the refractive index is at a given density.

As used herein, good glass-forming ability refers to a resistance of the melt to devitrification as the material cools. Glass-forming ability can be measured by determining the critical cooling rate of the melt. The terms "critical cooling rate" or "$v_{cr}$" are used herein to refer to the minimum cooling rate at which a melt of a given composition forms a glass free of crystals visible under an optical microscope under magnification from 100× to 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" (denoted "$T_{liq}$") is used herein to refer to a temperature above which the glass composition is completely liquid with no crystallization of constituent components of the glass. The liquidus temperature values reported herein were obtained by measuring samples using one of the following three tests: (1) DSC (differential scanning calorimetry), (2) isothermal hold of samples wrapped in platinum foil, or (3) gradient boat liquidus method. The tests were crosschecked and similar results were obtained for each of the tests. For samples measured using DSC, powdered samples were heated at 10 K/min to 1250° C. The end of the endothermal event corresponding to the melting of crystals was taken as the liquidus temperature. For samples measured using the isothermal hold method, a glass block (about 1 cm$^3$) was wrapped in platinum foil, to avoid volatilization, placed in a furnace at a given temperature for 17 hours, then quickly removed from the furnace and cooled in air. The glass block was then observed under an optical microscope to check for crystals in the bulk of the sample. Sparse surface crystals were ignored if they appeared after holding at the temperature that did not exceed the observed liquidus temperature as described above for more than 30-40° C.; otherwise, the test was repeated. For samples measured using the gradient boat liquidus method, the procedure described in the standard ASTM C829-81 was followed. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), to observe slower growing phases. The liquidus viscosity in poises was determined from the liquidus temperature and the coefficients of the Fulcher equation.

The refractive index values reported herein were measured at room temperature (about 25° C.), unless otherwise specified. The refractive index values for a glass sample were measured using a Metricon Model 2010 prism coupler refractometer with an error of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" is used herein to refer to a refractive index calculated as described above at a wavelength of 587.56 nm, which corresponds to the helium d-line wavelength. The term "refractive index $n_C$" is used herein to refer to a refractive index calculated as described above at a wavelength of 656.3 nm. The term "refractive index $n_F$" is used herein to refer to a refractive index calculated as described above at a wavelength of 486.1 nm. The term "refractive index $n_g$" is used herein to refer to a refractive index calculated as described above at a wavelength of 435.8 nm.

As used herein, the terms "high refractive index" or "high index" refers to a refractive index value $n_d$ of a glass that is greater than or equal to at least 1.80, unless otherwise indicated. Where indicated, the terms "high refractive index" or "high index" refer to a refractive index value of a glass that is greater than or equal to at least 1.85, or greater than or equal to 1.90, or greater than or equal to 1.95, or greater than or equal to 2.00.

The terms "dispersion" and "optical dispersion" are used interchangeably to refer to a difference or ratio of the refractive indices of a glass sample at predetermined wavelengths. One numerical measure of optical dispersion reported herein is the Abbe number, which can be calculated by the formula: $v_?=(n_x-1)/(n_F-n_C)$, where "x" in the present disclosure stands for one of the commonly used wavelengths (for example, 587.56 nm [d-line] for $v_d$ or 589.3 nm [D-line] for $v_D$), $n_x$ is the refractive index at this wavelength (for example, $n_d$ for $v_d$ and $n_D$ for $v_D$), and $n_F$ and $n_C$ are refractive indices at the wavelengths 486.1 nm (F-line) and 656.3 nm (C-line), respectively. The numerical values of $v_d$ and $v_D$ differ very slightly, mostly within ±0.1% to ±0.2%. As reported herein, the dispersion of a glass sample is represented by the Abbe number ($v_d$), which characterizes the relationship between the refractive indices of the sample at three different wavelengths according to the following formula: $v_d=(n_d-1)/(n_F-n_C)$, where $n_d$ is the calculated refractive index at 587.56 nm (d-line), $n_F$ is the calculated refractive index at 486.1 nm (F-line), and $n_C$ is the calculated refractive index at 656.3 nm (C-line). A higher Abbe number corresponds to a lower optical dispersion.

The numerical value for an Abbe number corresponding to "high dispersion" or "low dispersion" may vary depending on the refractive indices for which the Abbe number is calculated. In some cases, an Abbe number corresponding to "low dispersion" for a high refractive index glass may be lower than an Abbe number corresponding to "low dispersion" for a low refractive index glass. In other words, as the calculated refractive index value increases, the value of the Abbe number corresponding to low dispersion decreases. The same relates to "high dispersion" as well.

The term "α," or "$α_{20-300}$," as used herein, refers to the coefficient of linear thermal expansion (CTE) of the glass composition over a temperature range from 20° C. (room temperature, or RT) to 300° C. This property is measured by using a horizontal dilatometer (push-rod dilatometer) in accordance with ASTM E228-11. The numeric measure of α is linear average value in a specified temperature range (e.g., RT to 300° C.) expressed as $α=ΔL/(L_0ΔT)$, where $L_0$ is the linear size of a sample at some temperature within or near the measured range, and L is the change in the linear size (ΔL) in the measured temperature range ΔT.

The Young's elastic modulus E and the Poisson's ratio μ are measured by using Resonant Ultrasound Spectroscopy, using a Quasar RUSpec 4000 available from ITW Indiana Private Limited, Magnaflux Division.

The glass transition temperature ($T_g$) is measured by differential scanning calorimeter (DSC) at the heating rate of 10 K/min after cooling in air.

The term "annealing point," as used herein, refers to the temperature determined according to ASTM C598-93 (2013), at which the viscosity of a glass of a given glass composition is approximately $10^{13.2}$ poise.

The symbol "*" means multiplication when used in any formula herein.

Glass composition may include phosphorus oxide ($P_2O_5$). The glass compositions in the embodiments described herein comprise phosphorus oxide ($P_2O_5$) as a main glass former. Greater amounts of $P_2O_5$ increase the melt viscosity at a given temperature, which inhibits crystallization from the melt when cooling and, therefore, improves the glass-forming ability of the melt (i.e. lowers the critical cooling rate of the melt). However, P$_2$O$_5$, being added to a glass composition, significantly decreases the refractive index, which makes it more difficult to reach high index. Accordingly, the content of P$_2$O$_5$ in high-index glasses is limited. In embodiments, the glass may contain phosphorus oxide (P$_2$O$_5$) in an amount from greater than or equal to 10.0 mol. % to less than or equal to 40.0 mol. % and all ranges and sub-ranges between the foregoing values. In some embodiments, the glass composition may contain P$_2$O$_5$ in an amount greater than or equal to 10.0 mol. %, greater than or equal to 11.0 mol. %, greater than or equal to 12.0 mol. %, greater than or equal to 13.0 mol. %, greater than or equal to 15.0 mol. %, greater than or equal to 20.0 mol. %, greater than or equal to 21.0 mol. %, greater than or equal to 21.7 mol. %, greater than or equal to 22.0 mol. %, greater than or equal to 23.9 mol. %, greater than or equal to 25.0 mol. %, greater than or equal to 30.0 mol. %, greater than or equal to 35.0 mol. %, greater than or equal to 37.0 mol. %, greater than or equal to 38.0 mol. %, or greater than or equal to 39.0 mol. %. In some other embodiments, the glass composition may contain P$_2$O$_5$ in an amount less than or equal to 40.0 mol. %, less than or equal to 39.0 mol. %, less than or equal to 38.0 mol. %, less than or equal to 37.0 mol. %, less than or equal to 35.0 mol. %, less than or equal to 30.0 mol. %, less than or equal to 29.0 mol. %, less than or equal to 25.0 mol. %, less than or equal to 24.7 mol. %, less than or equal to 20.0 mol. %, less than or equal to 15.0 mol. %, less than or equal to 13.0 mol. %, less than or equal to 12.0 mol. %, or less than or equal to 11.0 mol. %. In some more embodiments, the glass composition may contain P$_2$O$_5$ in an amount greater than or equal to 10.0 mol. % and less than or equal to 40.0 mol. %, greater than or equal to 15.0 mol. % and less than or equal to 35.0 mol. %, greater than or equal to 21.0 mol. % and less than or equal to 30.0 mol. %, greater than or equal to 21.7 mol. % and less than or equal to 24.7 mol. %, greater than or equal to 22.0 mol. % and less than or equal to 29.0 mol. %, greater than or equal to 23.91 mol. % and less than or equal to 25.0 mol. %, greater than or equal to 10.0 mol. % and less than or equal to 35.0 mol. %, greater than or equal to 11.0 mol. % and less than or equal to 24.7 mol. %, greater than or equal to 11.0 mol. % and less than or equal to 12.0 mol. %, greater than or equal to 12.0 mol. % and less than or equal to 24.7 mol. %, greater than or equal to 13.0 mol. % and less than or equal to 37.0 mol. %, greater than or equal to 13.0 mol. % and less than or equal to 29.0 mol. %, greater than or equal to 13.0 mol. % and less than or equal to 20.0 mol. %, greater than or equal to 15.0 mol. % and less than or equal to 37.0 mol. %, greater than or equal to 15.0 mol. % and less than or equal to 29.0 mol. %, greater than or equal to 20.0 mol. % and less than or equal to 29.0 mol. %, greater than or equal to 24.7 mol. % and less than or equal to 40.0 mol. %, greater than or equal to 24.7 mol. % and less than or equal to 29.0 mol. %, greater than or equal to 25.0 mol. % and less than or equal to 40.0 mol. %, greater than or equal to 25.0 mol. % and less than or equal to 38.0 mol. %, greater than or equal to 25.0 mol. % and less than or equal to 35.0 mol. %, greater than or equal to 29.0 mol. % and less than or equal to 38.0 mol. %, greater than or equal to 25.0 mol. % and less than or equal to 36.0 mol. %, greater than or equal to 13.0 mol. % and less than or equal to 26.0 mol. %, or greater than or equal to 14.0 mol. % and less than or equal to 30.0 mol. %.

Glass composition may include silica (SiO$_2$). Silica may play a role of an additional glass-former. Silica, as well as P$_2$O$_5$, may help to increase the liquidus viscosity and, therefore, protect a glass composition from crystallization. However, adding SiO$_2$ to a glass composition may cause liquid-liquid phase separation, which may cause devitrification and/or reducing the transmittance of the resulting glass. Also, SiO$_2$ is a low refractive index component and makes it difficult to achieve high index glasses. Accordingly, the content of SiO$_2$ in the embodiments of the present disclosure is limited, or glasses may be substantially free of SiO$_2$. In embodiments, the glass may contain silica (SiO$_2$) in an amount from greater than or equal to 0.0 mol. % to less than or equal to 15.0 mol. % and all ranges and sub-ranges between the foregoing values. In some embodiments, the glass composition may contain SiO$_2$ in an amount greater than or equal to 0.0 mol. %, greater than or equal to 1.0 mol. %, greater than or equal to 2.0 mol. %, greater than or equal to 3.0 mol. %, greater than or equal to 5.0 mol. %, greater than or equal to 10.0 mol. %, greater than or equal to 12.0 mol. %, greater than or equal to 13.0 mol. %, or greater than or equal to 14.0 mol. %. In some other embodiments, the glass composition may contain SiO$_2$ in an amount less than or equal to 15.0 mol. %, less than or equal to 14.0 mol. %, less than or equal to 13.0 mol. %, less than or equal to 12.0 mol. %, less than or equal to 10.0 mol. %, less than or equal to 5.0 mol. %, less than or equal to 3.0 mol. %, less than or equal to 2.0 mol. %, less than or equal to 1.0 mol. %, less than or equal to 0.9 mol. %, or less than or equal to 0.8 mol. %. In some more embodiments, the glass composition may contain SiO$_2$ in an amount greater than or equal to 0.0 mol. % and less than or equal to 1.0 mol. %, greater than or equal to 0.0 mol. % and less than or equal to 0.9 mol. %, greater than or equal to 0.0 mol. % and less than or equal to 0.8 mol. %, greater than or equal to 0.0 mol. % and less than or equal to 15.0 mol. %, greater than or equal to 0.0 mol. % and less than or equal to 12.0 mol. %, greater than or equal to 0.0 mol. % and less than or equal to 3.0 mol. %, greater than or equal to 0.8 mol. % and less than or equal to 12.0 mol. %, greater than or equal to 0.8 mol. % and less than or equal to 0.9 mol. %, greater than or equal to 0.9 mol. % and less than or equal to 12.0 mol. %, greater than or equal to 1.0 mol. % and less than or equal to 13.0 mol. %, greater than or equal to 1.0 mol. % and less than or equal to 10.0 mol. %, greater than or equal to 2.0 mol. % and less than or equal to 13.0 mol. %, greater than or equal to 3.0 mol. % and less than or equal to 13.0 mol. %, greater than or equal to 3.0 mol. % and less than or equal to 10.0 mol. %, greater than or equal to 3.0 mol. % and less than or equal to 9.5 mol. %, greater than or equal to 7.0 mol. % and less than or equal to 11.0 mol. %, or greater than or equal to 4.5 mol. % and less than or equal to 9.0 mol. %.

Glass composition may include divalent metal oxides (RO). Divalent metal oxides, such as alkaline earth metal oxides (BeO, MgO, CaO, SrO and BaO), zinc oxide (ZnO), cadmium oxide (CdO), lead oxide (PbO) and others, being added to a glass, provide comparably high refractive indexes, greater than those for most of monovalent oxides. Some divalent metal oxides, such as, for example, CaO, SrO and ZnO, also provide comparably low density, therefore, increasing the ratio of the refractive index to density and, accordingly, improving the performance of optical glasses in certain applications. In addition, divalent metal oxides may help to increase the solubility of high index components, such as TiO$_2$, Nb$_2$O$_5$ and WO$_3$, which indirectly leads to a further increase in the refractive index at a comparable density. Also, some divalent metal oxides, such as, for example, ZnO and MgO, provide comparably low thermal expansion coefficient, which may reduce the thermal stresses formed in the glass articles when cooling and, therefore, improve the quality of the glass articles. However, when adding at high amounts, divalent metal oxides may cause crystallization of refractory minerals from the melts or liquid-liquid phase separation, which may reduce the glass-forming ability of glasses. Also, some divalent metal oxides, such as, for example, PbO and CdO, may cause some ecological concern. Accordingly, the amount of divalent metal oxides in glass compositions of the present disclosure is limited.

In some embodiments, the glass composition may contain divalent metal oxides in an amount greater than or equal to 4.0 mol. %.

Glass composition may include calcium oxide (CaO). Calcium oxide provides the highest ratio of the refractive index to density of glasses among the known monovalent and divalent metal oxides. Also, in some embodiments, CaO may help to increase the solubility of $Nb_2O_5$ and $TiO_2$, which additionally contributes to an increase in refractive index at comparably low density. However, if the amount of CaO in a glass is too high, it may cause crystallization of refractory species, such as calcium titanates ($CaTiO_3$, $CaTi_2O_5$, etc.) calcium niobate ($CaNb_2O_6$), calcium metasilicate ($CaSiO_3$) and others, which may reduce the viscosity at the liquidus temperature and, therefore, increase the critical cooling rate, which may cause crystallization of the glass-forming melt when cooling. That is why the amount of CaO in glasses of the present disclosure is limited. In embodiments, the glass may contain calcium oxide (CaO) in an amount from greater than or equal to 0.0 mol. % to less than or equal to 35.0 mol. % and all ranges and sub-ranges between the foregoing values. In some embodiments, the glass composition may contain CaO in an amount greater than or equal to 0.0 mol. %, greater than or equal to 0.3 mol. %, greater than or equal to 0.5 mol. %, greater than or equal to 1.0 mol. %, greater than or equal to 2.0 mol. %, greater than or equal to 3.0 mol. %, greater than or equal to 4.0 mol. %, greater than or equal to 5.0 mol. %, greater than or equal to 5.3 mol. %, greater than or equal to 5.5 mol. %, greater than or equal to 10.0 mol. %, greater than or equal to 15.0 mol. %, greater than or equal to 20.0 mol. %, greater than or equal to 25.0 mol. %, greater than or equal to 30.0 mol. %, greater than or equal to 32.0 mol. %, greater than or equal to 33.0 mol. %, or greater than or equal to 34.0 mol. %. In some other embodiments, the glass composition may contain CaO in an amount less than or equal to 35.0 mol. %, less than or equal to 34.0 mol. %, less than or equal to 33.0 mol. %, less than or equal to 32.0 mol. %, less than or equal to 30.0 mol. %, less than or equal to 25.0 mol. %, less than or equal to 23.0 mol. %, less than or equal to 20.5 mol. %, less than or equal to 20.0 mol. %, less than or equal to 15.0 mol. %, less than or equal to 14.5 mol. %, less than or equal to 10.0 mol. %, less than or equal to 5.0 mol. %, less than or equal to 3.0 mol. %, less than or equal to 2.0 mol. %, or less than or equal to 1.0 mol. %. In some more embodiments, the glass composition may contain CaO in an amount greater than or equal to 0.0 mol. % and less than or equal to 14.5 mol. %, greater than or equal to 0.3 mol. % and less than or equal to 30.0 mol. %, greater than or equal to 1.0 mol. % and less than or equal to 35.0 mol. %, greater than or equal to 2.0 mol. % and less than or equal to 30.0 mol. %, greater than or equal to 4.0 mol. % and less than or equal to 23.0 mol. %, greater than or equal to 5.3 mol. % and less than or equal to 15.0 mol. %, greater than or equal to 5.5 mol. % and less than or equal to 20.5 mol. %, greater than or equal to 0.0 mol. % and less than or equal to 35.0 mol. %, greater than or equal to 0.0 mol. % and less than or equal to 25.0 mol. %, greater than or equal to 0.0 mol. % and less than or equal to 1.0 mol. %, greater than or equal to 1.0 mol. % and less than or equal to 14.5 mol. %, greater than or equal to 2.0 mol. % and less than or equal to 5.0 mol. %, greater than or equal to 3.0 mol. % and less than or equal to 30.0 mol. %, greater than or equal to 3.0 mol. % and less than or equal to 5.0 mol. %, greater than or equal to 5.0 mol. % and less than or equal to 30.0 mol. %, greater than or equal to 5.0 mol. % and less than or equal to 20.0 mol. %, greater than or equal to 10.0 mol. % and less than or equal to 35.0 mol. %, greater than or equal to 10.0 mol. % and less than or equal to 23.0 mol. %, greater than or equal to 10.0 mol. % and less than or equal to 15.0 mol. %, greater than or equal to 14.5 mol. % and less than or equal to 23.0 mol. %, greater than or equal to 14.5 mol. % and less than or equal to 15.0 mol. %, greater than or equal to 15.0 mol. % and less than or equal to 35.0 mol. %, greater than or equal to 15.0 mol. % and less than or equal to 23.0 mol. %, greater than or equal to 20.0 mol. % and less than or equal to 30.0 mol. %, greater than or equal to 20.0 mol. % and less than or equal to 23.0 mol. %, greater than or equal to 20.5 mol. % and less than or equal to 35.0 mol. %, greater than or equal to 20.5 mol. % and less than or equal to 33.0 mol. %, greater than or equal to 20.5 mol. % and less than or equal to 23.0 mol. %, greater than or equal to 23.0 mol. % and less than or equal to 33.0 mol. %, greater than or equal to 23.0 mol. % and less than or equal to 30.0 mol. %, greater than or equal to 5.0 mol. % and less than or equal to 18.0 mol. %, greater than or equal to 11.0 mol. % and less than or equal to 25.0 mol. %, or greater than or equal to 15.0 mol. % and less than or equal to 28.0 mol. %.

Glass composition may include barium oxide (BaO). Barium oxide may increase the solubility of high index components, such as $TiO_2$ and $Nb_2O_5$, more than other divalent metal oxides, which may indirectly lead to a further increase in the refractive index at comparably low density. However, barium is a heavy element and, being added in a high amount, may increase the density of glass. Also, at high concentration, it may cause crystallization of such minerals as barium titanate ($BaTiO_3$), barium niobate ($BaNb_2O_6$), barium orthophosphate ($Ba_3P_2O_8$) and others, which may cause crystallization of a melt when cooling. Accordingly, the amount of BaO in glasses of the present disclosure is limited, or glasses may be substantially free of BaO. In embodiments, the glass may contain barium oxide (BaO) in an amount from greater than or equal to 0.0 mol. % to less than or equal to 15.0 mol. % and all ranges and sub-ranges between the foregoing values. In some embodiments, the glass composition may contain BaO in an amount greater than or equal to 0.0 mol. %, greater than or equal to 3.0 mol. %, greater than or equal to 5.0 mol. %, greater than or equal to 6.0 mol. %, or greater than or equal to 10.0 mol. %. In some other embodiments, the glass composition may contain BaO in an amount less than or equal to 15.0 mol. %, less than or equal to 17.0 mol. %, less than or equal to 15.0 mol. %, less than or equal to 14.5 mol. %, less than or equal to 13.0 mol. %, less than or equal to 10.0 mol. %, less than or equal to 8.0 mol. %, or less than or equal to 5.0 mol. %. In some more embodiments, the glass composition may contain BaO in an amount greater than or equal to 0.0 mol. % and less than or equal to 20.0 mol. %, greater than or equal to 0.0 mol. % and less than or equal to 15.0 mol. %, greater than or equal to 0.0 mol. % and less than or equal to 14.5 mol. %, greater than or equal to 0.0 mol. % and less than or equal to 13.0 mol. %, greater than or equal to 3.3 mol. % and less than or equal to 8.01 mol. %, greater than or equal to 6.0 mol. % and less than or equal to 17.0 mol. %, greater than or equal to 5.0 mol. % and less than or equal to 15.0 mol. %, greater than or equal to 5.0 mol. % and less than or equal to 13.0 mol. %, greater than or equal to 5.0 mol. % and less than or equal to 8.0 mol. %, greater than or equal to 8.0 mol.

% and less than or equal to 13.0 mol. %, greater than or equal to 10.0 mol. % and less than or equal to 17.0 mol. %, greater than or equal to 10.0 mol. % and less than or equal to 15.0 mol. %, greater than or equal to 10.0 mol. % and less than or equal to 13.0 mol. %, greater than or equal to 13.0 mol. % and less than or equal to 15.0 mol. %, greater than or equal to 13.0 mol. % and less than or equal to 14.5 mol. %, greater than or equal to 4.8 mol. % and less than or equal to 14.3 mol. %, greater than or equal to 7.8 mol. % and less than or equal to 14.5 mol. %, or greater than or equal to 5.2 mol. % and less than or equal to 11.1 mol. %.

Glass composition may include magnesia (MgO). Magnesia is not frequently used in the high-index optical glasses. Magnesia reduces the thermal expansion coefficient, which may be useful for reduction of thermal stresses formed in the glass articles when cooling them. However, magnesia provides a lower refractive index and a lower increase in the solubility of high index components than other divalent metal oxides, such as, for example, BaO, SrO, CaO and ZnO. Also, in phosphate glasses, adding MgO may cause crystallization of magnesium phosphate $Mg_3P_2O_8$, which may reduce the glass-forming ability of glasses. Accordingly, the amount of MgO in glass compositions of the present disclosure is limited, or glasses may be substantially free of MgO. In embodiments, the glass may contain magnesia (MgO) in an amount from greater than or equal to 0.0 mol. % to less than or equal to 15.0 mol. % and all ranges and sub-ranges between the foregoing values. In some embodiments, the glass composition may contain MgO in an amount greater than or equal to 0.0 mol. %, greater than or equal to 1.0 mol. %, greater than or equal to 2.0 mol. %, greater than or equal to 3.0 mol. %, greater than or equal to 5.0 mol. %, greater than or equal to 10.0 mol. %, greater than or equal to 12.0 mol. %, greater than or equal to 13.0 mol. %, or greater than or equal to 14.0 mol. %. In some other embodiments, the glass composition may contain MgO in an amount less than or equal to 15.0 mol. %, less than or equal to 14.0 mol. %, less than or equal to 13.0 mol. %, less than or equal to 12.0 mol. %, less than or equal to 10.0 mol. %, less than or equal to 5.0 mol. %, less than or equal to 3.0 mol. %, less than or equal to 2.5 mol. %, less than or equal to 2.0 mol. %, or less than or equal to 1.0 mol. %. In some more embodiments, the glass composition may contain MgO in an amount greater than or equal to 0.0 mol. % and less than or equal to 15.0 mol. %, greater than or equal to 0.0 mol. % and less than or equal to 2.5 mol. %, greater than or equal to 0.0 mol. % and less than or equal to 3.0 mol. %, greater than or equal to 0.0 mol. % and less than or equal to 1.0 mol. %, greater than or equal to 1.0 mol. % and less than or equal to 15.0 mol. %, greater than or equal to 1.0 mol. % and less than or equal to 12.0 mol. %, greater than or equal to 1.0 mol. % and less than or equal to 3.0 mol. %, greater than or equal to 2.0 mol. % and less than or equal to 13.0 mol. %, greater than or equal to 2.0 mol. % and less than or equal to 3.0 mol. %, greater than or equal to 2.5 mol. % and less than or equal to 15.0 mol. %, greater than or equal to 2.5 mol. % and less than or equal to 13.0 mol. %, greater than or equal to 2.5 mol. % and less than or equal to 10.0 mol. %, greater than or equal to 2.5 mol. % and less than or equal to 3.0 mol. %, greater than or equal to 3.0 mol. % and less than or equal to 15.0 mol. %, greater than or equal to 3.0 mol. % and less than or equal to 13.0 mol. %, greater than or equal to 5.0 mol. % and less than or equal to 15.0 mol. %, greater than or equal to 5.0 mol. % and less than or equal to 12.0 mol. %, greater than or equal to 5.1 mol. % and less than or equal to 13.0 mol. %, greater than or equal to 9.5 mol. % and less than or equal to 14.3 mol. %, or greater than or equal to 3.9 mol. % and less than or equal to 9.3 mol. %.

Glass composition may include sodium oxide ($Na_2O$). In high-index glasses, $Na_2O$ acts like $K_2O$, improving the solubility of high index components, such as $TiO_2$, $Nb_2O_5$, $WO_3$ and others, but, at the same time, decreasing the refractive index of glasses. In most cases, the effect of $Na_2O$ on the solubility of high index components was found to be slightly lower than the corresponding effect of $K_2O$. However, $Na_2O$ provides a lower thermal expansion coefficient than $K_2O$, which may reduce the thermal stresses formed when cooling the glass articles and, therefore, improve the quality of the articles. In embodiments, the glass may contain sodium oxide ($Na_2O$) in an amount from greater than or equal to 0.0 mol. % to less than or equal to 15.0 mol. % and all ranges and sub-ranges between the foregoing values. In some embodiments, the glass composition may contain $Na_2O$ in an amount greater than or equal to 0.0 mol. %, greater than or equal to 5.0 mol. %, or greater than or equal to 10.0 mol. %. In some other embodiments, the glass composition may contain $Na_2O$ in an amount less than or equal to 15.0 mol. %, less than or equal to 15.0 mol. %, less than or equal to 13.5 mol. %, less than or equal to 12.0 mol. %, less than or equal to 10.5 mol. %, less than or equal to 10.0 mol. %, less than or equal to 7.0 mol. %, or less than or equal to 5.0 mol. %. In some more embodiments, the glass composition may contain $Na_2O$ in an amount greater than or equal to 0.0 mol. % and less than or equal to 20.0 mol. %, greater than or equal to 0.0 mol. % and less than or equal to 15.0 mol. %, greater than or equal to 0.0 mol. % and less than or equal to 13.5 mol. %, greater than or equal to 0.0 mol. % and less than or equal to 12.0 mol. %, greater than or equal to 0.0 mol. % and less than or equal to 10.5 mol. %, greater than or equal to 0.02 mol. % and less than or equal to 6.98 mol. %, greater than or equal to 5.0 mol. % and less than or equal to 10.5 mol. %, greater than or equal to 5.0 mol. % and less than or equal to 7.0 mol. %, greater than or equal to 7.0 mol. % and less than or equal to 13.5 mol. %, greater than or equal to 7.0 mol. % and less than or equal to 10.5 mol. %, greater than or equal to 5.6 mol. % and less than or equal to 11.0 mol. %, greater than or equal to 2.1 mol. % and less than or equal to 13.0 mol. %, or greater than or equal to 5.2 mol. % and less than or equal to 9.0 mol. %.

Glass composition may include alumina ($Al_2O_3$). Alumina may increase the viscosity of glass-forming melts at high temperature, which may reduce the critical cooling rate and improve the glass-forming ability. However, in high-index phosphate glasses, addition of $Al_2O_3$ may cause crystallization of refractory minerals, such as aluminum phosphate ($AlPO_4$), aluminum titanate ($Al_2TiO_5$), aluminum niobate ($AlNbO_4$) and others, in the glass-forming melts when cooling. Accordingly, the amount of $Al_2O_3$ in glasses of the present disclosure is limited, or glasses may be substantially free of $Al_2O_3$. In embodiments, the glass may contain alumina ($Al_2O_3$) in an amount from greater than or equal to 0.0 mol. % to less than or equal to 10.0 mol. % and all ranges and sub-ranges between the foregoing values. In some embodiments, the glass composition may contain $Al_2O_3$ in an amount greater than or equal to 0.0 mol. %, greater than or equal to 0.5 mol. %, greater than or equal to 1.0 mol. %, greater than or equal to 1.5 mol. %, greater than or equal to 2.5 mol. %, greater than or equal to 5.0 mol. %, greater than or equal to 7.5 mol. %, greater than or equal to 8.5 mol. %, greater than or equal to 9.0 mol. %, or greater than or equal to 9.5 mol. %. In some other embodiments, the glass composition may contain $Al_2O_3$ in an amount less than or equal to 10.0 mol. %, less than or equal to 9.5 mol. %, less than or equal to 9.0 mol. %, less than or equal to 8.5 mol. %, less than or equal to 7.5 mol. %, less than or equal to 5.0 mol. %, less than or equal to 2.5 mol. %, less than or equal to 1.5 mol. %, less than or equal to 1.0 mol. %, or less than or equal to 0.5 mol. %. In some more embodiments, the glass composition may contain $Al_2O_3$ in an amount greater than or equal to 0.0 mol. % and less than or equal to 10.0 mol. %, greater than or equal to 0.0 mol. % and less than or equal to 8.5 mol. %, greater than or equal to 0.0 mol. % and less than or equal to 0.5 mol. %, greater than or equal to 0.5 mol. % and less than or equal to 2.5 mol. %, greater than or equal to 1.0 mol. % and less than or equal to 9.0 mol. %, greater than or equal to 1.0 mol. % and less than or equal to 7.5 mol. %, greater than or equal to 1.0 mol. % and less than or equal to 2.5 mol. %, greater than or equal to 1.5 mol. % and less than or equal to 9.0 mol. %, greater than or equal to 2.5 mol. % and less than or equal to 7.5 mol. %, greater than or equal to 5.0 mol. % and less than or equal to 8.5 mol. %, greater than or equal to 5.0 mol. % and less than or equal to 7.5 mol. %, greater than or equal to 7.5 mol. % and less than or equal to 9.5 mol. %, greater than or equal to 7.5 mol. % and less than or equal to 9.0 mol. %, greater than or equal to 7.5 mol. % and less than or equal to 8.5 mol. %, greater than or equal to 1.2 mol. % and less than or equal to 9.6 mol. %, greater than or equal to 3.5 mol. % and less than or equal to 9.0 mol. %, or greater than or equal to 4.0 mol. % and less than or equal to 8.0 mol. %.

Glass composition may include vanadia ($V_2O_5$). Vanadia provides the highest ratio of the refractive index to density among all oxides. However, vanadia may cause undesirable dark or even black coloring and may also raise environmental concerns. For these reasons, the content of vanadia in the glasses of the present disclosure is limited, or glass compositions may be free of $V_2O_5$. In embodiments, the glass may contain vanadia ($V_2O_5$) in an amount from greater than or equal to 0.0 mol. % to less than or equal to 1.0 mol. % and all ranges and sub-ranges between the foregoing values. In some embodiments, the glass composition may contain $V_2O_5$ in an amount greater than or equal to 0.0 mol. %, greater than or equal to 0.05 mol. %, greater than or equal to 0.10 mol. %, greater than or equal to 0.15 mol. %, greater than or equal to 0.25 mol. %, greater than or equal to 0.5 mol. %, greater than or equal to 0.75 mol. %, greater than or equal to 0.85 mol. %, greater than or equal to 0.9 mol. %, or greater than or equal to 0.95 mol. %. In some other embodiments, the glass composition may contain $V_2O_5$ in an amount less than or equal to 1.0 mol. %, less than or equal to 0.95 mol. %, less than or equal to 0.9 mol. %, less than or equal to 0.85 mol. %, less than or equal to 0.75 mol. %, less than or equal to 0.5 mol. %, less than or equal to 0.25 mol. %, less than or equal to 0.15 mol. %, less than or equal to 0.10 mol. %, or less than or equal to 0.05 mol. %. In some more embodiments, the glass composition may contain $V_2O_5$ in an amount greater than or equal to 0.0 mol. % and less than or equal to 1.0 mol. %, greater than or equal to 0.0 mol. % and less than or equal to 0.85 mol. %, greater than or equal to 0.0 mol. % and less than or equal to 0.25 mol. %, greater than or equal to 0.0 mol. % and less than or equal to 0.05 mol. %, greater than or equal to 0.05 mol. % and less than or equal to 0.85 mol. %, greater than or equal to 0.05 mol. % and less than or equal to 0.25 mol. %, greater than or equal to 0.10 mol. % and less than or equal to 1.0 mol. %, greater than or equal to 0.10 mol. % and less than or equal to 0.9 mol. %, greater than or equal to 0.10 mol. % and less than or equal to 0.75 mol. %, greater than or equal to 0.10 mol. % and less than or equal to 0.25 mol. %, greater than or equal to 0.15 mol. % and less than or equal to 0.75 mol. %, greater than or equal to 0.15 mol. % and less than or equal to 0.25 mol. %, greater than or equal to 0.25 mol. % and less than or equal to 0.9 mol. %, greater than or equal to 0.5 mol. % and less than or equal to 1.0 mol. %, greater than or equal to 0.5 mol. % and less than or equal to 0.95 mol. %, greater than or equal to 0.5 mol. % and less than or equal to 0.9 mol. %, greater than or equal to 0.75 mol. % and less than or equal to 0.95 mol. %, greater than or equal to 0.75 mol. % and less than or equal to 0.9 mol. %, greater than or equal to 0.75 mol. % and less than or equal to 0.85 mol. %, greater than or equal to 0.4 mol. % and less than or equal to 0.77 mol. %, greater than or equal to 0.45 mol. % and less than or equal to 0.85 mol. %, or greater than or equal to 0.56 mol. % and less than or equal to 0.94 mol. %.

Glass composition may include tungsten oxide ($WO_3$). $WO_3$ provides high refractive index without significantly increasing density or causing undesirable coloring. However, at high concentrations of $WO_3$, such as greater than or equal to 10.0 mol. %, or greater than or equal to 20.0 mol. %, the liquidus temperature tends to rise, and the viscosity at the liquidus temperature drops, making it difficult to avoid crystallization of melts when cooling and/or to obtain high-quality optical glass. Accordingly, the content of $WO_3$ should be limited, or glass compositions may be free of $WO_3$. In embodiments, the glass may contain tungsten oxide ($WO_3$) in an amount from greater than or equal to 0.0 mol. % to less than or equal to 10.0 mol. % and all ranges and sub-ranges between the foregoing values. In some embodiments, the glass composition may contain $WO_3$ in an amount greater than or equal to 0.0 mol. %, greater than or equal to 2.5 mol. %, greater than or equal to 3.0 mol. %, greater than or equal to 5.0 mol. %, or greater than or equal to 7.5 mol. %. In some other embodiments, the glass composition may contain $WO_3$ in an amount less than or equal to 10.0 mol. %, less than or equal to 8.5 mol. %, less than or equal to 7.5 mol. %, less than or equal to 6.0 mol. %, less than or equal to 5.0 mol. %, less than or equal to 4.6 mol. %, or less than or equal to 2.5 mol. %. In some more embodiments, the glass composition may contain $WO_3$ in an amount greater than or equal to 0.0 mol. % and less than or equal to 10.0 mol. %, greater than or equal to 0.0 mol. % and less than or equal to 8.5 mol. %, greater than or equal to 0.0 mol. % and less than or equal to 7.5 mol. %, greater than or equal to 0.0 mol. % and less than or equal to 4.6 mol. %, greater than or equal to 2.5 mol. % and less than or equal to 6.15 mol. %, greater than or equal to 0.0 mol. % and less than or equal to 5.0 mol. %, greater than or equal to 0.0 mol. % and less than or equal to 2.5 mol. %, greater than or equal to 2.5 mol. % and less than or equal to 10.0 mol. %, greater than or equal to 2.5 mol. % and less than or equal to 7.5 mol. %, greater than or equal to 2.5 mol. % and less than or equal to 5.0 mol. %, greater than or equal to 4.6 mol. % and less than or equal to 10.0 mol. %, greater than or equal to 4.6 mol. % and less than or equal to 8.5 mol. %, greater than or equal to 4.6 mol. % and less than or equal to 7.5 mol. %, greater than or equal to 4.6 mol. % and less than or equal to 6.0 mol. %, greater than or equal to 4.6 mol. % and less than or equal to 5.0 mol. %, greater than or equal to 5.0 mol. % and less than or equal to 10.0 mol. %, greater than or equal to 5.0 mol. % and less than or equal to 8.5 mol. %, greater than or equal to 5.0 mol. % and less than or equal to 7.5 mol. %, greater than or equal to 5.0 mol. % and less than or equal to 6.0 mol. %, greater than or equal to 3.2 mol. % and less than or equal to 7.9 mol. %, greater than or equal to 3.0 mol. % and less than or equal to 8.5 mol. %, or greater than or equal to 2.2 mol. % and less than or equal to 6.3 mol. %.

Glass composition may include tantalum oxide ($Ta_2O_5$). Tantalum oxide increases the refractive index while maintaining an acceptable density without reducing the blue transmittance. However, when added to a glass composition, sometimes even in small amounts, $Ta_2O_5$ may cause crystallization of refractory minerals, which may increase the liquidus temperature and, therefore, reduce the glass-forming ability. Accordingly, the content of tantalum oxide should be limited, or glass compositions may be free of $Ta_2O_5$. In embodiments, the glass may contain tantalum oxide ($Ta_2O_5$) in an amount from greater than or equal to 0.0 mol. % to less than or equal to 5.0 mol. % and all ranges and sub-ranges between the foregoing values. In some embodiments, the glass composition may contain $Ta_2O_5$ in an amount greater than or equal to 0.0 mol. %, greater than or equal to 0.02 mol. %, greater than or equal to 1.0 mol. %, greater than or equal to 2.0 mol. %, greater than or equal to 3.0 mol. %, or greater than or equal to 4.0 mol. %. In some other embodiments, the glass composition may contain $Ta_2O_5$ in an amount less than or equal to 5.0 mol. %, less than or equal to 4.0 mol. %, less than or equal to 3.0 mol. %, less than or equal to 2.0 mol. %, less than or equal to 1.8 mol. %, less than or equal to 1.6 mol. %, less than or equal to 1.0 mol. %, or less than or equal to 0.03 mol. %. In some more embodiments, the glass composition may contain $Ta_2O_5$ in an amount greater than or equal to 0.0 mol. % and less than or equal to 2.0 mol. %, greater than or equal to 0.0 mol. % and less than or equal to 1.8 mol. %, greater than or equal to 0.0 mol. % and less than or equal to 1.6 mol. %, greater than or equal to 0.02 mol. % and less than or equal to 0.03 mol. %, greater than or equal to 0.0 mol. % and less than or equal to 5.0 mol. %, greater than or equal to 0.0 mol. % and less than or equal to 1.0 mol. %, greater than or equal to 0.03 mol. % and less than or equal to 3.0 mol. %, greater than or equal to 0.03 mol. % and less than or equal to 1.8 mol. %, greater than or equal to 1.0 mol. % and less than or equal to 5.0 mol. %, greater than or equal to 1.0 mol. % and less than or equal to 3.0 mol. %, greater than or equal to 1.0 mol. % and less than or equal to 1.8 mol. %, greater than or equal to 1.6 mol. % and less than or equal to 5.0 mol. %, greater than or equal to 1.6 mol. % and less than or equal to 4.0 mol. %, greater than or equal to 1.6 mol. % and less than or equal to 3.0 mol. %, greater than or equal to 1.8 mol. % and less than or equal to 5.0 mol. %, greater than or equal to 1.8 mol. % and less than or equal to 3.0 mol. %, greater than or equal to 1.8 mol. % and less than or equal to 2.0 mol. %, greater than or equal to 1.0 mol. % and less than or equal to 4.0 mol. %, greater than or equal to 1.0 mol. % and less than or equal to 3.0 mol. %, or greater than or equal to 3.0 mol. % and less than or equal to 4.0 mol. %.

Glass composition may include bismuth oxide ($Bi_2O_3$). $Bi_2O_3$ provides very high refractive index, higher than any other components considered herein, but leads to increases in density. Sometimes it may provide undesirable coloring. Also, it may decrease the viscosity of melts at high temperatures, which may cause crystallization of the melts when cooling. This effect is especially significant at high concentrations of $Bi_2O_3$, such as, for example, greater than 20.0 mol. %, or greater than 26.0 mol. %, or higher. Accordingly, the content of bismuth oxide should be limited, or glass compositions may be free of $Bi_2O_3$. In embodiments, the glass may contain bismuth oxide ($Bi_2O_3$) in an amount from greater than or equal to 0.0 mol. % to less than or equal to 10.0 mol. % and all ranges and sub-ranges between the foregoing values. In some embodiments, the glass composition may contain $Bi_2O_3$ in an amount greater than or equal to 0.0 mol. %, greater than or equal to 1.0 mol. %, greater than or equal to 2.5 mol. %, greater than or equal to 5.0 mol. %, or greater than or equal to 7.5 mol. %. In some other embodiments, the glass composition may contain $Bi_2O_3$ in an amount less than or equal to 10.0 mol. %, less than or equal to 7.5 mol. %, less than or equal to 5.0 mol. %, less than or equal to 4.6 mol. %, less than or equal to 4.0 mol. %, less than or equal to 3.4 mol. %, less than or equal to 3.0 mol. %, or less than or equal to 2.5 mol. %. In some more embodiments, the glass composition may contain $Bi_2O_3$ in an amount greater than or equal to 0.0 mol. % and less than or equal to 4.6 mol. %, greater than or equal to 0.0 mol. % and less than or equal to 4.0 mol. %, greater than or equal to 0.0 mol. % and less than or equal to 3.4 mol. %, greater than or equal to 0.0 mol. % and less than or equal to 3.0 mol. %, greater than or equal to 1.43 mol. % and less than or equal to 3.62 mol. %, greater than or equal to 0.0 mol. % and less than or equal to 10.0 mol. %, greater than or equal to 2.5 mol. % and less than or equal to 5.0 mol. %, greater than or equal to 2.5 mol. % and less than or equal to 4.0 mol. %, greater than or equal to 2.5 mol. % and less than or equal to 3.0 mol. %, greater than or equal to 3.0 mol. % and less than or equal to 5.0 mol. %, greater than or equal to 3.0 mol. % and less than or equal to 4.0 mol. %, greater than or equal to 3.4 mol. % and less than or equal to 7.5 mol. %, greater than or equal to 3.4 mol. % and less than or equal to 5.0 mol. %, greater than or equal to 3.4 mol. % and less than or equal to 4.6 mol. %, greater than or equal to 3.4 mol. % and less than or equal to 4.0 mol. %, greater than or equal to 5.8 mol. % and less than or equal to 9.2 mol. %, greater than or equal to 0.9 mol. % and less than or equal to 5.7 mol. %, or greater than or equal to 1.1 mol. % and less than or equal to 5.6 mol. %.

Glass composition may include lithium oxide ($Li_2O$). Lithium oxide provides the highest ratio of the refractive index to density of glasses among the known monovalent metal oxides. Also, in some embodiments, $Li_2O$ may help to increase the solubility of $Nb_2O_5$ and $TiO_2$, which additionally increases the refractive index at comparably low density. In addition, lithium oxide may hasten the process of bleaching the glasses. However, it was empirically found that in some embodiments, addition of $Li_2O$, even in small concentrations, may decrease the glass-forming ability of glasses by causing crystallization or liquid-liquid phase separation of glass-forming melts when cooling. Therefore, the amount of $Li_2O$ in glasses of the present disclosure is limited. However, the mentioned undesirable effects of $Li_2O$ are difficult to predict; for this reason, the exact boundary of $Li_2O$ in the embodiments may be very different. In particular, in some embodiments, the glasses may be substantially free of $Li_2O$. In embodiments, the glass may contain lithium oxide ($Li_2O$) in an amount from greater than or equal to 0.0 mol. % to less than or equal to 10.0 mol. % and all ranges and sub-ranges between the foregoing values. In some embodiments, the glass composition may contain $Li_2O$ in an amount greater than or equal to 0.0 mol. %, greater than or equal to 0.5 mol. %, greater than or equal to 1.0 mol. %, greater than or equal to 1.5 mol. %, greater than or equal to 2.5 mol. %, greater than or equal to 5.0 mol. %, greater than or equal to 7.5 mol. %, greater than or equal to 8.5 mol. %, greater than or equal to 9.0 mol. %, or greater than or equal to 9.5 mol. %. In some other embodiments, the glass composition may contain $Li_2O$ in an amount less than or equal to 10.0 mol. %, less than or equal to 9.5 mol. %, less than or equal to 9.0 mol. %, less than or equal to 8.5 mol. %, less than or equal to 7.5 mol. %, less than or equal to 6.0 mol. %, less than or equal to 5.0 mol. %, less than or equal to 4.5 mol. %, less than or equal to 4.0 mol. %, less than or equal to 3.0 mol. %, less than or equal to 2.5 mol. %, less than or equal to 1.5 mol. %, less than or equal to 1.0 mol. %, or less than or equal to 0.5 mol. %. In some more embodiments, the glass composition may contain $Li_2O$ in an amount greater than or equal to 0.0 mol. % and less than or equal to 6.0 mol. %, greater than or equal to 0.0 mol. % and less than or equal to 5.0 mol. %, greater than or equal to 0.0 mol. % and less than or equal to 4.5 mol. %, greater than or equal to 0.0 mol. % and less than or equal to 4.0 mol. %, greater than or equal to 0.99 mol. % and less than or equal to 3.0 mol. %, greater than or equal to 0.0 mol. % and less than or equal to 10.0 mol. %, greater than or equal to 0.0 mol. % and less than or equal to 7.5 mol. %, greater than or equal to 0.5 mol. % and less than or equal to 10.0 mol. %, greater than or equal to 0.5 mol. % and less than or equal to 7.5 mol. %, greater than or equal to 0.5 mol. % and less than or equal to 4.0 mol. %, greater than or equal to 1.0 mol. % and less than or equal to 4.0 mol. %, greater than or equal to 1.5 mol. % and less than or equal to 8.5 mol. %, greater than or equal to 1.5 mol. % and less than or equal to 5.0 mol. %, greater than or equal to 2.5 mol. % and less than or equal to 8.5 mol. %, greater than or equal to 2.5 mol. % and less than or equal to 3.0 mol. %, greater than or equal to 3.0 mol. % and less than or equal to 8.5 mol. %, greater than or equal to 3.0 mol. % and less than or equal to 5.0 mol. %, greater than or equal to 4.0 mol. % and less than or equal to 9.0 mol. %, greater than or equal to 4.0 mol. % and less than or equal to 7.5 mol. %, greater than or equal to 4.0 mol. % and less than or equal to 5.0 mol. %, greater than or equal to 5.4 mol. % and less than or equal to 9.9 mol. %, greater than or equal to 3.5 mol. % and less than or equal to 8.1 mol. %, or greater than or equal to 0.3 mol. % and less than or equal to 5.6 mol. %.

Glass composition may include potassium oxide ($K_2O$). Potassium oxide may increase the solubility of high index components, such as $TiO_2$ and $Nb_2O_5$, more than other monovalent and divalent metal oxides, which may indirectly increase the refractive index at comparably low density. However, potassium oxide itself provides the lowest refractive index among the mentioned oxides. Therefore, at high concentrations of $K_2O$, it may be difficult to reach high refractive index. Accordingly, the amount of $K_2O$ in glasses of the present disclosure is limited, or glasses may be substantially free of $K_2O$. In embodiments, the glass may contain potassium oxide ($K_2O$) in an amount from greater than or equal to 0.3 mol. % to less than or equal to 35.0 mol. % and all ranges and sub-ranges between the foregoing values. In some embodiments, the glass composition may contain $K_2O$ in an amount greater than or equal to 0.3 mol. %, greater than or equal to 0.5 mol. %, greater than or equal to 1.0 mol. %, greater than or equal to 2.0 mol. %, greater than or equal to 3.0 mol. %, greater than or equal to 4.0 mol. %, greater than or equal to 5.0 mol. %, greater than or equal to 10.0 mol. %, greater than or equal to 15.0 mol. %, greater than or equal to 20.0 mol. %, greater than or equal to 25.0 mol. %, greater than or equal to 30.0 mol. %, greater than or equal to 32.0 mol. %, greater than or equal to 33.0 mol. %, or greater than or equal to 34.0 mol. %. In some other embodiments, the glass composition may contain $K_2O$ in an amount less than or equal to 35.0 mol. %, less than or equal to 34.0 mol. %, less than or equal to 33.0 mol. %, less than or equal to 32.0 mol. %, less than or equal to 30.0 mol. %, less than or equal to 25.0 mol. %, less than or equal to 20.0 mol. %, less than or equal to 16.0 mol. %, less than or equal to 15.0 mol. %, less than or equal to 14.5 mol. %, less than or equal to 13.8 mol. %, less than or equal to 13.5 mol. %, less than or equal to 10.0 mol. %, less than or equal to 5.0 mol. %, less than or equal to 3.0 mol. %, less than or equal to 2.0 mol. %, or less than or equal to 1.0 mol. %. In some more embodiments, the glass composition may contain $K_2O$ in an amount greater than or equal to 0.3 mol. % and less than or equal to 20.0 mol. %, greater than or equal to 1.0 mol. % and less than or equal to 35.0 mol. %, greater than or equal to 2.0 mol. % and less than or equal to 13.5 mol. %, greater than or equal to 4.0 mol. % and less than or equal to 20.0 mol. %, greater than or equal to 4.0 mol. % and less than or equal to 16.0 mol. %, greater than or equal to 5.0 mol. % and less than or equal to 14.5 mol. %, greater than or equal to 5.0 mol. % and less than or equal to 13.81 mol. %, greater than or equal to 0.3 mol. % and less than or equal to 35.0 mol. %, greater than or equal to 0.3 mol. % and less than or equal to 25.0 mol. %, greater than or equal to 0.3 mol. % and less than or equal to 13.8 mol. %, greater than or equal to 0.3 mol. % and less than or equal to 2.0 mol. %, greater than or equal to 1.0 mol. % and less than or equal to 25.0 mol. %, greater than or equal to 1.0 mol. % and less than or equal to 13.8 mol. %, greater than or equal to 1.0 mol. % and less than or equal to 2.0 mol. %, greater than or equal to 2.0 mol. % and less than or equal to 25.0 mol. %, greater than or equal to 2.0 mol. % and less than or equal to 13.8 mol. %, greater than or equal to 3.0 mol. % and less than or equal to 30.0 mol. %, greater than or equal to 3.0 mol. % and less than or equal to 15.0 mol. %, greater than or equal to 3.0 mol. % and less than or equal to 10.0 mol. %, greater than or equal to 5.0 mol. % and less than or equal to 35.0 mol. %, greater than or equal to 5.0 mol. % and less than or equal to 30.0 mol. %, greater than or equal to 5.0 mol. % and less than or equal to 10.0 mol. %, greater than or equal to 10.0 mol. % and less than or equal to 30.0 mol. %, greater than or equal to 10.0 mol. % and less than or equal to 15.0 mol. %, greater than or equal to 13.5 mol. % and less than or equal to 32.0 mol. %, greater than or equal to 13.5 mol. % and less than or equal to 20.0 mol. %, greater than or equal to 13.5 mol. % and less than or equal to 14.5 mol. %, greater than or equal to 13.8 mol. % and less than or equal to 35.0 mol. %, greater than or equal to 13.8 mol. % and less than or equal to 20.0 mol. %, greater than or equal to 13.8 mol. % and less than or equal to 14.5 mol. %, greater than or equal to 14.5 mol. % and less than or equal to 35.0 mol. %, greater than or equal to 14.5 mol. % and less than or equal to 32.0 mol. %, greater than or equal to 14.5 mol. % and less than or equal to 20.0 mol. %, greater than or equal to 5.0 mol. % and less than or equal to 14.0 mol. %, greater than or equal to 3.0 mol. % and less than or equal to 23.0 mol. %, or greater than or equal to 4.0 mol. % and less than or equal to 15.0 mol. %.

Glass composition may include titania ($TiO_2$). High refractive index glasses typically include species, such as $TiO_2$ and $Nb_2O_5$, that absorb at least a portion of optical light, particularly light in the blue and near-UV regions of the electromagnetic spectrum. In embodiments of the present disclosure, the transmittance of the glass may be characterized for different wavelengths within the range of from about 300 nm to 2300 nm. High transmission in the visible and near-UV range (blue region) is particularly desirable in some applications. High transmittance in the blue can be challenging to achieve in high refractive index glasses. High levels of $TiO_2$ and/or $Nb_2O_5$ that are typically used in glasses to increase refractive index tend to decrease the transmittance in the near-UV region and shift the UV cut-off to higher wavelengths. Accordingly, the amount of $TiO_2$ in the glass compositions of the present disclosure is limited. In embodiments, the glass may contain titania ($TiO_2$) in an amount from greater than or equal to 0.3 mol. % to less than or equal to 50.0 mol. % and all ranges and sub-ranges between the foregoing values. In some embodiments, the glass composition may contain $TiO_2$ in an amount greater than or equal to 0.3 mol. %, greater than or equal to 1.0 mol. %, greater than or equal to 2.0 mol. %, greater than or equal to 4.0 mol. %, greater than or equal to 6.0 mol. %, greater than or equal to 9.0 mol. %, greater than or equal to 10.0 mol. %, greater than or equal to 12.0 mol. %, greater than or equal to 13.0 mol. %, greater than or equal to 15.0 mol. %, greater than or equal to 20.0 mol. %, greater than or equal to 30.0 mol. %, greater than or equal to 40.0 mol. %, greater than or equal to 44.0 mol. %, greater than or equal to 46.0 mol. %, or greater than or equal to 48.0 mol. %. In some other embodiments, the glass composition may contain $TiO_2$ in an amount less than or equal to 50.0 mol. %, less than or equal to 48.0 mol. %, less than or equal to 46.0 mol. %, less than or equal to 44.0 mol. %, less than or equal to 40.0 mol. %, less than or equal to 37.0 mol. %, less than or equal to 34.0 mol. %, less than or equal to 33.0 mol. %, less than or equal to 30.0 mol. %, less than or equal to 26.0 mol. %, less than or equal to 20.0 mol. %, less than or equal to 10.0 mol. %, less than or equal to 6.0 mol. %, less than or equal to 4.0 mol. %, or less than or equal to 2.0 mol. %. In some more embodiments, the glass composition may contain $TiO_2$ in an amount greater than or equal to 0.3 mol. % and less than or equal to 40.0 mol. %, greater than or equal to 1.0 mol. % and less than or equal to 50.0 mol. %, greater than or equal to 6.0 mol. % and less than or equal to 40.0 mol. %, greater than or equal to 9.0 mol. % and less than or equal to 37.0 mol. %, greater than or equal to 12.0 mol. % and less than or equal to 34.0 mol. %, greater than or equal to 13.0 mol. % and less than or equal to 33.0 mol. %, greater than or equal to 15.0 mol. % and less than or equal to 26.39 mol. %, greater than or equal to 0.3 mol. % and less than or equal to 50.0 mol. %, greater than or equal to 2.0 mol. % and less than or equal to 40.0 mol. %, greater than or equal to 2.0 mol. % and less than or equal to 30.0 mol. %, greater than or equal to 4.0 mol. % and less than or equal to 50.0 mol. %, greater than or equal to 4.0 mol. % and less than or equal to 40.0 mol. %, greater than or equal to 4.0 mol. % and less than or equal to 30.0 mol. %, greater than or equal to 6.0 mol. % and less than or equal to 50.0 mol. %, greater than or equal to 10.0 mol. % and less than or equal to 50.0 mol. %, greater than or equal to 10.0 mol. % and less than or equal to 44.0 mol. %, greater than or equal to 10.0 mol. % and less than or equal to 34.0 mol. %, greater than or equal to 10.0 mol. % and less than or equal to 26.0 mol. %, greater than or equal to 20.0 mol. % and less than or equal to 44.0 mol. %, greater than or equal to 20.0 mol. % and less than or equal to 34.0 mol. %, greater than or equal to 20.0 mol. % and less than or equal to 26.0 mol. %, greater than or equal to 26.0 mol. % and less than or equal to 44.0 mol. %, greater than or equal to 26.0 mol. % and less than or equal to 34.0 mol. %, greater than or equal to 30.0 mol. % and less than or equal to 50.0 mol. %, greater than or equal to 30.0 mol. % and less than or equal to 46.0 mol. %, greater than or equal to 30.0 mol. % and less than or equal to 40.0 mol. %, greater than or equal to 30.0 mol. % and less than or equal to 34.0 mol. %, greater than or equal to 33.0 mol. % and less than or equal to 46.0 mol. %, greater than or equal to 33.0 mol. % and less than or equal to 40.0 mol. %, greater than or equal to 33.0 mol. % and less than or equal to 34.0 mol. %, greater than or equal to 22.0 mol. % and less than or equal to 46.0 mol. %, greater than or equal to 16.0 mol. % and less than or equal to 34.0 mol. %, or greater than or equal to 10.0 mol. % and less than or equal to 40.0 mol. %.

Glass composition may include niobia ($Nb_2O_5$). Niobia, like titania, can be used in some aspects of the present disclosure to increase the refractive index of glass while also maintaining a low density. However, niobia can introduce a yellow coloring to the glass that cannot be bleached in the same manner as titania, which can result in a loss of transmittance, particularly in the blue and UV range. Niobia, like titania, may cause crystallization and/or phase separation of the melt. In some cases, niobia may provide the glass with a high optical dispersion, which can be significantly higher than that induced by titania and some other high index components, when added in similar concentrations. The effects of niobia can be affected by the other components of the glass, and thus it can be challenging to determine an exact limit for niobia. In some embodiments, the glasses may be substantially free of $Nb_2O_5$; in this case, its function is performed by other species, such as, for example, $TiO_2$. In embodiments, the glass may contain niobia ($Nb_2O_5$) in an amount from greater than or equal to 0.0 mol. % to less than or equal to 50.0 mol. % and all ranges and sub-ranges between the foregoing values. In some embodiments, the glass composition may contain $Nb_2O_5$ in an amount greater than or equal to 0.0 mol. %, greater than or equal to 2.0 mol. %, greater than or equal to 4.0 mol. %, greater than or equal to 6.0 mol. %, greater than or equal to 10.0 mol. %, greater than or equal to 13.0 mol. %, greater than or equal to 16.0 mol. %, greater than or equal to 20.0 mol. %, greater than or equal to 21.0 mol. %, greater than or equal to 30.0 mol. %, greater than or equal to 40.0 mol. %, greater than or equal to 44.0 mol. %, greater than or equal to 46.0 mol. %, or greater than or equal to 48.0 mol. %. In some other embodiments, the glass composition may contain $Nb_2O_5$ in an amount less than or equal to 50.0 mol. %, less than or equal to 48.0 mol. %, less than or equal to 46.0 mol. %, less than or equal to 44.0 mol. %, less than or equal to 40.0 mol. %, less than or equal to 38.0 mol. %, less than or equal to 35.0 mol. %, less than or equal to 30.0 mol. %, less than or equal to 20.0 mol. %, less than or equal to 10.0 mol. %, less than or equal to 6.0 mol. %, less than or equal to 4.0 mol. %, or less than or equal to 2.0 mol. %. In some more embodiments, the glass composition may contain $Nb_2O_5$ in an amount greater than or equal to 0.0 mol. % and less than or equal to 50.0 mol. %, greater than or equal to 10.0 mol. % and less than or equal to 40.0 mol. %, greater than or equal to 13.0 mol. % and less than or equal to 38.0 mol. %, greater than or equal to 16.0 mol. % and less than or equal to 35.0 mol. %, greater than or equal to 20.29 mol. % and less than or equal to 34.59 mol. %, greater than or equal to 21.0 mol. % and less than or equal to 35.0 mol. %, greater than or equal to 0.0 mol. % and less than or equal to 40.0 mol. %, greater than or equal to 0.0 mol. % and less than or equal to 20.0 mol. %, greater than or equal to 0.0 mol. % and less than or equal to 2.0 mol. %, greater than or equal to 2.0 mol. % and less than or equal to 40.0 mol. %, greater than or equal to 4.0 mol. % and less than or equal to 44.0 mol. %, greater than or equal to 6.0 mol. % and less than or equal to 35.0 mol. %, greater than or equal to 6.0 mol. % and less than or equal to 10.0 mol. %, greater than or equal to 10.0 mol. % and less than or equal to 44.0 mol. %, greater than or equal to 10.0 mol. % and less than or equal to 35.0 mol. %, greater than or equal to 20.0 mol. % and less than or equal to 50.0 mol. %, greater than or equal to 20.0 mol. % and less than or equal to 40.0 mol. %, greater than or equal to 30.0 mol. % and less than or equal to 46.0 mol. %, greater than or equal to 30.0 mol. % and less than or equal to 40.0 mol. %, greater than or equal to 30.0 mol. % and less than or equal to 35.0 mol. %, greater than or equal to 35.0 mol. % and less than or equal to 50.0 mol. %, greater than or equal to 35.0 mol. % and less than or equal to 46.0 mol. %, greater than or equal to 35.0 mol. % and less than or equal to 40.0 mol. %, greater than or equal to 38.0 mol. % and less than or equal to 48.0 mol. %, greater than or equal to 38.0 mol. % and less than or equal to 44.0 mol. %, greater than or equal to 38.0 mol. % and less than or equal to 40.0 mol. %, greater than or equal to 37.0 mol. % and less than or equal to 49.0 mol. %, greater than or equal to 25.0 mol. % and less than or equal to 46.0 mol. %, or greater than or equal to 7.0 mol. % and less than or equal to 25.0 mol. %.

In some embodiments, the glass composition may have a sum of $SiO_2+GeO_2$ greater than or equal to 0.0 mol. %, greater than or equal to 5.0 mol. %, or greater than or equal to 10.0 mol. %. In some other embodiments, the glass composition may have a sum of $SiO_2+GeO_2$ less than or equal to 15.0 mol. %, less than or equal to 10.0 mol. %, or less than or equal to 5.0 mol. %. In some more embodiments, the glass composition may have a sum of $SiO_2+GeO_2$ greater than or equal to 0.0 mol. % and less than or equal to 15.0 mol. %, greater than or equal to 0.0 mol. % and less than or equal to 10.0 mol. %, greater than or equal to 0.0 mol. % and less than or equal to 5.0 mol. %, greater than or equal to 5.0 mol. % and less than or equal to 15.0 mol. %, greater than or equal to 5.0 mol. % and less than or equal to 10.0 mol. %, greater than or equal to 3.0 mol. % and less than or equal to 12.0 mol. %, greater than or equal to 6.2 mol. % and less than or equal to 11.3 mol. %, or greater than or equal to 3.0 mol. % and less than or equal to 9.0 mol. %.

In some embodiments, the glass composition may have a sum of $TeO_2+SnO_2+SnO$ greater than or equal to 0.0 mol. %, greater than or equal to 5.0 mol. %, or greater than or equal to 10.0 mol. %, or greater than or equal to 15.0 mol. %. In some other embodiments, the glass composition may have a sum of $TeO_2+SnO_2+SnO$ less than or equal to 20.0 mol. %, less than or equal to 15.0 mol. %, less than or equal to 10.0 mol. %, or less than or equal to 5.0 mol. %. In some more embodiments, the glass composition may have a sum of $TeO_2+SnO_2+SnO$ greater than or equal to 0.0 mol. % and less than or equal to 20.0 mol. %, greater than or equal to 0.0 mol. % and less than or equal to 15.0 mol. %, greater than or equal to 0.0 mol. % and less than or equal to 10.0 mol. %, greater than or equal to 0.0 mol. % and less than or equal to 5.0 mol. %, greater than or equal to 5.0 mol. % and less than or equal to 20.0 mol. %, greater than or equal to 5.0 mol. % and less than or equal to 15.0 mol. %, greater than or equal to 5.0 mol. % and less than or equal to 10.0 mol. %, greater than or equal to 10.0 mol. % and less than or equal to 20.0 mol. %, greater than or equal to 10.0 mol. % and less than or equal to 15.0 mol. %, greater than or equal to 3.0 mol. % and less than or equal to 14.0 mol. %, greater than or equal to 6.0 mol. % and less than or equal to 15.0 mol. %, or greater than or equal to 7.0 mol. % and less than or equal to 15.0 mol. %.

In some embodiments, the glass may have a refractive index $n_d$ from greater than or equal to 1.75 to less than or equal to 2.06 and all ranges and sub-ranges between the foregoing values. In some embodiments, the glass composition may have a refractive index $n_d$ greater than or equal to 1.75, greater than or equal to 1.76, greater than or equal to 1.78, greater than or equal to 1.80, greater than or equal to 1.85, greater than or equal to 1.91, greater than or equal to 1.95, greater than or equal to 2.00, greater than or equal to 2.02, greater than or equal to 2.04, or greater than or equal to 2.05. In some other embodiments, the glass composition may have a refractive index $n_d$ less than or equal to 2.06, less than or equal to 2.05, less than or equal to 2.04, less than or equal to 2.02, less than or equal to 2.00, less than or equal to 1.98, less than or equal to 1.95, less than or equal to 1.85, less than or equal to 1.80, less than or equal to 1.78, or less than or equal to 1.76. In some more embodiments, the glass composition may have a refractive index $n_d$ greater than or equal to 1.75 to 2.06, greater than or equal to 1.75 to 2.02, greater than or equal to 1.76 to 2.06, greater than or equal to 1.76 to 2.02, greater than or equal to 1.76 to 1.95, greater than or equal to 1.78 to 2.06, greater than or equal to 1.78 to 2.02, greater than or equal to 1.78 to 1.95, greater than or equal to 1.80 to 2.04, greater than or equal to 1.80 to 2.00, greater than or equal to 1.80 to 1.95, greater than or equal to 1.85 to 2.06, greater than or equal to 1.85 to 2.04, greater than or equal to 1.85 to 2.00, greater than or equal to 1.85 to 1.95, greater than or equal to 1.95 to 2.04, greater than or equal to 1.98 to 2.05, greater than or equal to 1.98 to 2.04, greater than or equal to 1.90 to 2.03, greater than or equal to 1.88 to 2.04, or greater than or equal to 1.91 to 2.03.

In some embodiments, the glass composition may have a density $d_{RT}$ less than or equal to 4.2 g/cm³. In some other embodiments, the glass composition may have a density $d_{RT}$ less than or equal to 4.2 g/cm³, less than or equal to 4.0 g/cm³, or less than or equal to 3.8 g/cm³.

In some embodiments, the glass composition may have a refraction $((n_d-1)/d_{RT})$ greater than or equal to 0.24. In some embodiments, the glass composition may have a refraction $((n_d-1)/d_{RT})$ greater than or equal to 0.24, or greater than or equal to 0.25.

In some embodiments, the glass composition may have a quantity $n_d-(1.54+0.1*d_{RT})$ greater than or equal to 0.00.

In some embodiments, the glass composition may have a quantity $n_d-(1.58+0.1*d_{RT})$ greater than or equal to 0.00.

In some other embodiments, the glass composition may have a quantity $v_d-(64.5-23.4*n_d)$ less than or equal to 0.00.

In some other embodiments, the glass composition may have a quantity $v_d-(63.7-23.4*n_d)$ less than or equal to 0.00.

Refractive index $n_d$, density $d_{RT}$, Abbe number $v_d$ and refraction are properties of a glass that can be predicted from the glass composition. A linear regression analysis of the exemplary glasses of the present disclosure in the EXAMPLES section below and other glass compositions reported in the literature was performed to determine equations that can predict the composition dependences of refractive index $n_d$, density $d_{RT}$, Abbe number $v_d$ and refraction.

The training dataset of glass compositions satisfying the criteria specified in Table 1 below and having measured values of the properties of interest, about 100 glass compositions for each property ($n_d$, $d_{RT}$, $v_d$, and refraction), was randomly selected from the literature data presented in the publicly available SciGlass Information System database and from the Exemplary Glasses from the embodiments presented herein. The linear regression analysis on the above-specified dataset was used to determine the formulas, with the exclusion of insignificant variables and outliers. The resulting formulas are presented in Table 2 below. Another part of glass compositions satisfying the same criteria was used as a validation set to evaluate the ability to interpolate within predefined compositional limits, which corresponds to the standard deviations specified in the Table 2. An external dataset of prior art glass compositions, also randomly selected from the SciGlass Information System database, was used to evaluate the ability to predict the properties outside of the specified compositional limits with a reasonable accuracy. Multiple iterations of this process were performed in order to determine the best variant for each property, corresponding to the above-mentioned regression formulas specified in the Table 2.

The data for the Comparative Glass compositions used in the linear regression modeling, including the training dataset, validation dataset and external dataset were obtained from the publicly available SciGlass Information System database. Formulas (I), (II), (Ill) and (IV) below were obtained from the linear regression analysis and used to predict the refractive index $n_d$, density $d_{RT}$, Abbe number $v_d$, and refraction, respectively, of the glasses:

$P_n = -0.0043794*P_2O_5 + 0.0072428*Nb_2O_5 + 0.0037304*TiO_2 - 0.00039553*BaO - 0.0032012*K_2O - 0.00060689*CaO - 0.0024218*Na_2O - 0.0014988*Li_2O + 0.0028587*WO_3 + 0.0083295*Bi_2O_3 - 0.0031637*B_2O_3 - 0.0030702*SiO_2 - 0.00030248*ZnO + 0.0020025*ZrO_2 - 0.0018173*MgO - 0.0032886*Al_2O_3 + 0.0024221*TeO_2 + 0.0038137*PbO - 0.0016392*GeO_2 + 0.0063024*Tl_2O + 0.0048765*Ag_2O + 1.81451$, (I)

$P_d[g/cm^3] = 3.98457 - 0.015773*Al_2O_3 - 0.014501*B_2O_3 + 0.019328*BaO + 0.060758*Bi_2O_3 - 0.0012685*CaO + 0.023111*CdO + 0.0053184*Cs_2O + 0.011488*Ga_2O_3 - 0.0015416*GeO_2 - 0.013342*K_2O + 0.058319*La_2O_3 - 0.007918*Li_2O - 0.0021423*MgO - 0.0024413*MoO_3 - 0.0082226*Na_2O + 0.0084961*Nb_2O_5 - 0.020501*P_2O_5 + 0.038898*PbO - 0.012720*SiO_2 + 0.013948*SrO + 0.047924*Ta_2O_5 + 0.011248*TeO_2 - 0.0092491*V_2O_5 + 0.028913*WO_3 + 0.0074702*ZnO + 0.0096721*ZrO_2$, (II)

$P_v = \exp(2.11 + 0.0438*(\exp(3.25980 + 0.0072248*Al_2O_3 + 0.0055494*B_2O_3 + 0.0024164*BaO - 0.00849*Bi_2O_3 + 0.0029812*CaO + 0.0092768*CdO + 0.0099821*Ga_2O_3 - 0.0038579*GeO_2 + 0.0028062*K_2O + 0.0031951*Li_2O + 0.0027011*MgO + 0.007976*MoO_3 + 0.0028705*Na_2O - 0.013374*Nb_2O_5 + 0.0072007*P_2O_5 - 0.0049796*PbO + 0.0032241*SiO_2 + 0.0050024*SrO - 0.002136*Ta_2O_5 - 0.0032329*TeO_2 - 0.009788*TiO_2 + 0.0074782*V_2O_5 - 0.0057095*WO_3 + 0.0032826*ZnO + 0.009302*ZrO_2)))$, (III)

$P_{ref}[cm^3/g] = 0.223637 + 0.0010703*Nb_2O_5 - 0.00041688*P_2O_5 + 0.00088482*TiO_2 + 0.000054956*CaO - 0.00029243*K_2O - 0.0008347*BaO - 0.00023739*Na_2O + 0.000082792*Li_2O - 0.0012487*WO_3 - 0.00042393*ZnO - 0.00059152*SrO - 0.00018266*MgO - 0.0014091*Bi_2O_3 - 0.0014895*Ta_2O_5 - 0.00021842*SiO_2 - 0.00024788*ZrO_2 - 0.00014801*B_2O_3 + 0.000060848*TeO_2 - 0.00085564*PbO - 0.00042429*GeO_2 - 0.0015439*Tl_2O - 0.0012936*Ag_2O - 0.00089356*Cu_2O - 0.00039278*CuO + 0.00017895*As_2O_3 - 0.00011802*Sb_2O_3$. (IV)

In Formulas (I), (II), (III) and (IV) and Tables 1 and 2, refractive index parameter $P_n$ is a parameter that predicts the refractive index $n_d$ from the concentrations of the components of the glass composition expressed in mol. %; density parameter $P_d$ is a parameter that predicts the density $d_{RT}$ from the concentrations of the components of the glass composition expressed in mol. %; dispersion parameter $P_v$ is a parameter that predicts the Abbe number $v_d$ from the concentrations of the components of the glass composition expressed in mol. %; and $P_{ref}$ is a parameter that predicts the refraction from the concentrations of the components of the glass composition expressed in mol. %. For dispersion parameter $P_v$, a logarithmic scale was applied when performing the regression analysis. In Formulas (I), (II), (III) and (IV), each component of the glass composition is listed in terms of its chemical formula, where the chemical formula refers to the concentration of the component expressed in mol. %. For example, for purposes of Formulas (I), (II), (III) and (IV), $P_2O_5$ refers to the concentration of $P_2O_5$, expressed in mol. %, in the glass composition. It is understood that not all components listed in Formulas (I), (II), (III), and (IV) are necessarily present in a particular glass composition and that Formulas (I), (II), (III), and (IV) are equally valid for glass compositions that contain less than all of the components listed in the formulas. It is further understood that Formulas (I), (II), (III), and (IV) are also valid for glass compositions within the scope and claims of the present disclosure that contain components in addition to the components listed in the formulas. If a component listed in Formulas (I), (II), (III), and (IV) is absent in a particular glass composition, the concentration of the component in the glass composition is 0 mol. % and the contribution of the component to the value calculated from the formulas is zero. In Table 1, $R_mO_n$ is a total sum of all oxides.

TABLE 1

Composition Space Used for Modeling

| | Property | | | | | | | |
|---|---|---|---|---|---|---|---|---|
| | $n_d$ | | $d_{RT}$ | | $v_d$ | | $(n_d - 1)/d_{RT}$ | |
| Component limits | Min, mol. % | Max, mol. % | Min, mol. % | Max, mol. % | Min, mol. % | Max, mol. % | Min, mol. % | Max, mol. % |
| $Nb_2O_5$ | 5 | 60 | 0 | 60 | 5 | 60 | 5 | 60 |
| $P_2O_5$ | 10 | 30 | 10 | 30 | 10 | 30 | 10 | 30 |
| $TiO_2$ | 0 | 40 | 0 | 40 | 0 | 40 | 0 | 40 |
| CaO | 0 | 40 | 0 | 40 | 0 | 40 | 0 | 40 |
| $K_2O$ | 0 | 20 | 0 | 20 | 0 | 20 | 0 | 20 |
| BaO | 0 | 20 | 0 | 20 | 0 | 20 | 0 | 20 |
| $Na_2O$ | 0 | 30 | 0 | 30 | 0 | 30 | 0 | 30 |
| $SiO_2$ | 0 | 20 | 0 | 20 | 0 | 20 | 0 | 20 |
| ZnO | 0 | 20 | 0 | 20 | 0 | 20 | 0 | 20 |
| $Li_2O$ | 0 | 10 | 0 | 10 | 0 | 10 | 0 | 10 |
| SrO | 0 | 30 | 0 | 30 | 0 | 30 | 0 | 30 |
| $ZrO_2$ | 0 | 10 | 0 | 10 | 0 | 10 | 0 | 10 |
| $WO_3$ | 0 | 15 | 0 | 15 | 0 | 15 | 0 | 15 |
| MgO | 0 | 10 | 0 | 10 | 0 | 10 | 0 | 10 |

TABLE 1-continued

Composition Space Used for Modeling

| | Property | | | | | | | |
|---|---|---|---|---|---|---|---|---|
| | $n_d$ | | $d_{RT}$ | | $v_d$ | | $(n_d - 1)/d_{RT}$ | |
| Component limits | Min, mol. % | Max, mol. % | Min, mol. % | Max, mol. % | Min, mol. % | Max, mol. % | Min, mol. % | Max, mol. % |
| $B_2O_3$ | 0 | 10 | 0 | 10 | 0 | 10 | 0 | 10 |
| $Al_2O_3$ | 0 | 5 | 0 | 5 | 0 | 5 | 0 | 5 |
| $R_mO_n$ | 99 | Not limited | 99 | Not limited | 99 | Not limited | 99 | Not limited |
| $TeO_2 + PbO + GeO_2 + Tl_2O$ | 0 | 20 | 0 | 20 | 0 | 20 | 0 | 20 |
| $Ag_2O + Cu_2O + CuO + As_2O_3 + Sb_2O_3$ | 0 | 15 | 0 | 15 | 0 | 15 | 0 | 15 |
| $P_2O_5 - SiO_2$ | 10 | Not limited | 10 | Not limited | 10 | Not limited | 10 | Not limited |
| $TiO_2 + Nb_2O_5 + WO_3 + GeO_2 + Bi_2O_3 + TeO_2$ | 25 | Not limited | Not limited | Not limited | Not limited | Not limited | 25 | Not limited |
| $TiO_2 + Nb_2O_5 + WO_3 + V_2O_5 + GeO_2 + Bi_2O_3 + TeO_2$ | Not limited | Not limited | 25 | Not limited | Not limited | Not limited | Not limited | Not limited |
| $V_2O_5$ | Not limited | Not limited | 0 | 80 | Not limited | Not limited | Not limited | Not limited |
| Other species | 0 | Not limited | 0 | Not limited | 0 | Not limited | 0 | Not limited |

TABLE 2

Property prediction models

| Property | Abbreviation | Unit | Predicting Parameter | Regression Formula | Standard error |
|---|---|---|---|---|---|
| Refractive index at 587.56 nm | $n_d$ | | $P_n$ | Formula (I) | 0.016 |
| Density at room temperature | $d_{RT}$ | g/cm³ | $P_d$ | Formula (II) | 0.20 |
| Abbe number | $v_d$ | | $P_v$ | Formula (III) | 0.66 |
| Refraction | $(n_d - 1)/d_{RT}$ | cm³/g | $P_{ref}$ | Formula (IV) | 0.0049 |

FIG. 1 is a plot of the parameter $P_n$ calculated by Formula (I) as a function of measured refractive index $n_d$ for some Literature Glasses ("Comp. Glasses") and some Exemplary Glasses ("Ex. Glasses"). As illustrated by the data in FIG. 1, the compositional dependence of the parameter $P_n$ had an error within a range of ±0.016 unit of the measured $n_d$ for the majority of glasses, that corresponds to the standard error specified in Table 2.

Figure 2:
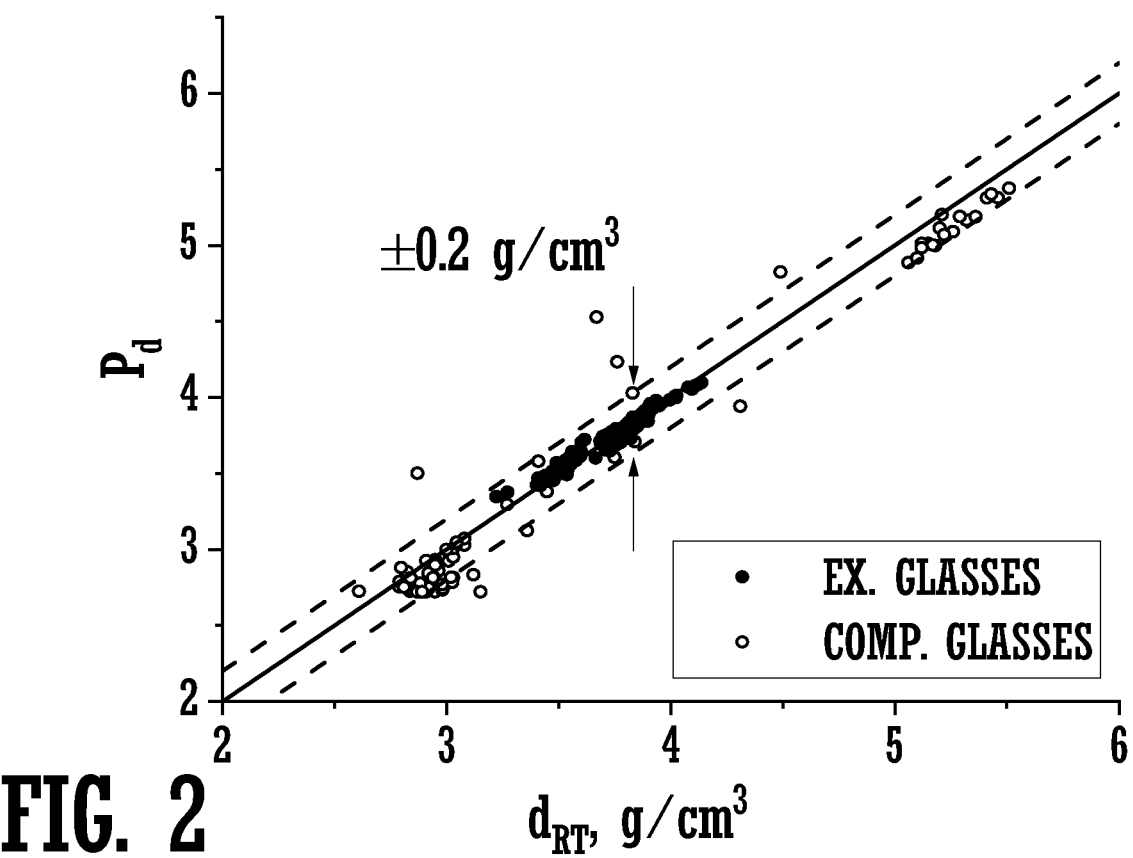
FIG. 2 is a plot illustrating the relationship between the density at room temperature $d_{RT}$ and the density parameter $P_d$ calculated by formula (II) for some Comparative Glasses and some Exemplary Glasses according to an embodiment of the present disclosure.

FIG. 2 is a plot of the parameter $P_d$ calculated by Formula (II) as a function of measured density $d_{RT}$ for some Literature Glasses ("Comp. Glasses") and some Exemplary Glasses ("Ex. Glasses"). As illustrated by the data in FIG. 2, the compositional dependence of the parameter $P_d$ had an error within a range of ±0.20 unit of the measured $d_{RT}$ for the majority of glasses, that corresponds to the standard error specified in Table 2.

Figure 3:
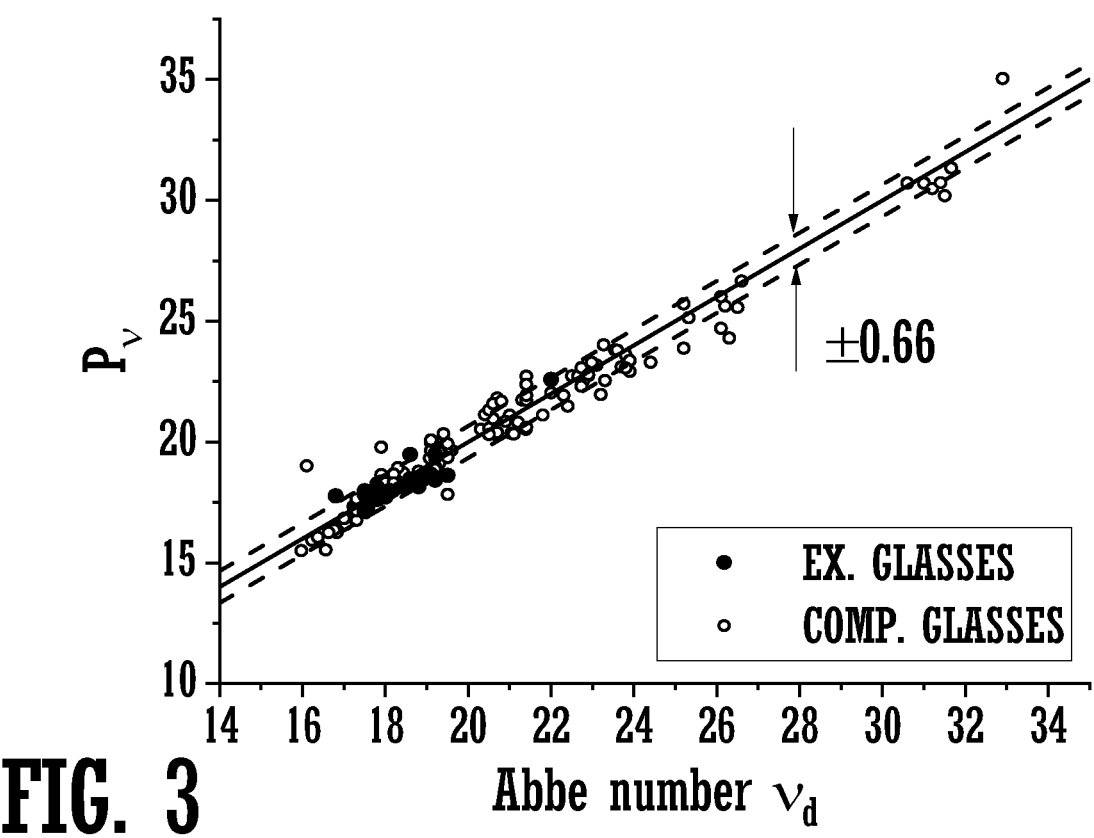
FIG. 3 is a plot illustrating the relationship between the Abbe number $v_d$ and the dispersion parameter $P_v$ calculated by formula (III) for some Comparative Glasses and some Exemplary Glasses according to an embodiment of the present disclosure.

FIG. 3 is a plot of the parameter $P_v$ calculated by Formula (III) as a function of measured Abbe number $v_d$ for some Literature Glasses ("Comp. Glasses") and some Exemplary Glasses ("Ex. Glasses"). As illustrated by the data in FIG. 3, the compositional dependence of the parameter $P_v$ had an error within a range of ±0.66 unit of the measured $v_d$ for the majority of glasses, that corresponds to the standard error specified in Table 2.

Figure 4:
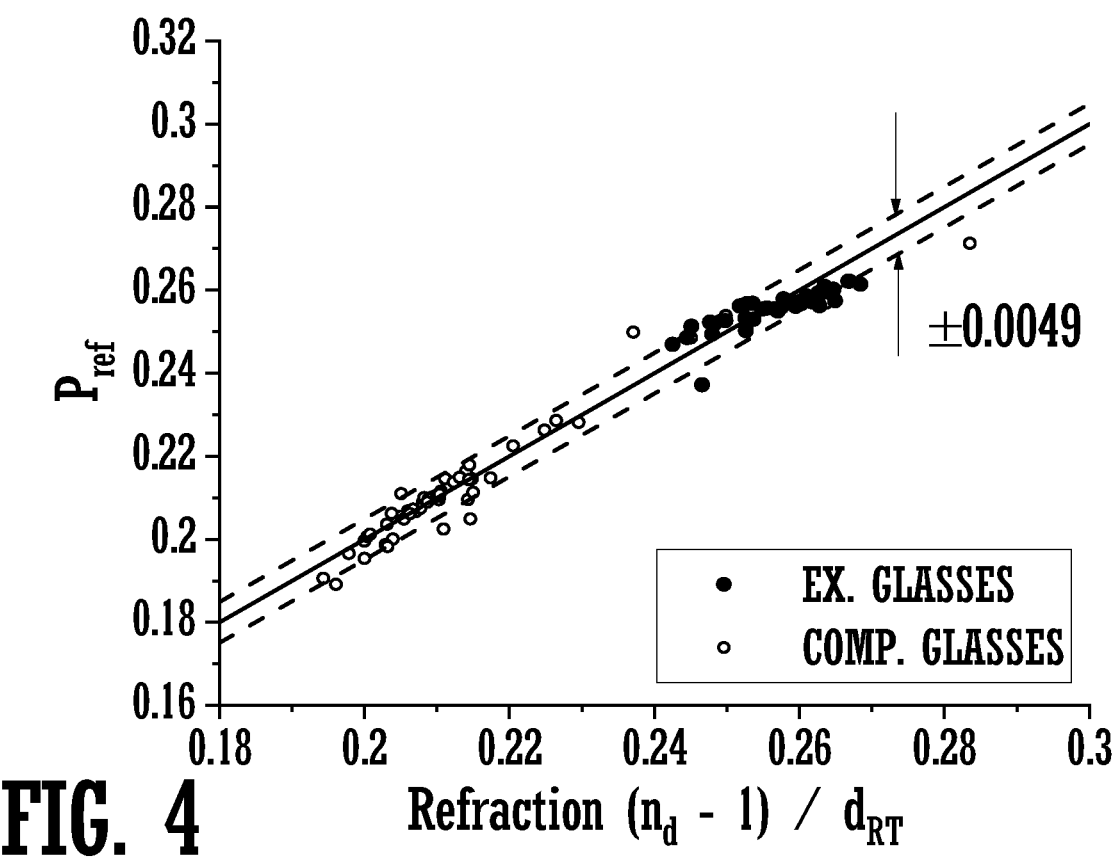
FIG. 4 is a plot illustrating the relationship between the refraction $(n_d-1)/d_{RT}$ and the parameter $P_{ref}$ calculated by formula (IV) for some Comparative Glasses and some Exemplary Glasses according to an embodiment of the present disclosure.

FIG. 4 is a plot of the parameter $P_{ref}$ calculated by Formula (IV) as a function of measured refraction $(n_d-1)/d_{RT}$ for some Literature Glasses ("Comp. Glasses") and some Exemplary Glasses ("Ex. Glasses"). As illustrated by the data in FIG. 4, the compositional dependence of the parameter $P_{ref}$ had an error within a range of ±0.0049 unit of the measured refraction $(n_d-1)/d_{RT}$ for the majority of glasses, that corresponds to the standard error specified in Table 2.

Table 3 identifies the combination of components and their respective amounts according to some embodiments of the present disclosure. The Exemplary Glasses A in Table 3 may include additional components according to any aspects of the present disclosure as described herein.

TABLE 3

Exemplary Glasses A

| Composition | Amount (mol. %) |
|---|---|
| $P_2O_5$ | 10.0 to 40.0 mol. % |
| $TiO_2$ | 0.5 to 50.0 mol. % |
| $K_2O$ | 0.5 to 35.0 mol. % |
| CaO | 0.5 to 35.0 mol. % |
| $Nb_2O_5$ | 0.0 to 50.0 mol. % |
| MgO | 0.0 to 15.0 mol. % |
| $Al_2O_3$ | 0.0 to 10.0 mol. % |
| Total sum of divalent metal oxides RO | ≥4.0 mol. % |
| Sum of $(TeO_2 + SnO_2 + SnO)$ | 0.0 to 20.0 mol. % |
| Sum of $(SiO_2 + GeO_2)$ | 0.0 to 15.0 mol. % |

Exemplary Glasses A according to embodiments of the present disclosure may satisfy the following formula:

$$n_d - (1.54 + 0.1 * d_{RT}) > 0.00,$$

where $n_d$ is a refractive index at 587.56 nm, and $d_{RT}$ is a density at room temperature expressed in units of g/cm³.

According to some embodiments of the present disclosure, Exemplary Glasses A may also satisfy the following formula:

$$n_d - (1.58 + 0.1 * d_{RT}) > 0.00,$$

where $n_d$ is a refractive index at 587.56 nm, and $d_{RT}$ is a density at room temperature expressed in units of g/cm$^3$.

Table 4 identifies the combination of components and their respective amounts according to some embodiments of the present disclosure. The Exemplary Glasses B in Table 4 may include additional components according to any aspects of the present disclosure as described herein.

TABLE 4

Exemplary Glasses B

| Composition | Amount (mol. %) |
| --- | --- |
| P$_2$O$_5$ | 10.0 to 40.0 mol. % |
| TiO$_2$ | 1.0 to 50.0 mol. % |
| K$_2$O | 1.0 to 35.0 mol. % |
| CaO | 1.0 to 35.0 mol. % |
| Nb$_2$O$_5$ | 0.0 to 50.0 mol. % |
| MgO | 0.0 to 15.0 mol. % |
| Al$_2$O$_3$ | 0.0 to 10.0 mol. % |
| Total sum of divalent metal oxides RO | ≥4.0 mol. % |
| Sum of (TeO$_2$ + SnO$_2$ + SnO) | 0.0 to 20.0 mol. % |
| Sum of (SiO$_2$ + GeO$_2$) | 0.0 to 15.0 mol. % |

Exemplary Glasses B according to embodiments of the present disclosure may have a refractive index $n_d$ of greater than or equal to 1.75.

According to some embodiments of the present disclosure, Exemplary Glasses B may also satisfy the following formula:

$$v_d - (64.5 - 23.4 * n_d) < 0.00,$$

where $v_d$ is an Abbe number, and $n_d$ is a refractive index at 587.56 nm.

According to some embodiments of the present disclosure, Exemplary Glasses B may also satisfy the following formula:

$$v_d - (63.7 - 23.4 * n_d) < 0.00,$$

where $v_d$ is an Abbe number, and $n_d$ is a refractive index at 587.56 nm.

EXAMPLES

The following examples describe various features and advantages provided by the disclosure, and are in no way intended to limit the invention and appended claims.

Figure 5:
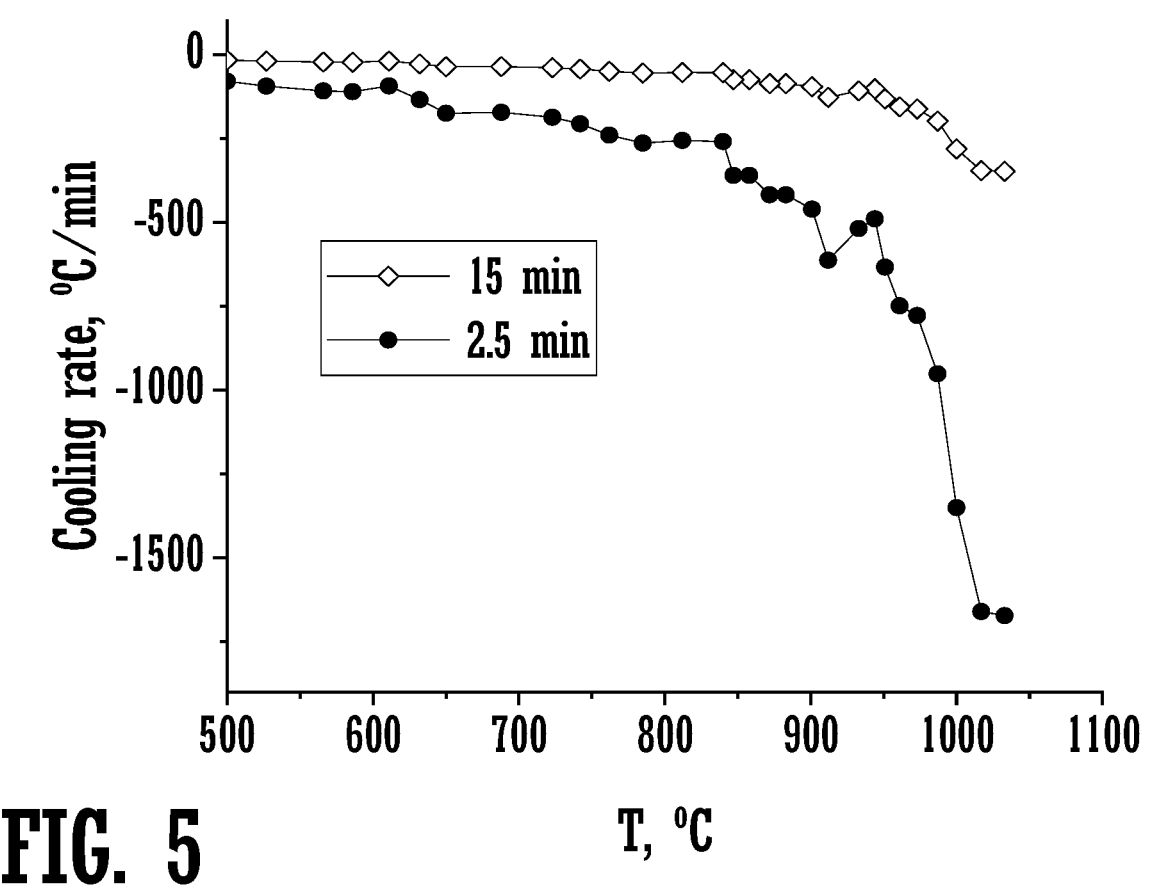
FIG. 5 is a plot of an exemplary cooling schedule according to a "15 min test" condition and a "2.5 min test" condition for some Exemplary Glasses according to an embodiment of the present disclosure.

To prepare the glass samples for some exemplary glasses of the present disclosure, about 15 grams of each sample (content of target species was more than 99.99 wt %) was melted from batch raw materials at a temperature of about 1300° C. in platinum or platinum-rhodium crucibles (Pt: Rh=80:20) for 1 hour. Two controlled cooling conditions were applied. In the first condition (referred to as "15 min test" or "15 min devit test"), the sample was left in the furnace after melting and the furnace was turned off to allow the sample to cool slowly in air. Under these conditions, it takes about 15 min for the samples to cool from 1100° C. to 500° C. In the second condition (referred to as "2.5 min test" or "2.5 min devit test"), the furnace was turned off and the sample was removed from the furnace at a temperature of 1100° C. and allowed to cool in air at room temperature. Under these conditions, it takes about 2.5 min for the samples to cool from 1100° C. to 500° C. Temperature readings were obtained by direct reading of the furnace temperature or using an IR camera reading with calibration scaling. The first condition (15 min test) approximately corresponds to the cooling rate of up to 300° C./min at a temperature of 1000° C. and the second test approximately corresponds to the cooling rate of up to 600° C./min at 1000° C. (near to this temperature, the cooling rate approached the maximum). When the temperature is lower, the cooling rate also decreases significantly. Typical schedules of the first and second cooling regimes are shown in FIG. 5. For these samples, observations referred to as "15-min devit test" and "2.5-min devit test", are specified in Table 5 below; the observation "1" is used to denote that a glass composition passed the indicated devit test, where a composition is deemed to have passed the indicated devit test if the volume fraction of the glassy part of the sample is more than that of the crystals. The observation "0" is used to denote that the crystal volume fraction is more than that of the glassy part.

To prepare other glass samples for exemplary glasses of the present disclosure, unless otherwise specified, a one kilogram of batch was prepared in a pure platinum crucible. The crucible was placed in a furnace set at a temperature of 1250° C., after which, the temperature in the furnace was raised to 1300° C. and held at 1300° C. for 2 hours. The furnace temperature was then reduced to 1250° C. and the glass was allowed to equilibrate at this temperature for an hour before being poured on a steel table followed by annealing at Tg for an hour. For some compositions, slight adjustments to temperatures and times were made to ensure complete melting. For example, for some compositions melting temperatures of 1350° C. or 1400° C. and/or hold times of up to 4 hours were used.

Some sample melts were also melted in a "one liter" platinum crucible heated by Joule effect. In this process, approximately 3700 g of raw materials was used. The crucible was filled in 1.5 hours at 1250° C. The temperature was then raised to 1300° C. and held for one hour. During this step, the glass was continuously stirred at 60 rpm. The temperature was then decreased to 1200° C. where it was allowed to equilibrate for 30 minutes and the stirring speed was decreased to 20 rpm. The delivery tube was heated at 1225° C. and the glass was casted on a cooled graphite table. The glass was formed into a bar of approximately 25 mm in thickness, 50 mm in width, and 90 cm in length. The prepared bars were inspected under an optical microscope to check for crystallization and were all crystal free. The glass quality observed under the optical microscope was good with the bars being free of striae and bubbles. The glass was placed at Tg in a lehr oven for 1 hour for a rough annealing. The bars were then annealed in a static furnace for one hour at Tg and the temperature was then lowered at 1° C./min.

No chemical analysis of the tested samples was performed because chemical analysis was performed for similar samples prepared in independent meltings by XRF method (X-ray fluorescence—for all oxides, except for B$_2$O$_3$ and Li$_2$O), by ICP method (inductively coupled plasma mass spectrometry—for B$_2$O$_3$) and by FES method (flame emission spectrometry—for Li$_2$O). These analyses gave deviations from the batched compositions within ±2.0 mass % for the major components such as Nb$_2$O$_5$ which is equivalently less than about 1 mol %.

In Tables 5 and 6, $n_{632.8\ nm}$ and $n_{531.9\ nm}$ refer to the refractive index at wavelengths of 632.8 nm and 531.9 nm, respectively. $T_x$ refers to the crystallization onset temperature.

TABLE 5

| Exemplary Glass Compositions | | | | | | | | | |
|---|---|---|---|---|---|---|---|---|---|
| Exemplary Glass | | 1 | 2 | 3 | 4 | 5 | 6 | 7 | 8 |
| Composition - mol. % | | | | | | | | | |
| $P_2O_5$ | mol. % | 31.01 | 29.98 | 24.95 | 24.99 | 25.00 | 25.00 | 25.00 | 24.99 |
| $Nb_2O_5$ | mol. % | 10.00 | 34.98 | 20.96 | 37.00 | 36.99 | 39.00 | 38.99 | 34.00 |
| $TiO_2$ | mol. % | 30.01 | 10.01 | 19.96 | 9.99 | 10.01 | 9.99 | 10.01 | 15.00 |
| BaO | mol. % | 7.00 | 0 | 0 | 6.00 | 9.99 | 4.99 | 8.00 | 5.00 |
| $Na_2O$ | mol. % | 14.96 | 11.11 | 0.0639 | 6.98 | 6.97 | 6.97 | 6.98 | 4.98 |
| $K_2O$ | mol. % | 5.00 | 6.45 | 14.98 | 7.99 | 8.00 | 8.00 | 7.99 | 5.01 |
| CaO | mol. % | 2.00 | 7.43 | 18.97 | 7.00 | 2.99 | 6.01 | 2.99 | 6.01 |
| $Al_2O_3$ | mol. % | 0.0118 | 0.0158 | 0.0259 | 0 | 0 | 0 | 0 | 0 |
| $CeO_2$ | mol. % | 0.007 | 0 | 0 | 0 | 0 | 0 | 0 | 0 |
| $Ta_2O_5$ | mol. % | 0.0027 | 0.0328 | 0.0209 | 0.034 | 0.0348 | 0.0347 | 0.0353 | 0.0322 |
| MgO | mol. % | 0 | 0 | 0.0655 | 0 | 0 | 0 | 0 | 0 |
| SrO | mol. % | 0 | 0 | 0 | 0.0161 | 0.0165 | 0 | 0 | 0 |
| $Li_2O$ | mol. % | 0 | 0 | 0 | 0 | 0 | 0 | 0 | 4.98 |
| Measured properties | | | | | | | | | |
| $n_d$ | | 1.8068 | | 1.8696 | 1.966 | 1.953 | 1.9842 | 1.9686 | 1.9829 |
| $d_{RT}$ | g/cm³ | 3.272 | 3.487 | | 3.808 | 3.843 | 3.822 | 3.835 | 3.777 |
| $n_{632.8\ nm}$ | | 1.7995 | | 1.8604 | 1.9561 | 1.9434 | 1.9738 | 1.9585 | 1.9726 |
| $n_{531.9\ nm}$ | | 1.8190 | | 1.8852 | 1.9830 | 1.9694 | 2.0021 | 1.9859 | 2.0007 |
| $n_F$ | | 1.8331 | | | 2.0023 | 1.9882 | 2.0224 | 2.0057 | 2.0210 |
| $T_g$ | ° C. | 624.40 | | | | | | | |
| $T_x$ | ° C. | 767.60 | | | | | | | |
| $v_d$ | | 22.0 | | | 19.1 | 19.5 | 18.5 | 18.8 | 18.6 |
| $(n_d - 1)/d_{RT}$ | | 0.24657 | | | 0.25367 | 0.24798 | 0.25751 | 0.25256 | 0.26024 |
| Predicted and calculated properties | | | | | | | | | |
| $P_n$ [for $n_d$] | | 1.807 | 1.922 | 1.872 | 1.961 | 1.962 | 1.977 | 1.977 | 1.966 |
| $P_d$ [for $d_{RT}$] | g/cm³ | 3.377 | 3.482 | 3.427 | 3.732 | 3.814 | 3.730 | 3.792 | 3.704 |
| $P_v$ [for $v_d$] | | 22.59 | 19.57 | 21.05 | 18.66 | 18.62 | 18.18 | 18.15 | 18.47 |
| $P_n - (1.54 + 0.1 * P_d)$ | | −0.0709 | 0.0336 | −0.0110 | 0.0481 | 0.0407 | 0.0637 | 0.0581 | 0.0556 |
| $P_n - (1.58 + 0.1 * P_d)$ | | −0.1109 | −0.0064 | −0.0510 | 0.0081 | 6.900E−04 | 0.0237 | 0.0181 | 0.0156 |
| $P_v - (64.5 - 23.4 * P_n)$ | | 0.3682 | 0.0422 | 0.3460 | 0.0478 | 0.0318 | −0.0665 | −0.0767 | −0.0268 |
| $P_v - (63.7 - 23.4 * P_n)$ | | 1.168 | 0.8422 | 1.146 | 0.8478 | 0.8318 | 0.7335 | 0.7233 | 0.7732 |
| Exemplary Glass | | 9 | 10 | 11 | 12 | 13 | 14 | 15 | 16 |
| Composition - mol. % | | | | | | | | | |
| $P_2O_5$ | mol. % | 25.00 | 24.99 | 24.99 | 24.99 | 24.99 | 24.99 | 24.09 | 24.99 |
| $Nb_2O_5$ | mol. % | 33.99 | 34.00 | 36.98 | 36.98 | 37.99 | 37.98 | 26.07 | 38.99 |
| $TiO_2$ | mol. % | 15.00 | 15.01 | 8.01 | 5.99 | 8.01 | 6.00 | 20.05 | 10.00 |
| BaO | mol. % | 5.00 | 8.00 | 9.99 | 10.00 | 6.00 | 6.00 | 0 | 3.00 |
| $Na_2O$ | mol. % | 6.98 | 6.98 | 6.99 | 6.98 | 6.98 | 6.99 | 0 | 6.98 |
| $K_2O$ | mol. % | 7.99 | 8.00 | 7.99 | 8.00 | 8.01 | 8.00 | 4.93 | 8.00 |
| CaO | mol. % | 6.00 | 3.01 | 2.49 | 2.01 | 5.49 | 5.01 | 24.84 | 8.01 |
| $Ta_2O_5$ | mol. % | 0.0328 | 0.0297 | 0.0356 | 0.0323 | 0.0352 | 0.036 | 0.025 | 0.0381 |
| SrO | mol. % | 0 | 0 | 0.0169 | 0.0172 | 0 | 0 | 0 | 0 |
| $WO_3$ | mol. % | 0 | 0 | 2.50 | 5.00 | 2.50 | 5.00 | 0 | 0 |
| Measured properties | | | | | | | | | |
| $n_d$ | | 1.9612 | 1.9548 | | | | | 1.9505 | |
| $d_{RT}$ | g/cm³ | 3.740 | 3.777 | 3.901 | 3.957 | 3.852 | 3.886 | | 3.758 |
| $n_{632.8\ nm}$ | | 1.9513 | 1.9451 | | | | | 1.9405 | |
| $n_{531.9\ nm}$ | | 1.9783 | 1.9716 | | | | | 1.9676 | |
| $n_F$ | | 1.9979 | 1.9906 | | | | | 1.9872 | |
| $T_g$ | ° C. | | | | | | | 673.30 | |
| $T_x$ | ° C. | | | | | | | 771.00 | |
| $v_d$ | | 18.9 | 19.2 | | | | | 18.6 | |
| $(n_d - 1)/d_{RT}$ | | 0.25701 | 0.25281 | | | | | | |
| Predicted and calculated properties | | | | | | | | | |
| $P_n$ [for $n_d$] | | 1.959 | 1.960 | 1.962 | 1.962 | 1.969 | 1.969 | 1.942 | 1.976 |
| $P_d$ [for $d_{RT}$] | g/cm³ | 3.688 | 3.749 | 3.887 | 3.959 | 3.814 | 3.887 | 3.616 | 3.689 |
| $P_v$ [for $v_d$] | | 18.44 | 18.42 | 18.68 | 18.74 | 18.46 | 18.53 | 19.48 | 18.20 |
| $P_n - (1.54 + 0.1 * P_d)$ | | 0.0503 | 0.0449 | 0.0333 | 0.0260 | 0.0477 | 0.0402 | 0.0401 | 0.0673 |
| $P_n - (1.58 + 0.1 * P_d)$ | | 0.0103 | 0.0049 | −0.0067 | −0.0140 | 0.0077 | 2.200E−04 | 1.200E−04 | 0.0273 |
| $P_v - (64.5 - 23.4 * P_n)$ | | −0.2159 | −0.2263 | 0.0902 | 0.1497 | 0.0397 | 0.0982 | 0.4111 | −0.0605 |
| $P_v - (63.7 - 23.4 * P_n)$ | | 0.5841 | 0.5737 | 0.8902 | 0.9497 | 0.8397 | 0.8982 | 1.211 | 0.7395 |

TABLE 5-continued

Exemplary Glass Compositions

| Exemplary Glass | | 17 | 18 | 19 | 20 | 21 | 22 | 23 | 24 |
|---|---|---|---|---|---|---|---|---|---|
| Composition - mol. % | | | | | | | | | |
| $P_2O_5$ | mol. % | 25.00 | 24.49 | 24.49 | 24.50 | 24.30 | 24.99 | 25.10 | 25.10 |
| $Nb_2O_5$ | mol. % | 39.00 | 34.99 | 34.99 | 34.99 | 34.99 | 27.99 | 33.09 | 26.06 |
| $TiO_2$ | mol. % | 9.99 | 14.99 | 15.00 | 15.01 | 13.00 | 22.00 | 13.04 | 20.06 |
| BaO | mol. % | 1.00 | 4.50 | 2.50 | 2.50 | 2.20 | 0 | 0 | 0 |
| $Na_2O$ | mol. % | 6.98 | 4.99 | 4.98 | 6.97 | 6.99 | 0.0232 | 0.0249 | 0.0227 |
| $K_2O$ | mol. % | 8.00 | 4.99 | 5.00 | 8.01 | 8.00 | 5.00 | 9.93 | 9.93 |
| CaO | mol. % | 9.99 | 6.00 | 8.00 | 7.99 | 7.99 | 19.98 | 18.79 | 18.80 |
| $Ta_2O_5$ | mol. % | 0.0376 | 0.0325 | 0.0321 | 0.0326 | 0.0333 | 0.026 | 0.0314 | 0.0255 |
| $Li_2O$ | mol. % | 0 | 5.02 | 5.01 | 0 | 0 | 0 | 0 | 0 |
| $WO_3$ | mol. % | 0 | 0 | 0 | 0 | 2.50 | 0 | 0 | 0 |
| Measured properties | | | | | | | | | |
| $n_d$ | | | | | | | 1.9623 | 1.9502 | 1.9303 |
| $d_{RT}$ | g/cm³ | 3.729 | 3.768 | 3.734 | 3.712 | 3.767 | | | |
| $n_{632.8\ nm}$ | | | | | | | 1.9510 | 1.9402 | 1.9210 |
| $n_{531.9\ nm}$ | | | | | | | 1.9819 | 1.9683 | 1.9472 |
| $n_F$ | | | | | | | 2.0044 | 1.9875 | 1.9648 |
| 15-min devit test (0/1) | | | | | | | 1 | 1 | 1 |
| Predicted and calculated properties | | | | | | | | | |
| $P_n$ [for $n_d$] | | 1.976 | 1.976 | 1.975 | 1.968 | 1.969 | 1.962 | 1.950 | 1.925 |
| $P_d$ [for $d_{RT}$] | g/cm³ | 3.648 | 3.713 | 3.672 | 3.655 | 3.726 | 3.619 | 3.596 | 3.536 |
| $P_v$ [for $v_d$] | | 18.21 | 18.21 | 18.22 | 18.19 | 18.24 | 18.64 | 19.11 | 19.53 |
| $P_n - (1.54 + 0.1 * P_d)$ | | 0.0711 | 0.0643 | 0.0680 | 0.0628 | 0.0563 | 0.0598 | 0.0500 | 0.0313 |
| $P_n - (1.58 + 0.1 * P_d)$ | | 0.0311 | 0.0243 | 0.0280 | 0.0228 | 0.0163 | 0.0198 | 0.0100 | -0.0087 |
| $P_v - (64.5 - 23.4 * P_n)$ | | -0.0542 | -0.0664 | -0.0609 | -0.2507 | -0.1891 | 0.0395 | 0.2356 | 0.0732 |
| $P_v - (63.7 - 23.4 * P_n)$ | | 0.7458 | 0.7336 | 0.7391 | 0.5493 | 0.6109 | 0.8395 | 1.036 | 0.8732 |

| Exemplary Glass | | 25 | 26 | 27 | 28 | 29 | 30 | 31 | 32 |
|---|---|---|---|---|---|---|---|---|---|
| Composition - mol. % | | | | | | | | | |
| $P_2O_5$ | mol. % | 24.98 | 24.29 | 23.49 | 24.29 | 23.49 | 24.99 | 24.99 | 24.99 |
| $Nb_2O_5$ | mol. % | 22.98 | 34.88 | 35.69 | 39.87 | 40.79 | 39.00 | 38.99 | 34.00 |
| $TiO_2$ | mol. % | 20.00 | 15.61 | 16.30 | 10.59 | 11.20 | 10.00 | 10.01 | 14.99 |
| BaO | mol. % | 0 | 5.00 | 5.10 | 5.00 | 5.10 | 6.00 | 7.00 | 7.00 |
| $Na_2O$ | mol. % | 0.0437 | 4.49 | 4.08 | 6.99 | 7.09 | 5.98 | 4.97 | 3.98 |
| $K_2O$ | mol. % | 12.98 | 5.11 | 5.10 | 7.11 | 6.20 | 7.00 | 6.00 | 4.00 |
| CaO | mol. % | 18.95 | 6.10 | 6.09 | 6.11 | 6.09 | 7.00 | 8.00 | 8.00 |
| $Al_2O_3$ | mol. % | 0.0133 | 0 | 0 | 0 | 0 | 0 | 0 | 0 |
| $Ta_2O_5$ | mol. % | 0.0215 | 0.0326 | 0.0328 | 0.0388 | 0.039 | 0.0348 | 0.0349 | 0.0327 |
| MgO | mol. % | 0.0336 | 0 | 0 | 0 | 0 | 0 | 0 | 0 |
| $Li_2O$ | mol. % | 0 | 4.49 | 4.10 | 0 | 0 | 0 | 0 | 3.00 |
| Measured properties | | | | | | | | | |
| $n_d$ | | 1.8937 | 1.9868 | 1.9996 | 1.9843 | 2.0006 | 1.976 | 1.9806 | 1.9777 |
| $d_{RT}$ | g/cm³ | | 3.781 | | 3.818 | | 3.819 | 3.848 | 3.809 |
| $n_{632.8\ nm}$ | | 1.8848 | 1.9764 | 1.9888 | 1.9741 | 1.9895 | 1.9659 | 1.9703 | 1.9676 |
| $n_{531.9\ nm}$ | | 1.9095 | 2.0042 | 2.0179 | 2.0016 | 2.0192 | 1.9930 | 1.9980 | 1.9947 |
| $n_F$ | | 1.9264 | | | | | | | |
| $(n_d - 1)/d_{RT}$ | | | 0.26098 | | 0.25782 | | 0.25557 | 0.25484 | 0.25668 |
| 15-min devit test (0/1) | | 1 | | | | | | | |
| Predicted and calculated properties | | | | | | | | | |
| $P_n$ [for $n_d$] | | 1.893 | 1.979 | 1.993 | 1.991 | 2.006 | 1.981 | 1.986 | 1.973 |
| $P_d$ [for $d_{RT}$] | g/cm³ | 3.471 | 3.733 | 3.765 | 3.764 | 3.801 | 3.770 | 3.809 | 3.778 |
| $P_v$ [for $v_d$] | | 20.42 | 18.10 | 17.74 | 17.83 | 17.48 | 18.17 | 18.17 | 18.45 |
| $P_n - (1.54 + 0.1 * P_d)$ | | 0.0058 | 0.0661 | 0.0764 | 0.0747 | 0.0860 | 0.0644 | 0.0650 | 0.0549 |
| $P_n - (1.58 + 0.1 * P_d)$ | | -0.0342 | 0.0261 | 0.0364 | 0.0347 | 0.0460 | 0.0244 | 0.0250 | 0.0149 |
| $P_v - (64.5 - 23.4 * P_n)$ | | 0.2097 | -0.0829 | -0.1229 | -0.0775 | -0.0756 | 0.0372 | 0.1410 | 0.1100 |
| $P_v - (63.7 - 23.4 * P_n)$ | | 1.010 | 0.7171 | 0.6771 | 0.7225 | 0.7244 | 0.8372 | 0.9410 | 0.9100 |

| Exemplary Glass | | 33 | 34 | 35 | 36 | 37 | 38 | 39 | 40 |
|---|---|---|---|---|---|---|---|---|---|
| Composition - mol. % | | | | | | | | | |
| $P_2O_5$ | mol. % | 25.00 | 24.99 | 25.00 | 24.99 | 24.29 | 24.06 | 23.97 | 23.92 |
| $Nb_2O_5$ | mol. % | 32.50 | 32.48 | 32.50 | 32.48 | 37.49 | 28.04 | 27.91 | 26.85 |
| $TiO_2$ | mol. % | 20.00 | 20.01 | 20.00 | 20.01 | 10.99 | 22.04 | 21.94 | 20.89 |
| BaO | mol. % | 5.70 | 2.50 | 5.70 | 2.50 | 2.10 | 0 | 5.92 | 7.90 |
| $Na_2O$ | mol. % | 3.98 | 4.00 | 3.98 | 4.00 | 4.49 | 0.0232 | 0.70 | 0.94 |
| $K_2O$ | mol. % | 4.00 | 4.00 | 4.00 | 4.00 | 5.10 | 7.95 | 7.86 | 7.85 |
| CaO | mol. % | 5.80 | 9.00 | 5.80 | 9.00 | 7.99 | 17.86 | 11.66 | 11.64 |
| $Ta_2O_5$ | mol. % | 0.0284 | 0.0314 | 0.0284 | 0.0314 | 0.0339 | 0.0261 | 0.027 | 0.0236 |

TABLE 5-continued

Exemplary Glass Compositions

| | | | | | | | | | |
|---|---|---|---|---|---|---|---|---|---|
| Li$_2$O | mol. % | 3.00 | 2.99 | 3.00 | 2.99 | 4.52 | 0 | 0 | 0 |
| WO$_3$ | mol. % | 0 | 0 | 0 | 0 | 3.00 | 0 | 0 | 0 |

Measured properties

| | | | | | | | | | |
|---|---|---|---|---|---|---|---|---|---|
| n$_d$ | | 1.9888 | 1.9901 | 1.989 | 1.9902 | 1.9922 | | | |
| d$_{RT}$ | g/cm$^3$ | 3.761 | 3.710 | 3.766 | 3.712 | 3.824 | 3.665 | 3.734 | 3.728 |
| n$_{632.8\ nm}$ | | 1.9780 | 1.9793 | 1.9782 | 1.9795 | 1.9816 | | | |
| n$_{531.9\ nm}$ | | 2.0075 | 2.0088 | 2.0077 | 2.0086 | 2.0106 | | | |
| n$_F$ | | 2.0289 | 2.0302 | 2.0290 | 2.0296 | 2.0317 | | | |
| T$_g$ | ° C. | | | | | | 677.30 | 677.10 | 674.20 |
| T$_x$ | ° C. | | | | | | 765.30 | 773.50 | 783.00 |
| v$_d$ | | 17.8 | 17.8 | 17.8 | 18.1 | 18.1 | | | |
| (n$_d$ − 1)/d$_{RT}$ | | 0.26291 | 0.26688 | 0.26262 | 0.26675 | 0.25947 | | | |
| 15-min devit test (0/1) | | | | | | | 1 | 1 | 1 |

Predicted and calculated properties

| | | | | | | | | | |
|---|---|---|---|---|---|---|---|---|---|
| P$_n$ [for n$_d$] | | 1.982 | 1.982 | 1.982 | 1.982 | 1.990 | 1.958 | 1.957 | 1.945 |
| P$_d$ [for d$_{RT}$] | g/cm$^3$ | 3.742 | 3.677 | 3.742 | 3.677 | 3.783 | 3.602 | 3.721 | 3.749 |
| P$_v$ [for v$_d$] | | 17.90 | 17.92 | 17.90 | 17.92 | 17.99 | 18.55 | 18.54 | 19.00 |
| P$_n$ − (1.54 + 0.1 * P$_d$) | | 0.0681 | 0.0738 | 0.0681 | 0.0738 | 0.0713 | 0.0579 | 0.0452 | 0.0297 |
| P$_n$ − (1.58 + 0.1 * P$_d$) | | 0.0281 | 0.0338 | 0.0281 | 0.0338 | 0.0313 | 0.0179 | 0.0052 | −0.0103 |
| P$_v$ − (64.5 − 23.4 * P$_n$) | | −0.2188 | −0.2097 | −0.2188 | −0.2097 | 0.0415 | −0.1315 | −0.1584 | −5.300E−05 |
| P$_v$ − (63.7 − 23.4 * P$_n$) | | 0.5812 | 0.5903 | 0.5812 | 0.5903 | 0.8415 | 0.6685 | 0.6416 | 0.7999 |

| Exemplary Glass | | 41 | 42 | 43 | 44 | 45 | 46 | 47 | 48 |
|---|---|---|---|---|---|---|---|---|---|

Composition - mol. %

| | | | | | | | | | |
|---|---|---|---|---|---|---|---|---|---|
| P$_2$O$_5$ | mol. % | 24.70 | 25.00 | 25.00 | 25.00 | 25.00 | 24.99 | 25.00 | 25.00 |
| Nb$_2$O$_5$ | mol. % | 34.59 | 32.50 | 32.51 | 32.51 | 32.49 | 32.48 | 29.99 | 27.50 |
| TiO$_2$ | mol. % | 9.89 | 21.00 | 21.00 | 20.01 | 20.00 | 20.00 | 24.00 | 28.00 |
| BaO | mol. % | 9.86 | 5.70 | 5.70 | 4.70 | 5.21 | 4.70 | 4.21 | 5.71 |
| Na$_2$O | mol. % | 1.16 | 3.99 | 3.98 | 3.99 | 3.99 | 4.00 | 3.98 | 3.98 |
| K$_2$O | mol. % | 4.94 | 4.00 | 4.01 | 4.00 | 4.01 | 4.01 | 4.00 | 4.01 |
| CaO | mol. % | 14.82 | 5.81 | 4.80 | 4.79 | 5.30 | 4.80 | 5.80 | 2.81 |
| Ta$_2$O$_5$ | mol. % | 0.0334 | 0 | 0 | 2.00 | 0 | 0 | 0.0274 | 0.0269 |
| Li$_2$O | mol. % | 0 | 2.00 | 3.00 | 3.01 | 3.01 | 3.02 | 2.99 | 2.98 |
| Bi$_2$O$_3$ | mol. % | 0 | 0 | 0 | 0 | 1.00 | 2.00 | 0 | 0 |

Measured properties

| | | | | | | | | | |
|---|---|---|---|---|---|---|---|---|---|
| n$_d$ | | | 1.9993 | 1.9976 | 2.0021 | 2.0014 | 2.0086 | 1.9905 | 1.949 |
| d$_{RT}$ | g/cm$^3$ | 3.831 | 3.777 | 3.769 | 3.854 | 3.835 | 3.898 | 3.690 | 3.602 |
| n$_{632.8\ nm}$ | | | 1.9885 | 1.9868 | 1.9913 | 1.9905 | 1.9975 | 1.9791 | 1.9386 |
| n$_{531.9\ nm}$ | | | 2.0181 | 2.0163 | 2.0210 | 2.0203 | 2.0279 | 2.0104 | 1.9669 |
| n$_F$ | | | 2.0395 | 2.0377 | 2.0425 | 2.0418 | 2.0498 | 2.0332 | 1.9873 |
| v$_d$ | | | 17.9 | 18.0 | 17.9 | 17.9 | 17.7 | 16.8 | 17.8 |
| (n$_d$ − 1)/d$_{RT}$ | | | 0.26458 | 0.26469 | 0.26003 | 0.26113 | 0.25876 | 0.26843 | 0.26346 |

Predicted and calculated properties

| | | | | | | | | | |
|---|---|---|---|---|---|---|---|---|---|
| P$_n$ [for n$_d$] | | 1.962 | 1.988 | 1.987 | 1.983 | 1.991 | 2.000 | 1.980 | 1.978 |
| P$_d$ [for d$_{RT}$] | g/cm$^3$ | 3.870 | 3.749 | 3.742 | 3.819 | 3.793 | 3.844 | 3.692 | 3.704 |
| P$_v$ [for v$_d$] | | 19.26 | 17.72 | 17.72 | 17.76 | 17.75 | 17.60 | 17.77 | 17.62 |
| P$_n$ − (1.54 + 0.1 * P$_d$) | | 0.0352 | 0.0726 | 0.0724 | 0.0615 | 0.0717 | 0.0753 | 0.0705 | 0.0674 |
| P$_n$ − (1.58 + 0.1 * P$_d$) | | −0.0048 | 0.0326 | 0.0324 | 0.0215 | 0.0317 | 0.0353 | 0.0305 | 0.0274 |
| P$_v$ − (64.5 − 23.4 * P$_n$) | | 0.6781 | −0.2728 | −0.2919 | −0.3279 | −0.1649 | −0.1086 | −0.4076 | −0.6023 |
| P$_v$ − (63.7 − 23.4 * P$_n$) | | 1.478 | 0.5272 | 0.5081 | 0.4721 | 0.6351 | 0.6914 | 0.3924 | 0.1977 |

| Exemplary Glass | | 49 | 50 | 51 | 52 | 53 | 54 | 55 | 56 |
|---|---|---|---|---|---|---|---|---|---|

Composition - mol. %

| | | | | | | | | | |
|---|---|---|---|---|---|---|---|---|---|
| P$_2$O$_5$ | mol. % | 24.99 | 24.99 | 24.99 | 23.34 | 23.33 | 23.28 | 24.79 | 23.35 |
| Nb$_2$O$_5$ | mol. % | 29.31 | 28.49 | 27.67 | 31.96 | 31.95 | 31.91 | 29.94 | 30.96 |
| TiO$_2$ | mol. % | 29.31 | 28.50 | 27.67 | 20.96 | 20.96 | 20.95 | 21.85 | 21.97 |
| BaO | mol. % | 0 | 0 | 0 | 6.99 | 7.98 | 7.48 | 6.26 | 7.99 |
| Na$_2$O | mol. % | 0 | 0 | 0 | 0 | 0 | 2.65 | 4.24 | 0 |
| K$_2$O | mol. % | 11.78 | 8.83 | 5.89 | 8.49 | 5.49 | 3.99 | 4.62 | 6.50 |
| CaO | mol. % | 4.59 | 9.16 | 13.76 | 8.24 | 8.26 | 7.73 | 8.19 | 7.21 |
| Al$_2$O$_3$ | mol. % | 0 | 0 | 0 | 0 | 0 | 0 | 0.0148 | 0 |
| Ta$_2$O$_5$ | mol. % | 0.0273 | 0.0267 | 0.0262 | 0.0287 | 0.0285 | 0.0283 | 0.0277 | 0.0283 |
| SrO | mol. % | 0 | 0 | 0 | 0 | 0 | 0 | 0.054 | 0 |
| Li$_2$O | mol. % | 0 | 0 | 0 | 0 | 2.00 | 1.99 | 0 | 1.99 |
| Fe$_2$O$_3$ | mol. % | 0 | 0 | 0 | 0 | 0 | 0 | 0.0028 | 0 |

Measured properties

| | | | | | | | | | |
|---|---|---|---|---|---|---|---|---|---|
| n$_d$ | | | | | | 2.001 | | 1.9818 | |
| d$_{RT}$ | g/cm$^3$ | 3.555 | 3.578 | 3.597 | 3.811 | 3.849 | 3.706 | 3.796 | |
| n$_{632.8\ nm}$ | | | | | | 1.9901 | | 1.9711 | |

TABLE 5-continued

Exemplary Glass Compositions

| | | | | | | 2.0196 | | 2.0001 | | |
|---|---|---|---|---|---|---|---|---|---|---|
| $n_{531.9\,nm}$ | | | | | | 2.0417 | | 2.0218 | | |
| $n_F$ | | | | | | | | | | |
| $T_{liq}$ | °C. | | | | 1175.0 | 1180.0 | 1205.0 | 1150.0 | | 1170.0 |
| $v_d$ | | | | | | 17.8 | | 17.8 | | |
| $(n_d - 1)/d_{RT}$ | | | | | | 0.26266 | | 0.26493 | | |

Predicted and calculated properties

| | | | | | | | | | |
|---|---|---|---|---|---|---|---|---|---|
| $P_n$ [for $n_d$] | | 1.986 | 1.984 | 1.982 | 1.987 | 1.993 | 1.992 | 1.972 | 1.987 |
| $P_d$ [for $d_{RT}$] | g/cm³ | 3.560 | 3.586 | 3.613 | 3.790 | 3.834 | 3.824 | 3.747 | 3.813 |
| $P_v$ [for $v_d$] | | 17.04 | 17.35 | 17.67 | 17.73 | 17.74 | 17.75 | 18.13 | 17.78 |
| $P_n - (1.54 + 0.1 * P_d)$ | | 0.0902 | 0.0853 | 0.0802 | 0.0680 | 0.0698 | 0.0696 | 0.0571 | 0.0658 |
| $P_n - (1.58 + 0.1 * P_d)$ | | 0.0502 | 0.0453 | 0.0402 | 0.0280 | 0.0298 | 0.0296 | 0.0171 | 0.0258 |
| $P_v - (64.5 - 23.4 * P_n)$ | | -0.9800 | -0.7278 | -0.4604 | -0.2748 | -0.1237 | -0.1397 | -0.2355 | -0.2223 |
| $P_v - (63.7 - 23.4 * P_n)$ | | -0.1800 | 0.0722 | 0.3396 | 0.5252 | 0.6763 | 0.6603 | 0.5645 | 0.5777 |

| Exemplary Glass | | 57 | 58 | 59 | 60 | 61 | 62 | 63 | 64 |
|---|---|---|---|---|---|---|---|---|---|

Composition - mol. %

| | | | | | | | | | |
|---|---|---|---|---|---|---|---|---|---|
| $P_2O_5$ | mol. % | 23.34 | 24.98 | 24.98 | 24.98 | 24.98 | 24.99 | 24.47 | 24.98 |
| $Nb_2O_5$ | mol. % | 30.61 | 19.99 | 20.99 | 19.49 | 18.29 | 18.29 | 23.18 | 26.19 |
| $TiO_2$ | mol. % | 22.27 | 23.99 | 25.19 | 27.29 | 29.28 | 29.29 | 25.99 | 22.00 |
| BaO | mol. % | 6.89 | 7.70 | 4.80 | 4.70 | 4.54 | 0 | 0 | 0 |
| $Na_2O$ | mol. % | 2.80 | 0.0222 | 0.0223 | 0.0219 | 0.0215 | 0.0208 | 0.0222 | 0 |
| $K_2O$ | mol. % | 4.13 | 13.49 | 17.19 | 16.79 | 16.27 | 16.29 | 15.20 | 15.99 |
| CaO | mol. % | 7.89 | 7.79 | 4.81 | 4.71 | 4.60 | 9.11 | 10.10 | 8.79 |
| $Al_2O_3$ | mol. % | 0.0148 | 0 | 0 | 0 | 0 | 0 | 0 | 0 |
| $Ta_2O_5$ | mol. % | 0.0277 | 0.0187 | 0.0188 | 0.0184 | 0.0181 | 0.0175 | 0.0218 | 0.0227 |
| SrO | mol. % | 0.0568 | 0 | 0 | 0 | 0 | 0 | 0 | 0 |
| $Li_2O$ | mol. % | 1.97 | 2.02 | 1.99 | 1.99 | 2.00 | 1.98 | 1.01 | 2.02 |
| $Fe_2O_3$ | mol. % | 0.0038 | 0 | 0 | 0 | 0 | 0 | 0 | 0 |

Measured properties

| | | | | | | | | | |
|---|---|---|---|---|---|---|---|---|---|
| $n_d$ | | 2.0012 | | | | | | | |
| $d_{RT}$ | g/cm³ | 3.786 | | | | | | 3.458 | 3.477 |
| $n_{632.8\,nm}$ | | 1.9902 | | | | | | | |
| $n_{531.9\,nm}$ | | 2.0201 | | | | | | | |
| $n_F$ | | 2.0426 | | | | | | | |
| $T_{liq}$ | °C. | 1175.0 | | | | | | 1135.0 | 1165.0 |
| $v_d$ | | 17.5 | | | | | | | |
| $(n_d - 1)/d_{RT}$ | | 0.26445 | | | | | | | |
| E | GPa | | 93.427 | 92.738 | 92.462 | 92.876 | 92.945 | | |
| | | | 0.25100 | 0.25100 | 0.25000 | 0.25100 | 0.24900 | | |

Predicted and calculated properties

| | | | | | | | | | |
|---|---|---|---|---|---|---|---|---|---|
| $P_n$ [for $n_d$] | | 1.987 | 1.885 | 1.888 | 1.887 | 1.887 | 1.886 | 1.916 | 1.917 |
| $P_d$ [for $d_{RT}$] | g/cm³ | 3.797 | 3.586 | 3.493 | 3.484 | 3.477 | 3.384 | 3.457 | 3.455 |
| $P_v$ [for $v_d$] | | 17.82 | 20.30 | 19.76 | 19.72 | 19.63 | 19.67 | 19.01 | 19.07 |
| $P_n - (1.54 + 0.1 * P_d)$ | | 0.0668 | -0.0132 | -0.0011 | -0.0018 | -6.800E-04 | 0.0078 | 0.0301 | 0.0317 |
| $P_n - (1.58 + 0.1 * P_d)$ | | 0.0268 | -0.0532 | -0.0411 | -0.0418 | -0.0407 | -0.0322 | -0.0099 | -0.0083 |
| $P_v - (64.5 - 23.4 * P_n)$ | | -0.1981 | -0.0786 | -0.5577 | -0.6333 | -0.7159 | -0.6983 | -0.6619 | -0.5643 |
| $P_v - (63.7 - 23.4 * P_n)$ | | 0.6019 | 0.7214 | 0.2423 | 0.1667 | 0.0841 | 0.1018 | 0.1381 | 0.2357 |

| Exemplary Glass | | 65 | 66 | 67 | 68 | 69 | 70 | 71 | 72 |
|---|---|---|---|---|---|---|---|---|---|

Composition - mol. %

| | | | | | | | | | |
|---|---|---|---|---|---|---|---|---|---|
| $P_2O_5$ | mol. % | 24.99 | 24.49 | 24.74 | 24.99 | 24.99 | 24.98 | 24.99 | 24.99 |
| $Nb_2O_5$ | mol. % | 24.39 | 22.39 | 21.90 | 21.49 | 21.99 | 22.49 | 21.99 | 21.99 |
| $TiO_2$ | mol. % | 21.99 | 25.99 | 26.00 | 25.79 | 26.39 | 26.99 | 26.39 | 26.40 |
| BaO | mol. % | 0 | 0 | 2.00 | 4.30 | 3.80 | 3.30 | 1.80 | 0 |
| $Na_2O$ | mol. % | 0.0224 | 0.0218 | 0.0219 | 0.0224 | 0.0225 | 0 | 0 | 0 |
| $K_2O$ | mol. % | 13.30 | 13.80 | 12.80 | 16.59 | 16.00 | 15.40 | 15.99 | 15.99 |
| CaO | mol. % | 13.29 | 11.30 | 10.51 | 4.80 | 4.79 | 4.81 | 6.81 | 8.61 |
| $Ta_2O_5$ | mol. % | 0.022 | 0.0214 | 0.0215 | 0.0189 | 0.0189 | 0.0221 | 0.0218 | 0.0215 |
| $Li_2O$ | mol. % | 1.99 | 1.99 | 2.00 | 2.00 | 2.00 | 2.01 | 2.02 | 2.00 |

Measured properties

| | | | | | | | | | |
|---|---|---|---|---|---|---|---|---|---|
| $d_{RT}$ | g/cm³ | 3.479 | 3.451 | 3.494 | 3.487 | 3.491 | 3.493 | 3.453 | 3.419 |
| $T_{liq}$ | °C. | 1090.0 | 1120.0 | 1145.0 | 1095.0 | 1100.0 | 1110.0 | | |
| E | GPa | | | | 94.048 | 95.013 | 95.496 | | |
| μ | | | | | 0.25000 | 0.24700 | 0.24400 | | |

Predicted and calculated properties

| | | | | | | | | | |
|---|---|---|---|---|---|---|---|---|---|
| $P_n$ [for $n_d$] | | 1.910 | 1.912 | 1.911 | 1.896 | 1.904 | 1.912 | 1.904 | 1.903 |
| $P_d$ [for $d_{RT}$] | g/cm³ | 3.470 | 3.459 | 3.503 | 3.495 | 3.498 | 3.501 | 3.457 | 3.420 |
| $P_v$ [for $v_d$] | | 19.56 | 19.22 | 19.36 | 19.50 | 19.24 | 18.99 | 19.26 | 19.27 |
| $P_n - (1.54 + 0.1 * P_d)$ | | 0.0231 | 0.0264 | 0.0202 | 0.0066 | 0.0143 | 0.0221 | 0.0180 | 0.0214 |

TABLE 5-continued

Exemplary Glass Compositions

| | | | | | | | | |
|---|---|---|---|---|---|---|---|---|
| $P_n - (1.58 + 0.1 * P_d)$ | −0.0169 | −0.0136 | −0.0198 | −0.0334 | −0.0257 | −0.0179 | −0.0220 | −0.0186 |
| $P_v - (64.5 - 23.4 * P_n)$ | −0.2395 | −0.5276 | −0.4374 | −0.6336 | −0.7030 | −0.7639 | −0.6926 | −0.6864 |
| $P_v - (63.7 - 23.4 * P_n)$ | 0.5605 | 0.2724 | 0.3626 | 0.1664 | 0.0970 | 0.0361 | 0.1074 | 0.1136 |

| Exemplary Glass | | 73 | 74 | 75 | 76 | 77 | 78 | 79 | 80 |
|---|---|---|---|---|---|---|---|---|---|
| Composition - mol. % | | | | | | | | | |
| $P_2O_5$ | mol. % | 22.47 | 19.98 | 22.48 | 24.99 | 24.99 | 24.99 | 24.73 | 24.75 |
| $Nb_2O_5$ | mol. % | 19.98 | 19.98 | 18.48 | 21.00 | 20.99 | 20.29 | 21.76 | 21.78 |
| $TiO_2$ | mol. % | 23.98 | 23.98 | 25.89 | 25.20 | 25.19 | 24.41 | 26.14 | 26.13 |
| BaO | mol. % | 7.70 | 7.69 | 7.60 | 4.80 | 3.80 | 3.80 | 3.76 | 3.76 |
| $Na_2O$ | mol. % | 0.022 | 0.0434 | 0.0215 | 0 | 0.022 | 0.0216 | 0.33 | 0 |
| $K_2O$ | mol. % | 15.74 | 16.98 | 15.54 | 17.20 | 13.40 | 10.99 | 15.51 | 15.84 |
| CaO | mol. % | 9.04 | 10.30 | 8.95 | 4.81 | 10.59 | 14.49 | 4.76 | 4.74 |
| $Al_2O_3$ | mol. % | 0.0134 | 0.0132 | 0.0131 | 0 | 0 | 0 | 0 | 0 |
| $Ta_2O_5$ | mol. % | 0.0185 | 0.0183 | 0.0181 | 0 | 0.0185 | 0.0181 | 0.0188 | 0.0188 |
| MgO | mol. % | 0.0338 | 0.0334 | 0.0331 | 0 | 0 | 0 | 0 | 0 |
| $Li_2O$ | mol. % | 1.00 | 0.99 | 0.98 | 1.99 | 1.00 | 0.98 | 1.99 | 1.99 |
| $SiO_2$ | mol. % | 0 | 0 | 0 | 0 | 0 | 0 | 0.99 | 0.99 |
| Composition constraints | | | | | | | | | |
| $SiO_2 + GeO_2$ | mol. % | 0 | 0 | 0 | 0 | 0 | 0 | 0.9902 | 0.9913 |
| Measured properties | | | | | | | | | |
| $d_{RT}$ | g/cm$^3$ | 3.563 | 3.599 | 3.546 | | 3.495 | 3.510 | 3.481 | 3.475 |
| $T_{liq}$ | ° C. | | | | 1125.0 | | | | |
| Predicted and calculated properties | | | | | | | | | |
| $P_n$ [for $n_d$] | | 1.890 | 1.896 | 1.887 | 1.888 | 1.899 | 1.896 | 1.901 | 1.900 |
| $P_d$ [for $d_{RT}$] | g/cm$^3$ | 3.613 | 3.646 | 3.602 | 3.492 | 3.525 | 3.546 | 3.492 | 3.490 |
| $P_v$ [for $v_d$] | | 20.11 | 19.92 | 20.11 | 19.76 | 19.78 | 20.16 | 19.34 | 19.34 |
| $P_n - (1.54 + 0.1 * P_d)$ | | −0.0117 | −0.0088 | −0.0135 | −9.100E−04 | 0.0062 | 0.0015 | 0.0113 | 0.0112 |
| $P_n - (1.58 + 0.1 * P_d)$ | | −0.0517 | −0.0488 | −0.0535 | −0.0409 | −0.0338 | −0.0385 | −0.0287 | −0.0288 |
| $P_v - (64.5 - 23.4 * P_n)$ | | −0.1740 | −0.2195 | −0.2391 | −0.5580 | −0.2940 | 0.0302 | −0.6872 | −0.6943 |
| $P_v - (63.7 - 23.4 * P_n)$ | | 0.6260 | 0.5805 | 0.5609 | 0.2420 | 0.5060 | 0.8302 | 0.1128 | 0.1057 |

| Exemplary Glass | | 81 | 82 | 83 | 84 | 85 | 86 | 87 | 88 |
|---|---|---|---|---|---|---|---|---|---|
| Composition - mol. % | | | | | | | | | |
| $P_2O_5$ | mol. % | 24.95 | 24.97 | 24.97 | 24.97 | 24.97 | 23.99 | 24.00 | 23.99 |
| $Nb_2O_5$ | mol. % | 10.21 | 20.22 | 12.32 | 24.45 | 20.26 | 28.00 | 28.00 | 27.99 |
| $TiO_2$ | mol. % | 40.15 | 26.02 | 34.31 | 23.64 | 33.06 | 21.99 | 21.98 | 21.99 |
| BaO | mol. % | 0 | 0 | 0 | 0 | 0 | 12.96 | 14.44 | 3.02 |
| $Na_2O$ | mol. % | 0.17 | 0.10 | 0.11 | 0.11 | 0.13 | 0 | 0 | 0 |
| $K_2O$ | mol. % | 14.98 | 9.51 | 9.67 | 10.24 | 12.34 | 5.11 | 5.97 | 6.91 |
| CaO | mol. % | 9.53 | 19.17 | 18.60 | 16.56 | 9.23 | 7.92 | 5.57 | 16.07 |
| $Ta_2O_5$ | mol. % | 0.0103 | 0.0176 | 0.0104 | 0.0219 | 0.018 | 0.0246 | 0.0249 | 0.0265 |
| Measured properties | | | | | | | | | |
| $n_d$ | | | | | | | 1.9547 | 1.9409 | 1.9448 |
| $d_{RT}$ | g/cm$^3$ | 3.222 | 3.537 | 3.403 | 3.539 | 3.443 | | | |
| $n_{632.8\ nm}$ | | | | | | | 1.9440 | 1.9320 | 1.9388 |
| $n_{531.9\ nm}$ | | | | | | | 1.9727 | 1.9557 | 1.9545 |
| 15-min devit test (0/1) | | 1 | 1 | 1 | 1 | 1 | 1 | 1 | 1 |
| Predicted and calculated properties | | | | | | | | | |
| $P_n$ [for $n_d$] | | 1.875 | 1.906 | 1.880 | 1.927 | 1.930 | 1.968 | 1.966 | 1.961 |
| $P_d$ [for $d_{RT}$] | g/cm$^3$ | 3.347 | 3.493 | 3.424 | 3.523 | 3.468 | 3.904 | 3.924 | 3.678 |
| $P_v$ [for $v_d$] | | 19.55 | 19.86 | 20.27 | 19.20 | 18.39 | 18.46 | 18.45 | 18.54 |
| $P_n - (1.54 + 0.1 * P_d)$ | | 1.200E−04 | 0.0170 | −0.0025 | 0.0350 | 0.0430 | 0.0376 | 0.0336 | 0.0534 |
| $P_n - (1.58 + 0.1 * P_d)$ | | −0.0399 | −0.0230 | −0.0425 | −0.0050 | 0.0030 | −0.0024 | −0.0064 | 0.0134 |
| $P_v - (64.5 - 23.4 * P_n)$ | | −1.078 | −0.0354 | −0.2402 | −0.2005 | −0.9483 | 0.0120 | −0.0470 | −0.0669 |
| $P_v - (63.7 - 23.4 * P_n)$ | | −0.2776 | 0.7646 | 0.5598 | 0.5995 | −0.1483 | 0.8120 | 0.7530 | 0.7331 |

| Exemplary Glass | | 89 | 90 | 91 | 92 | 93 | 94 | 95 | 96 |
|---|---|---|---|---|---|---|---|---|---|
| Composition - mol. % | | | | | | | | | |
| $P_2O_5$ | mol. % | 24.00 | 23.99 | 23.99 | 24.00 | 23.99 | 23.99 | 23.99 | 23.99 |
| $Nb_2O_5$ | mol. % | 28.00 | 32.00 | 32.00 | 32.00 | 32.00 | 31.99 | 32.00 | 31.99 |
| $TiO_2$ | mol. % | 21.99 | 17.99 | 18.00 | 17.99 | 18.00 | 18.00 | 17.98 | 18.00 |
| BaO | mol. % | 8.63 | 11.00 | 7.70 | 12.95 | 9.68 | 14.45 | 7.39 | 11.04 |
| $K_2O$ | mol. % | 8.00 | 4.00 | 5.19 | 5.11 | 6.15 | 5.97 | 6.96 | 6.95 |
| CaO | mol. % | 9.36 | 10.98 | 13.10 | 7.92 | 10.15 | 5.57 | 11.64 | 8.01 |
| $Ta_2O_5$ | mol. % | 0.0241 | 0.029 | 0.0285 | 0.0295 | 0.029 | 0.0298 | 0.0286 | 0.0293 |

TABLE 5-continued

Exemplary Glass Compositions

Measured properties

|  |  |  |  |  |  |  |  |  |  |
|---|---|---|---|---|---|---|---|---|---|
| $n_d$ |  | 1.9479 |  | 1.9572 | 1.9691 |  | 1.9875 | 1.9532 |  |
| $d_{RT}$ | g/cm³ |  | 3.883 |  | 3.903 | 3.832 | 3.909 | 3.786 | 3.860 |
| $n_{632.8\ nm}$ |  | 1.9360 |  | 1.9480 | 1.9590 |  | 1.9750 | 1.9440 |  |
| $n_{531.9\ nm}$ |  | 1.9681 |  | 1.9725 | 1.9861 |  | 2.0087 | 1.9685 |  |
| $(n_d - 1)/d_{RT}$ |  |  |  |  | 0.24829 |  | 0.25261 | 0.25176 |  |
| 15-min devit test (0/1) |  | 1 | 1 | 1 | 1 | 1 | 1 | 1 | 1 |

Predicted and calculated properties

|  |  |  |  |  |  |  |  |  |  |
|---|---|---|---|---|---|---|---|---|---|
| $P_n$ [for $n_d$] |  | 1.960 | 1.985 | 1.981 | 1.982 | 1.979 | 1.980 | 1.976 | 1.977 |
| $P_d$ [for $d_{RT}$] | g/cm³ | 3.780 | 3.911 | 3.829 | 3.938 | 3.858 | 3.959 | 3.801 | 3.877 |
| $P_v$ [for $v_d$] |  | 18.49 | 18.27 | 18.29 | 18.25 | 18.27 | 18.24 | 18.29 | 18.26 |
| $P_n - (1.54 + 0.1 * P_d)$ |  | 0.0416 | 0.0534 | 0.0578 | 0.0482 | 0.0529 | 0.0442 | 0.0559 | 0.0491 |
| $P_n - (1.58 + 0.1 * P_d)$ |  | 0.0016 | 0.0134 | 0.0178 | 0.0082 | 0.0129 | 0.0042 | 0.0159 | 0.0091 |
| $P_v - (64.5 - 23.4 * P_n)$ |  | −0.1556 | 0.2062 | 0.1421 | 0.1299 | 0.0745 | 0.0709 | 0.0315 | 0.0204 |
| $P_v - (63.7 - 23.4 * P_n)$ |  | 0.6444 | 1.006 | 0.9421 | 0.9299 | 0.8745 | 0.8709 | 0.8315 | 0.8204 |

| Exemplary Glass |  | 97 | 98 | 99 | 100 | 101 | 102 | 103 | 104 |
|---|---|---|---|---|---|---|---|---|---|

Composition - mol. %

|  |  |  |  |  |  |  |  |  |  |
|---|---|---|---|---|---|---|---|---|---|
| $P_2O_5$ | mol. % | 23.99 | 23.98 | 23.99 | 23.89 | 23.89 | 23.88 | 23.89 | 23.90 |
| $Nb_2O_5$ | mol. % | 31.98 | 31.99 | 32.00 | 28.01 | 27.43 | 29.12 | 27.00 | 28.50 |
| $TiO_2$ | mol. % | 17.99 | 17.99 | 18.00 | 21.99 | 22.58 | 20.89 | 23.03 | 21.52 |
| BaO | mol. % | 15.96 | 8.56 | 12.51 | 6.12 | 6.11 | 6.11 | 6.11 | 6.11 |
| $K_2O$ | mol. % | 6.83 | 7.99 | 8.00 | 3.96 | 5.12 | 5.07 | 5.98 | 6.08 |
| CaO | mol. % | 3.20 | 9.45 | 5.48 | 16.01 | 14.84 | 14.91 | 13.97 | 13.87 |
| $Ta_2O_5$ | mol. % | 0.0301 | 0.0289 | 0.0296 | 0.0268 | 0.0267 | 0.0273 | 0.0233 | 0.0271 |
| SrO | mol. % | 0.0161 | 0 | 0 | 0 | 0 | 0 | 0 | 0 |

Measured properties

|  |  |  |  |  |  |  |  |  |  |
|---|---|---|---|---|---|---|---|---|---|
| $n_d$ |  | 1.962 |  | 1.9491 |  | 1.9751 |  | 1.9398 |  |
| $d_{RT}$ | g/cm³ | 3.935 | 3.802 | 3.872 | 3.766 | 3.725 | 3.738 | 3.706 | 3.718 |
| $n_{632.8\ nm}$ |  | 1.9516 |  | 1.9390 |  | 1.9740 |  | 1.9300 |  |
| $n_{531.9\ nm}$ |  | 1.9797 |  | 1.9661 |  | 1.9766 |  | 1.9562 |  |
| $(n_d - 1)/d_{RT}$ |  | 0.24448 |  | 0.24511 |  | 0.26176 |  | 0.25358 |  |
| 15-min devit test (0/1) |  | 1 | 1 | 1 | 1 | 1 | 1 | 1 | 1 |

Predicted and calculated properties

|  |  |  |  |  |  |  |  |  |  |
|---|---|---|---|---|---|---|---|---|---|
| $P_n$ [for $n_d$] |  | 1.978 | 1.974 | 1.975 | 1.970 | 1.965 | 1.971 | 1.961 | 1.966 |
| $P_d$ [for $d_{RT}$] | g/cm³ | 3.979 | 3.813 | 3.894 | 3.779 | 3.760 | 3.775 | 3.746 | 3.757 |
| $P_v$ [for $v_d$] |  | 18.23 | 18.28 | 18.25 | 18.51 | 18.54 | 18.45 | 18.56 | 18.48 |
| $P_n - (1.54 + 0.1 * P_d)$ |  | 0.0401 | 0.0523 | 0.0450 | 0.0521 | 0.0490 | 0.0535 | 0.0467 | 0.0505 |
| $P_n - (1.58 + 0.1 * P_d)$ |  | 8.400E−05 | 0.0123 | 0.0051 | 0.0121 | 0.0090 | 0.0135 | 0.0067 | 0.0105 |
| $P_v - (64.5 - 23.4 * P_n)$ |  | 0.0137 | −0.0375 | −0.0515 | 0.1106 | 0.0194 | 0.0720 | −0.0476 | −0.0110 |
| $P_v - (63.7 - 23.4 * P_n)$ |  | 0.8137 | 0.7625 | 0.7485 | 0.9106 | 0.8194 | 0.8720 | 0.7524 | 0.7890 |

| Exemplary Glass |  | 105 | 106 | 107 | 108 | 109 | 110 | 111 | 112 |
|---|---|---|---|---|---|---|---|---|---|

Composition - mol. %

|  |  |  |  |  |  |  |  |  |  |
|---|---|---|---|---|---|---|---|---|---|
| $P_2O_5$ | mol. % | 23.90 | 23.90 | 23.90 | 23.90 | 23.90 | 23.91 | 23.91 | 23.90 |
| $Nb_2O_5$ | mol. % | 29.98 | 26.57 | 28.09 | 29.27 | 30.85 | 26.02 | 27.63 | 28.91 |
| $TiO_2$ | mol. % | 20.03 | 23.45 | 21.94 | 20.74 | 19.17 | 24.01 | 22.38 | 21.10 |
| BaO | mol. % | 6.11 | 6.12 | 6.11 | 6.11 | 6.12 | 6.11 | 6.11 | 6.11 |
| $K_2O$ | mol. % | 5.91 | 6.83 | 6.88 | 6.87 | 6.77 | 7.93 | 7.94 | 7.94 |
| CaO | mol. % | 14.04 | 13.12 | 13.05 | 13.08 | 13.17 | 12.00 | 12.01 | 12.01 |
| $Ta_2O_5$ | mol. % | 0.0276 | 0.0232 | 0.0271 | 0.0274 | 0.028 | 0.0231 | 0.027 | 0.0274 |

Measured properties

|  |  |  |  |  |  |  |  |  |  |
|---|---|---|---|---|---|---|---|---|---|
| $n_d$ |  | 1.9853 |  |  |  |  |  | 1.9707 |  |
| $d_{RT}$ | g/cm³ | 3.754 | 3.709 | 3.698 | 3.738 | 3.757 | 3.687 | 3.694 | 3.708 |
| $n_{632.8\ nm}$ |  | 1.9740 |  |  |  |  |  | 1.9600 |  |
| $n_{531.9\ nm}$ |  | 2.0044 |  |  |  |  |  | 1.9887 |  |
| $(n_d - 1)/d_{RT}$ |  | 0.26246 |  |  |  |  |  | 0.26277 |  |
| 15-min devit test (0/1) |  | 1 | 1 | 1 | 1 | 1 | 1 | 1 | 1 |

Predicted and calculated properties

|  |  |  |  |  |  |  |  |  |  |
|---|---|---|---|---|---|---|---|---|---|
| $P_n$ [for $n_d$] |  | 1.972 | 1.958 | 1.963 | 1.967 | 1.973 | 1.953 | 1.958 | 1.963 |
| $P_d$ [for $d_{RT}$] | g/cm³ | 3.772 | 3.732 | 3.744 | 3.754 | 3.769 | 3.714 | 3.728 | 3.738 |
| $P_v$ [for $v_d$] |  | 18.40 | 18.58 | 18.50 | 18.44 | 18.35 | 18.61 | 18.52 | 18.45 |
| $P_n - (1.54 + 0.1 * P_d)$ |  | 0.0547 | 0.0443 | 0.0483 | 0.0514 | 0.0557 | 0.0413 | 0.0456 | 0.0490 |
| $P_n - (1.58 + 0.1 * P_d)$ |  | 0.0147 | 0.0043 | 0.0083 | 0.0114 | 0.0157 | 0.0014 | 0.0056 | 0.0090 |
| $P_v - (64.5 - 23.4 * P_n)$ |  | 0.0426 | −0.1129 | −0.0746 | −0.0384 | 0.0136 | −0.1997 | −0.1533 | −0.1168 |
| $P_v - (63.7 - 23.4 * P_n)$ |  | 0.8426 | 0.6871 | 0.7254 | 0.7616 | 0.8136 | 0.6003 | 0.6467 | 0.6832 |

TABLE 5-continued

Exemplary Glass Compositions

| Exemplary Glass | | 113 | 114 | 115 | 116 | 117 | 118 | 119 | 120 |
|---|---|---|---|---|---|---|---|---|---|
| Composition - mol. % | | | | | | | | | |
| $P_2O_5$ | mol. % | 23.90 | 23.91 | 23.94 | 23.98 | 23.98 | 23.98 | 23.98 | 23.98 |
| $Nb_2O_5$ | mol. % | 30.23 | 32.02 | 31.98 | 30.98 | 29.52 | 30.99 | 28.43 | 29.62 |
| $TiO_2$ | mol. % | 19.79 | 18.00 | 18.98 | 19.99 | 19.99 | 18.56 | 19.99 | 18.66 |
| BaO | mol. % | 6.11 | 6.11 | 8.00 | 8.01 | 8.01 | 8.01 | 8.01 | 8.01 |
| $Na_2O$ | mol. % | 0 | 0 | 2.28 | 0 | 0 | 0 | 0 | 0 |
| $K_2O$ | mol. % | 7.93 | 7.94 | 5.74 | 8.00 | 8.00 | 7.99 | 8.00 | 8.00 |
| CaO | mol. % | 12.01 | 11.99 | 9.07 | 9.01 | 9.01 | 9.01 | 9.01 | 9.02 |
| $Ta_2O_5$ | mol. % | 0.0278 | 0.0285 | 0.0287 | 0.0285 | 0.029 | 0.0295 | 0.0257 | 0.0262 |
| $Bi_2O_3$ | mol. % | 0 | 0 | 0 | 0 | 1.47 | 1.43 | 2.56 | 2.70 |
| Measured properties | | | | | | | | | |
| $n_d$ | | 1.9398 | | 1.9657 | | 1.9566 | 1.9678 | | |
| $d_{RT}$ | g/cm³ | 3.718 | 3.746 | | 3.755 | 3.862 | 3.874 | 3.921 | 3.949 |
| $n_{632.8\ nm}$ | | 1.9300 | | 1.9550 | | 1.9450 | 1.9580 | | |
| $n_{531.9\ nm}$ | | 1.9562 | | 1.9837 | | 1.9762 | 1.9842 | | |
| $(n_d - 1)/d_{RT}$ | | 0.25276 | | | | 0.24768 | 0.24981 | | |
| 15-min devit test (0/1) | | 1 | 1 | 1 | 1 | 1 | 1 | 1 | 1 |
| Predicted and calculated properties | | | | | | | | | |
| $P_n$ [for $n_d$] | | 1.968 | 1.974 | 1.980 | 1.974 | 1.976 | 1.981 | 1.977 | 1.982 |
| $P_d$ [for $d_{RT}$] | g/cm³ | 3.750 | 3.765 | 3.815 | 3.794 | 3.871 | 3.882 | 3.928 | 3.946 |
| $P_v$ [for $v_d$] | | 18.38 | 18.29 | 18.11 | 18.15 | 18.26 | 18.18 | 18.34 | 18.28 |
| $P_n - (1.54 + 0.1 * P_d)$ | | 0.0525 | 0.0573 | 0.0581 | 0.0548 | 0.0488 | 0.0528 | 0.0442 | 0.0472 |
| $P_n - (1.58 + 0.1 * P_d)$ | | 0.0125 | 0.0173 | 0.0181 | 0.0148 | 0.0088 | 0.0128 | 0.0042 | 0.0072 |
| $P_v - (64.5 - 23.4 * P_n)$ | | -0.0785 | -0.0262 | -0.0722 | -0.1490 | -0.0079 | 0.0323 | 0.0972 | 0.1508 |
| $P_v - (63.7 - 23.4 * P_n)$ | | 0.7215 | 0.7738 | 0.7278 | 0.6510 | 0.7921 | 0.8323 | 0.8972 | 0.9508 |

| Exemplary Glass | | 121 | 122 | 123 | 124 | 125 | 126 | 127 | 128 |
|---|---|---|---|---|---|---|---|---|---|
| Composition - mol. % | | | | | | | | | |
| $P_2O_5$ | mol. % | 23.97 | 23.98 | 23.97 | 23.97 | 23.98 | 24.99 | 25.00 | 25.00 |
| $Nb_2O_5$ | mol. % | 30.98 | 27.36 | 28.61 | 29.62 | 31.00 | 19.99 | 25.00 | 22.18 |
| $TiO_2$ | mol. % | 17.48 | 19.99 | 18.67 | 17.67 | 16.40 | 24.99 | 20.00 | 26.58 |
| BaO | mol. % | 8.01 | 8.01 | 8.01 | 8.00 | 8.01 | 0 | 0 | 0 |
| $K_2O$ | mol. % | 8.00 | 8.00 | 8.01 | 8.00 | 8.00 | 14.00 | 14.01 | 13.81 |
| CaO | mol. % | 9.03 | 9.01 | 9.01 | 9.01 | 9.01 | 15.00 | 14.99 | 11.43 |
| $Ta_2O_5$ | mol. % | 0.0302 | 0.0261 | 0.0265 | 0.0268 | 0.0271 | 0.0177 | 0.0222 | 0.0215 |
| $Li_2O$ | mol. % | 0 | 0 | 0 | 0 | 0 | 1.01 | 0.98 | 1.00 |
| $Bi_2O_3$ | mol. % | 2.51 | 3.62 | 3.70 | 3.69 | 3.58 | 0 | 0 | 0 |
| Measured properties | | | | | | | | | |
| $n_d$ | | | 1.969 | | | | 1.8736 | 1.8915 | |
| $d_{RT}$ | g/cm³ | 3.945 | 3.996 | 4.023 | 4.020 | 4.025 | | | 3.418 |
| $n_{632.8\ nm}$ | | | 1.9580 | | | | 1.8661 | 1.8834 | |
| $n_{531.9\ nm}$ | | | 1.9876 | | | | 1.8861 | 1.9050 | |
| $(n_d - 1)/d_{RT}$ | | | 0.24249 | | | | | | |
| 15-min devit test (0/1) | | 1 | 1 | 1 | 1 | 1 | 1 | 1 | |
| Predicted and calculated properties | | | | | | | | | |
| $P_n$ [for $n_d$] | | 1.986 | 1.978 | 1.983 | 1.986 | 1.991 | 1.888 | 1.905 | 1.912 |
| $P_d$ [for $d_{RT}$] | g/cm³ | 3.947 | 3.983 | 3.999 | 4.007 | 4.012 | 3.429 | 3.472 | 3.455 |
| $P_v$ [for $v_d$] | | 18.20 | 18.41 | 18.35 | 18.29 | 18.22 | 20.15 | 19.83 | 19.19 |
| $P_n - (1.54 + 0.1 * P_d)$ | | 0.0511 | 0.0398 | 0.0431 | 0.0458 | 0.0496 | 0.0048 | 0.0181 | 0.0267 |
| $P_n - (1.58 + 0.1 * P_d)$ | | 0.0111 | -1.800E-04 | 0.0031 | 0.0058 | 0.0096 | -0.0352 | -0.0219 | -0.0133 |
| $P_v - (64.5 - 23.4 * P_n)$ | | 0.1688 | 0.2010 | 0.2467 | 0.2759 | 0.3041 | -0.1834 | -0.0912 | -0.5644 |
| $P_v - (63.7 - 23.4 * P_n)$ | | 0.9688 | 1.001 | 1.047 | 1.076 | 1.104 | 0.6166 | 0.7088 | 0.2356 |

| Exemplary Glass | | 129 | 130 | 131 | 132 | 133 | 134 | 135 | 136 |
|---|---|---|---|---|---|---|---|---|---|
| Composition - mol. % | | | | | | | | | |
| $P_2O_5$ | mol. % | 25.00 | 24.98 | 24.99 | 24.98 | 25.00 | 24.98 | 24.99 | 24.98 |
| $Nb_2O_5$ | mol. % | 20.45 | 20.77 | 21.82 | 21.99 | 21.35 | 20.70 | 20.90 | 20.20 |
| $TiO_2$ | mol. % | 24.50 | 24.89 | 26.15 | 25.98 | 25.33 | 24.51 | 24.90 | 24.05 |
| BaO | mol. % | 0 | 1.58 | 3.49 | 3.00 | 2.02 | 4.71 | 1.36 | 3.54 |
| $Na_2O$ | mol. % | 0 | 0 | 0 | 0 | 0.0217 | 0 | 0.0214 | 0.0214 |
| $K_2O$ | mol. % | 9.43 | 10.27 | 12.94 | 12.99 | 12.03 | 9.83 | 11.36 | 9.24 |
| CaO | mol. % | 19.61 | 16.47 | 9.55 | 10.00 | 13.24 | 14.22 | 15.46 | 16.91 |
| $Ta_2O_5$ | mol. % | 0.0176 | 0.018 | 0.0187 | 0.0218 | 0.0183 | 0.0183 | 0.018 | 0.018 |
| SrO | mol. % | 0 | 0.0128 | 0.0266 | 0.0265 | 0.013 | 0.0391 | 0.0128 | 0.0256 |
| $Li_2O$ | mol. % | 1.00 | 1.02 | 1.01 | 1.01 | 0.99 | 0.99 | 0.98 | 1.02 |

TABLE 5-continued

Exemplary Glass Compositions

Measured properties

| | | | | | | | | |
|---|---|---|---|---|---|---|---|---|
| $d_{RT}$ | g/cm³ | 3.444 | 3.473 | 3.497 | 3.487 | 3.486 | 3.529 | 3.464 | 3.519 |

Predicted and calculated properties

| | | | | | | | | |
|---|---|---|---|---|---|---|---|---|
| $P_n$ [for $n_d$] | | 1.901 | 1.903 | 1.911 | 1.911 | 1.905 | 1.903 | 1.902 | 1.898 |
| $P_d$ [for $d_{RT}$] | g/cm³ | 3.488 | 3.514 | 3.534 | 3.524 | 3.508 | 3.584 | 3.498 | 3.561 |
| $P_v$ [for $v_d$] | | 20.14 | 19.94 | 19.35 | 19.34 | 19.67 | 20.02 | 19.90 | 20.28 |
| $P_n - (1.54 + 0.1 * P_d)$ | | 0.0121 | 0.0119 | 0.0172 | 0.0184 | 0.0144 | 0.0046 | 0.0117 | 0.0023 |
| $P_n - (1.58 + 0.1 * P_d)$ | | −0.0279 | −0.0281 | −0.0228 | −0.0216 | −0.0256 | −0.0354 | −0.0283 | −0.0377 |
| $P_v - (64.5 - 23.4 * P_n)$ | | 0.1220 | −0.0225 | −0.4474 | −0.4441 | −0.2482 | 0.0457 | −0.1063 | 0.2013 |
| $P_v - (63.7 - 23.4 * P_n)$ | | 0.9220 | 0.7775 | 0.3526 | 0.3559 | 0.5518 | 0.8457 | 0.6937 | 1.001 |

| Exemplary Glass | | 137 | 138 | 139 | 140 | 141 | 142 | 143 | 144 |
|---|---|---|---|---|---|---|---|---|---|

Composition - mol. %

| | | | | | | | | | |
|---|---|---|---|---|---|---|---|---|---|
| $P_2O_5$ | mol. % | 24.98 | 25.00 | 24.99 | 24.99 | 25.00 | 25.00 | 25.01 | 25.00 |
| $Nb_2O_5$ | mol. % | 20.48 | 19.99 | 19.98 | 20.79 | 18.27 | 16.64 | 19.12 | 16.81 |
| $TiO_2$ | mol. % | 24.48 | 23.98 | 27.98 | 27.99 | 28.00 | 27.99 | 28.00 | 27.99 |
| BaO | mol. % | 0.74 | 0 | 0 | 0 | 0 | 0 | 0 | 0 |
| $Na_2O$ | mol. % | 0.0423 | 0.0416 | 0 | 0 | 0 | 0 | 0 | 0 |
| $K_2O$ | mol. % | 10.73 | 10.00 | 13.99 | 12.70 | 11.20 | 10.64 | 10.18 | 8.96 |
| CaO | mol. % | 17.51 | 19.98 | 8.02 | 12.49 | 12.86 | 12.04 | 16.69 | 16.63 |
| $Ta_2O_5$ | mol. % | 0.0178 | 0.0175 | 0.0188 | 0.018 | 0.0181 | 0.0152 | 0.0174 | 0.0146 |
| $Li_2O$ | mol. % | 1.01 | 0.99 | 1.02 | 1.02 | 0.98 | 0.99 | 0.99 | 0.99 |
| $WO_3$ | mol. % | 0 | 0 | 4.00 | 0 | 3.67 | 6.69 | 0 | 3.60 |

Measured properties

| | | | | | | | | | |
|---|---|---|---|---|---|---|---|---|---|
| $d_{RT}$ | g/cm³ | 3.444 | 3.428 | 3.515 | 3.413 | 3.501 | 3.560 | 3.410 | 3.491 |

Predicted and calculated properties

| | | | | | | | | | |
|---|---|---|---|---|---|---|---|---|---|
| $P_n$ [for $n_d$] | | 1.898 | 1.894 | 1.914 | 1.910 | 1.907 | 1.906 | 1.904 | 1.901 |
| $P_d$ [for $d_{RT}$] | g/cm³ | 3.488 | 3.476 | 3.554 | 3.457 | 3.561 | 3.643 | 3.470 | 3.571 |
| $P_v$ [for $v_d$] | | 20.12 | 20.40 | 18.92 | 19.27 | 19.43 | 19.44 | 19.73 | 19.85 |
| $P_n - (1.54 + 0.1 * P_d)$ | | 0.0091 | 0.0060 | 0.0191 | 0.0247 | 0.0111 | 0.0020 | 0.0167 | 0.0041 |
| $P_n - (1.58 + 0.1 * P_d)$ | | −0.0309 | −0.0340 | −0.0209 | −0.0153 | −0.0289 | −0.0380 | −0.0233 | −0.0359 |
| $P_v - (64.5 - 23.4 * P_n)$ | | 0.0318 | 0.2041 | −0.7807 | −0.5300 | −0.4470 | −0.4578 | −0.2191 | −0.1594 |
| $P_v - (63.7 - 23.4 * P_n)$ | | 0.8318 | 1.004 | 0.0193 | 0.2700 | 0.3530 | 0.3422 | 0.5809 | 0.6406 |

| Exemplary Glass | | 145 | 146 |
|---|---|---|---|

Composition - mol. %

| | | | |
|---|---|---|---|
| $P_2O_5$ | mol. % | 25.00 | 24.99 |
| $Nb_2O_5$ | mol. % | 15.26 | 13.60 |
| $TiO_2$ | mol. % | 27.98 | 27.99 |
| $K_2O$ | mol. % | 8.25 | 7.60 |
| CaO | mol. % | 16.34 | 15.68 |
| $Ta_2O_5$ | mol. % | 0.0147 | 0.0119 |
| $Li_2O$ | mol. % | 1.00 | 1.01 |
| $WO_3$ | mol. % | 6.15 | 9.12 |

Measured properties

| | | | |
|---|---|---|---|
| $d_{RT}$ | g/cm³ | 3.560 | 3.616 |

Predicted and calculated properties

| | | | |
|---|---|---|---|
| $P_n$ [for $n_d$] | | 1.900 | 1.899 |
| $P_d$ [for $d_{RT}$] | g/cm³ | 3.642 | 3.723 |
| $P_v$ [for $v_d$] | | 19.91 | 19.94 |
| $P_n - (1.54 + 0.1 * P_d)$ | | −0.0044 | −0.0136 |
| $P_n - (1.58 + 0.1 * P_d)$ | | −0.0444 | −0.0536 |
| $P_v - (64.5 - 23.4 * P_n)$ | | −0.1365 | −0.1353 |
| $P_v - (63.7 - 23.4 * P_n)$ | | 0.6635 | 0.6647 |

Table 6 below lists the glass compositions and properties for Comparative Glasses 1-22.

TABLE 6

Compositions and Properties of Comparative Example Glasses

| Comparative Examples | | C1 | C2 | C3 | C4 | C5 | C6 | C7 | C8 |
|---|---|---|---|---|---|---|---|---|---|
| Reference | | [14] | [5] | [9] | [2] | [6] | [3] | [7] | [4] |
| Composition - mol. % | | | | | | | | | |
| $P_2O_5$ | mol. % | 34.70 | 39.90 | 27.32 | 20.66 | 20.63 | 24.99 | 20.65 | 22.89 |
| $Na_2O$ | mol. % | 28.10 | 0.83 | 5.39 | 6.07 | 6.07 | 3.40 | 7.28 | 35.16 |
| $K_2O$ | mol. % | 12.30 | 0.55 | 13.92 | 7.18 | 7.17 | 3.30 | 6.39 | 5.86 |
| $TiO_2$ | mol. % | 13.50 | 1.29 | 14.74 | 16.00 | 15.98 | 20.01 | 15.06 | 10.73 |
| $Al_2O_3$ | mol. % | 5.70 | 0 | 0 | 0 | 0 | 0 | 0 | 0 |
| ZnO | mol. % | 3.30 | 0 | 0 | 0 | 0 | 0 | 0 | 0 |
| CaO | mol. % | 1.20 | 6.12 | 13.68 | 2.68 | 2.68 | 8.01 | 2.68 | 4.30 |
| MgO | mol. % | 1.20 | 1.28 | 0 | 0 | 0 | 0 | 0 | 0 |
| PbO | mol. % | 0 | 46.90 | 0 | 0 | 0 | 0 | 0 | 0 |
| $Nb_2O_5$ | mol. % | 0 | 1.29 | 24.93 | 25.74 | 25.71 | 21.00 | 25.74 | 21.06 |
| $Li_2O$ | mol. % | 0 | 1.72 | 0 | 0 | 0 | 3.29 | 0 | 0 |
| $Sb_2O_3$ | mol. % | 0 | 0.12 | 0.0145 | 0 | 0.10 | 0 | 0.0258 | 0.0087 |
| BaO | mol. % | 0 | 0 | 0 | 15.20 | 15.18 | 8.00 | 15.69 | 0 |
| $B_2O_3$ | mol. % | 0 | 0 | 0 | 6.48 | 6.46 | 0 | 6.48 | 0 |
| SrO | mol. % | 0 | 0 | 0 | 0 | 0 | 8.00 | 0 | 0 |
| $Ta_2O_5$ | mol. % | 0 | 0 | 0 | 0 | 0 | 0.0188 | 0 | 0 |
| Measured properties | | | | | | | | | |
| $n_d$ | | 1.5711 | 1.792 | 1.8504 | 1.9186 | 1.9186 | | 1.9186 | 1.780 |
| $n_{632.8\,nm}$ | | 1.5682 | | 1.8425 | 1.9098 | 1.9098 | | 1.9098 | 1.7737 |
| $n_{531.9\,nm}$ | | 1.5762 | | 1.8635 | 1.9334 | 1.9334 | | 1.9335 | 1.7905 |
| $n_F$ | | 1.5818 | | 1.8790 | 1.9507 | 1.9507 | | 1.9509 | 1.8027 |
| $T_g$ | ° C. | | | 681.00 | | | | | |
| $T_x$ | ° C. | | | 856.00 | | | | | |
| $T_x - T_g$ | ° C. | | | 175.00 | | | | | |
| $T_{liq}$ | ° C. | | | | | | | 1100.0 | |
| $v_d$ | | 38.2 | | 21.6 | 20.6 | 20.6 | | 20.5 | 24.6 |
| $P_{g-F}$ | | | | 0.63630 | | | | | |
| Predicted properties | | | | | | | | | |
| $P_n$ [for $n_d$] | | 1.583 | 1.820 | 1.865 | 1.904 | 1.904 | 1.900 | 1.900 | 1.800 |
| $P_d$ [for $d_{RT}$] | | 2.809 | 4.964 | 3.389 | 3.831 | 3.831 | 3.810 | 3.841 | 3.321 |

| Comparative Examples | | C9 | C10 | C11 | C12 | C13 | C14 | C15 | C16 |
|---|---|---|---|---|---|---|---|---|---|
| Reference | | [8] | [1] | [15] | [10] | [3] | [3] | [3] | [16] |
| Composition - mol. % | | | | | | | | | |
| $P_2O_5$ | mol. % | 16.24 | 16.19 | 39.55 | 27.05 | 24.99 | 25.00 | 25.00 | 39.55 |
| $Na_2O$ | mol. % | 0 | 21.32 | 32.73 | 24.51 | 0 | 3.39 | 7.97 | 32.73 |
| $K_2O$ | mol. % | 2.82 | 3.93 | 6.82 | 6.61 | 5.01 | 3.31 | 7.00 | 6.82 |
| $TiO_2$ | mol. % | 3.33 | 9.92 | 11.36 | 18.14 | 22.00 | 9.99 | 10.01 | 11.37 |
| $Al_2O_3$ | mol. % | 0 | 0 | 0 | 1.19 | 0 | 0 | 0 | 0 |
| ZnO | mol. % | 3.27 | 0 | 0 | 0.59 | 0 | 0 | 7.99 | 0 |
| CaO | mol. % | 1.58 | 7.07 | 0 | 15.01 | 1.00 | 9.99 | 8.00 | 0 |
| $Nb_2O_5$ | mol. % | 21.35 | 6.26 | 0 | 3.46 | 21.99 | 26.01 | 26.00 | 0 |
| $Li_2O$ | mol. % | 2.97 | 0 | 0 | 0 | 0 | 3.29 | 0 | 0 |
| BaO | mol. % | 18.50 | 5.17 | 0 | 0 | 24.99 | 9.50 | 8.00 | 0 |
| $B_2O_3$ | mol. % | 0 | 4.74 | 0 | 3.09 | 0 | 0 | 0 | 0 |
| SrO | mol. % | 10.27 | 0 | 0 | 0 | 0 | 9.50 | 0 | 0 |
| $Ta_2O_5$ | mol. % | 0 | 0 | 0 | 0 | 0.007 | 0.0236 | 0.0234 | 0 |
| $WO_3$ | mol. % | 9.18 | 20.34 | 0 | 0 | 0 | 0 | 0 | 0 |
| $Bi_2O_3$ | mol. % | 4.19 | 0 | 0 | 0 | 0 | 0 | 0 | 0 |
| $GeO_2$ | mol. % | 4.24 | 5.05 | 0 | 0 | 0 | 0 | 0 | 0 |
| $Cs_2O$ | mol. % | 0.63 | 0 | 0 | 0 | 0 | 0 | 0 | 0 |
| $ZrO_2$ | mol. % | 1.44 | 0 | 0 | 0 | 0 | 0 | 0 | 0 |
| $CaCl_2$ | mol. % | 0 | 0 | 9.09 | 0 | 0 | 0 | 0 | 9.09 |
| $Sm_2O_3$ | mol. % | 0 | 0 | 0.45 | 0 | 0 | 0 | 0 | 0 |
| $SiO_2$ | mol. % | 0 | 0 | 0 | 0.34 | 0.0258 | 0 | 0 | 0 |
| $Nd_2O_3$ | mol. % | 0 | 0 | 0 | 0 | 0 | 0 | 0 | 0.46 |
| Measured properties | | | | | | | | | |
| $n_d$ | | 1.9694 | 1.7991 | 1.580 | 1.6634 | | | | 1.583 |
| $d_{RT}$ | g/cm³ | 4.490 | | 2.806 | 2.900 | | | | 2.810 |
| $n_{632.8\,nm}$ | | | 1.7926 | | 1.6590 | | | | |
| $n_{531.9\,nm}$ | | 2.0648 | 1.8099 | | 1.6705 | | | | |
| $n_F$ | | 2.2105 | 1.8224 | | 1.6787 | | | | |
| $T_g$ | ° C. | 416.00 | 515.00 | | | | | | |
| $T_{liq}$ | ° C. | | 750.00 | | | | | | |
| $v_d$ | | 21.3 | 24.6 | | 31.3 | | | | |

TABLE 6-continued

Compositions and Properties of Comparative Example Glasses

| | | | | | | | | |
|---|---|---|---|---|---|---|---|---|
| $P_{g-F}$ | | | | 0.61100 | | | | |
| $(n_d - 1)/d_{RT}$ | | 0.21590 | | 0.20670 | 0.22876 | | | 0.20747 |
| $\alpha_{20-300} \times 10^7$ | K.$^{-1}$ | 105.00 | | | | | | |
| | | | | Predicted properties | | | | |
| $P_n$ [for $n_d$] | | 1.945 | 1.790 | 1.617 | 1.684 | 1.920 | 1.897 | 1.879 | 1.617 |
| $P_d$ [for $d_{RT}$] | | 4.826 | 4.081 | 2.969 | 3.087 | 4.074 | 3.900 | 3.739 | 2.969 |

| Comparative Examples | | C17 | C18 | C19 | C20 | C21 | C22 |
|---|---|---|---|---|---|---|---|
| Reference | | [11] | [3] | [3] | [12] | [2] | [13] |
| | | | Composition - mol. % | | | | |
| $P_2O_5$ | mol. % | 18.21 | 24.84 | 25.00 | 23.76 | 20.66 | 24.12 |
| $Na_2O$ | mol. % | 13.36 | 4.99 | 4.98 | 11.29 | 7.28 | 0 |
| $K_2O$ | mol. % | 8.21 | 5.00 | 5.01 | 3.92 | 6.39 | 7.60 |
| $TiO_2$ | mol. % | 9.95 | 11.24 | 15.01 | 15.46 | 15.06 | 10.76 |
| ZnO | mol. % | 0 | 4.99 | 0 | 0 | 0 | 0 |
| CaO | mol. % | 5.91 | 4.14 | 7.00 | 4.09 | 2.68 | 12.77 |
| $Nb_2O_5$ | mol. % | 16.12 | 35.73 | 32.01 | 14.75 | 25.75 | 25.38 |
| $Li_2O$ | mol. % | 11.09 | 5.02 | 4.98 | 17.04 | 0 | 4.79 |
| $Sb_2O_3$ | mol. % | 0 | 0 | 0 | 0.0437 | 0 | 0 |
| BaO | mol. % | 0 | 3.99 | 6.00 | 0 | 15.70 | 8.41 |
| $B_2O_3$ | mol. % | 8.88 | 0 | 0 | 0 | 6.48 | 6.17 |
| $Ta_2O_5$ | mol. % | 0 | 0.0109 | 0.0281 | 0 | 0 | 0 |
| $WO_3$ | mol. % | 0 | 0.007 | 0 | 9.06 | 0 | 0 |
| $Bi_2O_3$ | mol. % | 0 | 0 | 0 | 0.60 | 0 | 0 |
| $SiO_2$ | mol. % | 8.27 | 0.0268 | 0 | 0 | 0 | 0 |
| $Fe_2O_3$ | mol. % | 0 | 0.0303 | 0 | 0 | 0 | 0 |
| | | | Measured properties | | | | |
| $n_d$ | | 1.7582 | | | 1.8559 | 1.9186 | 1.9005 |
| $n_{632.8\ nm}$ | | 1.7526 | | | 1.8482 | 1.9098 | 1.8921 |
| $n_{531.9\ nm}$ | | 1.7675 | | | 1.8689 | 1.9335 | 1.9146 |
| $n_F$ | | 1.7782 | | | 1.8840 | 1.9509 | 1.9311 |
| $T_g$ | ° C. | | | | 493.00 | | |
| $T_{liq}$ | ° C. | 900.00 | | | | | 1140.0 |
| $v_d$ | | 27.1 | | | 21.9 | 20.5 | 21.2 |
| | | | Predicted properties | | | | |
| $P_n$ [for $n_d$] | | 1.756 | 1.965 | 1.951 | 1.838 | 1.900 | 1.871 |
| $P_d$ [for $d_{RT}$] | | 3.200 | 3.741 | 3.705 | 3.636 | 3.841 | 3.623 |

The reference key for each of the Comparative Glasses listed in Table 6 is as follows: [1] JP2005008518A (HOYA CORP); [2] JP2010083701A (HOYA CORP.); [3] US2019063958A1 (CORNING); [4] US2020131076A1 (OHARA K.K.); [5] U.S. Pat. No. 6,156,684A (HOYA CORP); [6] U.S. Pat. No. 7,531,474B2 (HOYA CORPORATION); [7] U.S. Pat. No. 7,603,876B2 (HOYA CORPORATION); [8] U.S. Pat. No. 7,638,448B2 (SCHOTT AG); [9] WO2011086855A1 (OHARA KK); [10] WO2020110341 (HIKARI GLASS CO., LTD); [11] JPH08157231A (HOYA CORP.); [12] U.S. Pat. No. 7,892,998B2 (KONICA MINOLTA ADVANCED LAYERS INC); [13] JPH08104537A (HOYA CORP.); [14] Jahn W., Untersuchungen uber die Violettfarbung titanhaltiger Phosphatglaser., Glastech. Ber., 1966, vol. 39, No. 3, p. 118-126; [15] Moorthy D. V. R., Jayasimhadri M., Jang K., Kumar J. S., Babu A. M., Moorthy L. R., Spectroscopic characteristics of Sm3+ doped alkaline earth potassium titanium phosphate glasses, Indian J. Engin. Mater. Sci., 2009, vol. 16, No. 3, p. 193-196; [16] Murthy D. V. R., Sasikala T., Jamalaiah B. C., Babu A. M., Kumar J. S., Jayasimhadri M., Moorthy L. R., Investigation on luminescence properties of $Nd^{3+}$ ions in alkaline-earth titanium phosphate glasses, Optics Communications, 2011, vol. 284, No. 2, p. 603-607.

Figure 6:
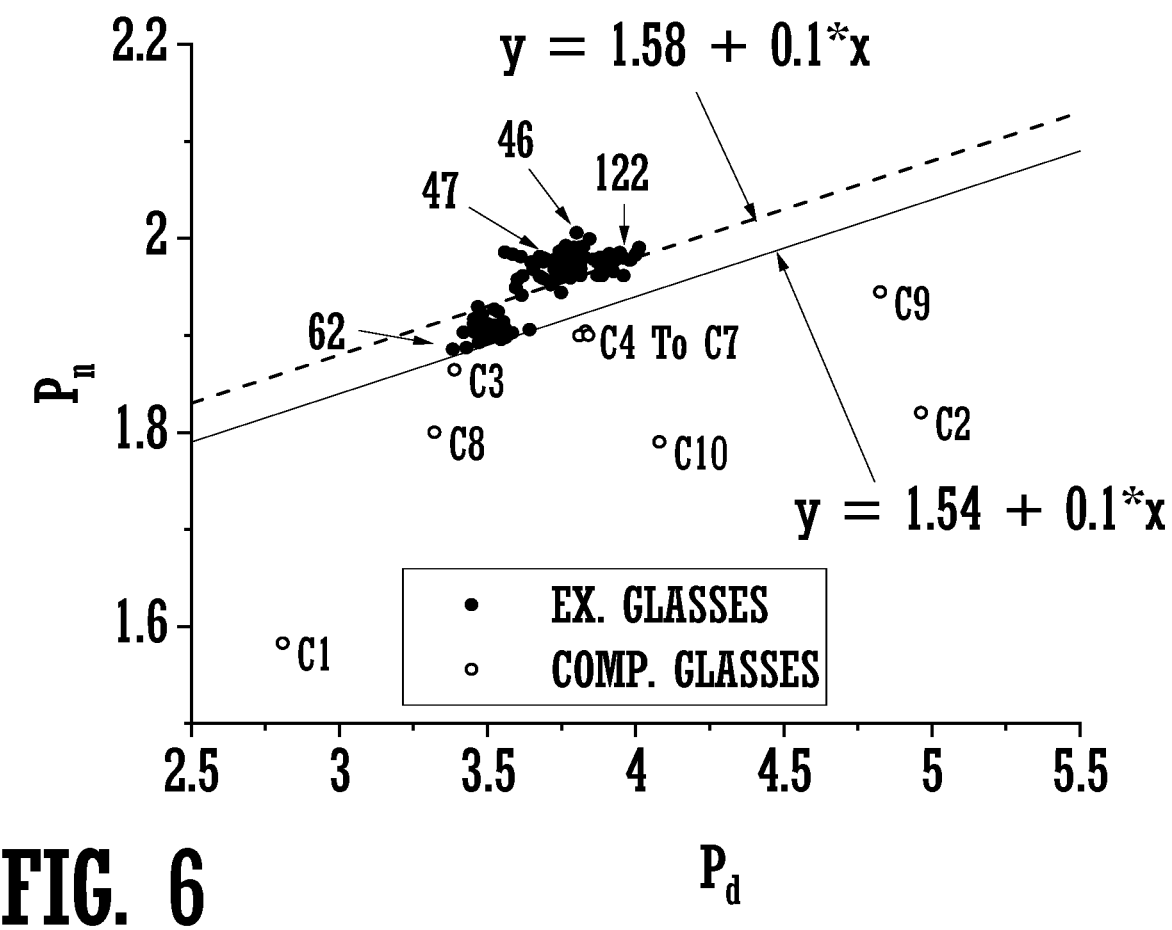
FIG. 6 is a plot illustrating the relationship between the density parameter $P_d$ and the refractive index parameter $P_n$ for some Comparative Glasses and some Exemplary Glasses according to an embodiment of the present disclosure.

FIG. 6 is a plot showing the relationship between the density parameter $P_d$ and the refractive index parameter $P_n$ for some of the Exemplary Glasses and some of the Comparative Glasses. The Exemplary Glasses (filled circles) are the Examples 2, 4 to 7, 9 to 17, 20 to 36, 38 to 57, 62 to 72, 77 to 80, 82 and 84 to 144 from Table 5. The Comparative Glasses (open circles) are the Examples C1 to C10 from Table 6. The density parameter $P_d$ that predicts density $d_{RT}$ was determined according to Formula (II). The refractive index parameter $P_n$ that predicts refractive index $n_d$ was determined according to Formula (I). All of the Exemplary Glasses and Comparative Glasses shown in FIG. 6 have the features specified in Table 7. In Table 7, the specification "Not limited" refers to a limitation that was not considered when selecting the compositions. In FIG. 6, some of the above-enumerated compositions may be labeled for better visibility, some others may not, and some more glasses may not be shown, which does not affect the further conclusions.

TABLE 7

Figure 7:
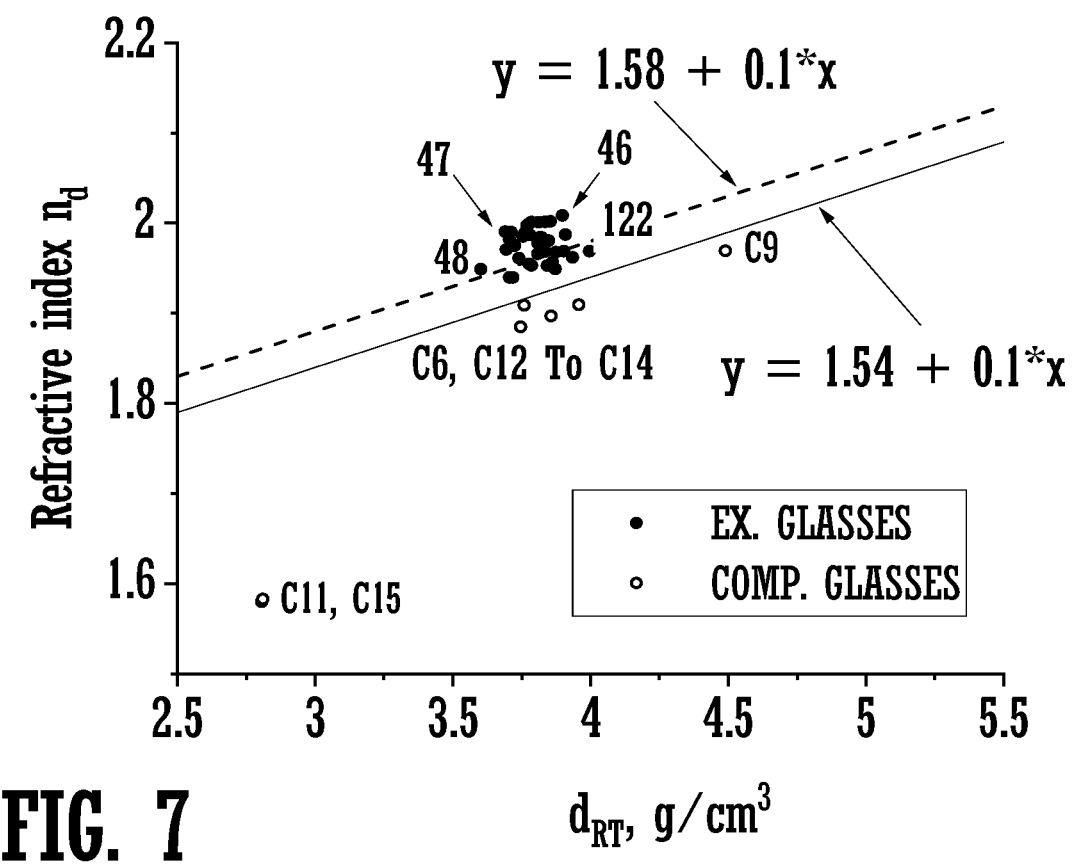
FIG. 7 is a plot illustrating the relationship between the density at room temperature $d_{RT}$ and the refractive index $n_d$ for some Comparative Glasses and some Exemplary Glasses according to an embodiment of the present disclosure.

Limitations for glass compositions shown in FIGS. 6 and 7

| Quantity | Unit | Min | Max |
|---|---|---|---|
| $P_2O_5$ | mol. % | 10 | 40 |
| $TiO_2$ | mol. % | 0.5 | 50 |
| $K_2O$ | mol. % | 0.5 | 35 |
| CaO | mol. % | 0.5 | 35 |
| $Nb_2O_5$ | mol. % | 0 | 50 |
| MgO | mol. % | 0 | 15 |
| $Al_2O_3$ | mol. % | 0 | 10 |

TABLE 7-continued

Limitations for glass compositions shown in FIGS. 6 and 7

| Quantity | Unit | Min | Max |
|---|---|---|---|
| $Li_2O$ | mol. % | 0 | 4.5 |
| $V_2O_5$ | mol. % | 0 | 1 |
| RO | mol. % | 4 | Not limited |
| $TeO_2 + SnO_2 + SnO$ | mol. % | 0 | 20 |
| $SiO_2 + GeO_2$ | mol. % | 0 | 15 |

The above-enumerated Comparative Glasses were selected as having the highest refractive index parameter $P_n$ at comparable values of density parameter $P_d$ among the known glasses that have the features specified in Table 7.

The line corresponding to the formula y=1.54+0.1*x shown in FIG. 6 provides a visual representation of the differences between the Comparative Glasses having the features specified in Table 7 and the Exemplary Glasses 2, 4 to 7, 9 to 17, 20 to 36, 38 to 57, 62 to 72, 77 to 80, 82 and 84 to 144 according to the present disclosure. As can be seen in FIG. 6, the mentioned Exemplary Glasses (filled circles) and none of the Comparative Glasses (open circles) represented in FIG. 6 fall above the line y=1.54+0.1*x, where y corresponds to the refractive index parameter $P_n$ and x corresponds to the density parameter $P_d$. In other words, some of the Exemplary Glasses and none of the Comparative Glasses represented in FIG. 6 satisfy the following formula (V)(a):

$$P_n-(1.54+0.1*P_d)>0.00 \quad\quad (V)(a)$$

As can also be seen in FIG. 6, some of Exemplary Glasses and none of the Comparative Glasses represented in FIG. 6 fall above the line y=1.58+0.1*x, where y corresponds to the refractive index parameter $P_n$ and x corresponds to the density parameter $P_d$. In other words, some of the Exemplary Glasses and none of the Comparative Glasses represented in FIG. 6 satisfy the following formula (V)(b):

$$P_n-(1.58+0.1*P_d)>0.00 \quad\quad (V)(b)$$

This means that, under the conditions specified in Table 7 above, some of the Exemplary Glasses have higher values of $P_n$ at comparable values of $P_d$ than the best of the Comparative Glasses satisfying the same conditions. In other words, these Exemplary Glasses, by prediction, have higher values of the refractive index $n_d$ at comparable values of density $d_{RT}$ among the glasses, i.e. they are, by prediction, superior in terms of the combination of $d_{RT}$ and $n_d$ to the best known Comparative Glasses that have the features specified in Table 7.

FIG. 7 is a plot showing the relationship between the density $d_{RT}$ and the refractive index $n_d$ for some of the Exemplary Glasses and some of the Comparative Glasses. The Exemplary Glasses (filled circles) are the Examples 4 to 7, 9, 10, 26, 28, 30 to 36, 42 to 48, 53, 55, 57, 92, 94, 95, 97, 99, 101, 103, 105, 111, 113, 117, 118 and 122 from Table 5. The Comparative Glasses (open circles) are the Examples C6, C9 and C11 to C16 from Table 6. All of the Exemplary Glasses and Comparative Glasses shown in FIG. 7 have the features specified in Table 7. In FIG. 7, some of the above-enumerated compositions may be labeled for better visibility, some others may not, and some more glasses may not be shown, which does not affect the further conclusions.

The above-enumerated Comparative Glasses for FIG. 7 were selected as having the highest measured values of the refractive index $n_d$ at comparable values of the density $d_{RT}$ among the known glasses that have the features specified in Table 7.

The line corresponding to the formula y=1.54+0.1*x shown in FIG. 7 provides a visual representation of the differences between the Comparative Glasses having the features specified in Table 7 and the Exemplary Glasses 4 to 7, 9, 10, 26, 28, 30 to 36, 42 to 48, 53, 55, 57, 92, 94, 95, 97, 99, 101, 103, 105, 111, 113, 117, 118 and 122 according to the present disclosure. As can be seen in FIG. 7, the mentioned Exemplary Glasses (filled circles) and none of the Comparative Glasses (open circles) represented in FIG. 7 fall above the line y=1.54+0.1*x, where y corresponds to $n_d$ and x corresponds to $d_{RT}$. In other words, some of the Exemplary Glasses and none of the Comparative Glasses represented in FIG. 7 satisfy the following formula (VI)(a):

$$n_d-(1.54+0.1*d_{RT})>0.00 \quad\quad (VI)(a)$$

As can also be seen in FIG. 7, some of Exemplary Glasses and none of the Comparative Glasses represented in FIG. 7 fall above the line y=1.58+0.1*x, where y corresponds to $n_d$ and x corresponds to $d_{RT}$. In other words, some of the Exemplary Glasses and none of the Comparative Glasses represented in FIG. 7 satisfy the following formula (VI)(b):

$$n_d-(1.58+0.1*d_{RT})>0.00 \quad\quad (VI)(b)$$

This means that, under the conditions specified in Table 7 above, some of the Exemplary Glasses have higher measured values of the refractive index $n_d$ at comparable measured values of the density $d_{RT}$ than the best of the Comparative Glasses satisfying the same conditions. This can be interpreted as these Exemplary Glasses, according to measurements, have higher values of $n_d$ at comparable values of $d_{RT}$ among the glasses, i.e. they are, according to measurement, superior in terms of the combination of $d_{RT}$ and $n_d$ to the best known Comparative Glasses that have the features specified in Table 7.

The values of all attributes specified in Table 7 and Formulas (V)(a), (V)(b), (VI)(a) and (VI)(b) for the Comparative Glasses C1 to C16 plotted in FIGS. 6 and 7 are presented in Table 8 below. Full compositions of Comparative Glasses are presented in Table 6. Full compositions and above-mentioned attributes of the Exemplary Glasses from the present disclosure are presented in Table 5.

TABLE 8

Attributes of Comparative Example Glasses Having the Features of Table 7

| Ex. # | | C1 | C2 | C3 | C4 | C5 | C6 | C7 | C8 |
|---|---|---|---|---|---|---|---|---|---|
| | | Composition | | | | | | | |
| RO | mol. % | 5.70 | 54.30 | 13.67 | 17.88 | 17.86 | 24.02 | 18.37 | 4.30 |
| $TiO_2$ | mol. % | 13.50 | 1.29 | 14.74 | 16.00 | 15.98 | 19.99 | 15.06 | 10.72 |
| $K_2O$ | mol. % | 12.30 | 0.55 | 13.92 | 7.18 | 7.18 | 3.30 | 6.39 | 5.87 |
| CaO | mol. % | 1.20 | 6.12 | 13.67 | 2.68 | 2.68 | 8.02 | 2.68 | 4.30 |
| $Nb_2O_5$ | mol. % | 0 | 1.29 | 24.94 | 25.74 | 25.71 | 20.99 | 25.74 | 21.05 |

TABLE 8-continued

Attributes of Comparative Example Glasses Having the Features of Table 7

| | | | | | | | | | |
|---|---|---|---|---|---|---|---|---|---|
| MgO | mol. % | 1.20 | 1.28 | 0 | 0 | 0 | 0 | 0 | 0 |
| $Al_2O_3$ | mol. % | 5.70 | 0 | 0 | 0 | 0 | 0 | 0 | 0 |
| $Li_2O$ | mol. % | 0 | 1.72 | 0 | 0 | 0 | 3.28 | 0 | 0 |
| $V_2O_5$ | mol. % | 0 | 0 | 0 | 0 | 0 | 0 | 0 | 0 |
| $TeO_2 + SnO_2 + SnO$ | mol. % | 0 | 0 | 0 | 0 | 0 | 0 | 0 | 0 |
| $SiO_2 + GeO_2$ | mol. % | 0 | 0 | 0 | 0 | 0 | 0 | 0 | 0 |
| Measured properties | | | | | | | | | |
| $d_{RT}$ | g/cm³ | | | | | | 3.759 | | |
| $n_d$ | | 1.5711 | 1.792 | 1.8504 | 1.9186 | 1.9186 | 1.909 | 1.9186 | 1.780 |
| $n_d - (1.54 + 0.1 * d_{RT})$ | | | | | | | −0.0069 | | |
| $n_d - (1.58 + 0.1 * d_{RT})$ | | | | | | | −0.0469 | | |
| Predicted properties | | | | | | | | | |
| $P_d$ | g/cm³ | 2.8087 | 4.9638 | 3.3889 | 3.8305 | 3.8307 | 3.8096 | 3.8406 | 3.3212 |
| $P_n$ | | 1.5828 | 1.8204 | 1.8645 | 1.9043 | 1.9042 | 1.8999 | 1.9002 | 1.8001 |
| $P_n - (1.54 + 0.1 * P_d)$ | | −0.2380 | −0.2159 | −0.0143 | −0.0187 | −0.0188 | −0.0211 | −0.0238 | −0.0720 |
| $P_n - (1.58 + 0.1 * P_d)$ | | −0.2780 | −0.2559 | −0.0543 | −0.0587 | −0.0588 | −0.0611 | −0.0638 | −0.1120 |

| Ex. # | | C9 | C10 | C11 | C12 | C13 | C14 | C15 | C16 |
|---|---|---|---|---|---|---|---|---|---|
| Composition | | | | | | | | | |
| RO | mol. % | 33.62 | 12.24 | 8.33 | 15.63 | 26.04 | 29.00 | 24.05 | 8.33 |
| $TiO_2$ | mol. % | 3.33 | 9.92 | 10.42 | 18.12 | 21.97 | 9.99 | 9.99 | 10.42 |
| $K_2O$ | mol. % | 2.82 | 3.93 | 6.25 | 6.63 | 5.02 | 3.31 | 7.01 | 6.25 |
| CaO | mol. % | 1.58 | 7.07 | 8.33 | 15.04 | 1.00 | 10.00 | 8.00 | 8.33 |
| $Nb_2O_5$ | mol. % | 21.35 | 6.26 | 0 | 3.46 | 21.97 | 26.00 | 25.98 | 0 |
| MgO | mol. % | 0 | 0 | 0 | 0 | 0 | 0 | 0 | 0 |
| $Al_2O_3$ | mol. % | 0 | 0 | 0 | 1.19 | 0 | 0 | 0 | 0 |
| $Li_2O$ | mol. % | 2.97 | 0 | 0 | 0 | 0 | 3.28 | 0 | 0 |
| $V_2O_5$ | mol. % | 0 | 0 | 0 | 0 | 0 | 0 | 0 | 0 |
| $TeO_2 + SnO_2 + SnO$ | mol. % | 0 | 0 | 0 | 0 | 0 | 0 | 0 | 0 |
| $SiO_2 + GeO_2$ | mol. % | 4.24 | 5.05 | 0 | 0.34 | 0.0258 | 0 | 0 | 0 |
| Measured properties | | | | | | | | | |
| $d_{RT}$ | g/cm³ | 4.490 | | 2.806 | 2.900 | 3.957 | 3.857 | 3.746 | 2.810 |
| $n_d$ | | 1.9694 | 1.7991 | 1.580 | 1.6634 | 1.9096 | 1.897 | 1.885 | 1.583 |
| $n_d - (1.54 + 0.1 * d_{RT})$ | | −0.0196 | | −0.2406 | −0.1666 | −0.0261 | −0.0287 | −0.0296 | −0.238 |
| $n_d - (1.58 + 0.1 * d_{RT})$ | | −0.0596 | | −0.2806 | −0.2066 | −0.0661 | −0.0687 | −0.0696 | −0.278 |
| Predicted properties | | | | | | | | | |
| $P_d$ | g/cm³ | 4.8255 | 4.0806 | 2.9692 | 3.0871 | 4.0739 | 3.8995 | 3.7394 | 2.9692 |
| $P_n$ | | 1.9447 | 1.7903 | 1.6171 | 1.6843 | 1.9198 | 1.8971 | 1.8785 | 1.6171 |
| $P_n - (1.54 + 0.1 * P_d)$ | | −0.0778 | −0.1578 | −0.2199 | −0.1645 | −0.0276 | −0.0328 | −0.0354 | −0.2199 |
| $P_n - (1.58 + 0.1 * P_d)$ | | −0.1178 | −0.1978 | −0.2599 | −0.2045 | −0.0676 | −0.0728 | −0.0754 | −0.2599 |

As follows from FIGS. 6 and 7, both predicted and measured property data confirms that some Exemplary Glasses from the present disclosure have better combination of density $d_{RT}$ and refractive index $n_d$ than the best of the Comparative Glasses that have the features specified in Table 7.

Figure 8:
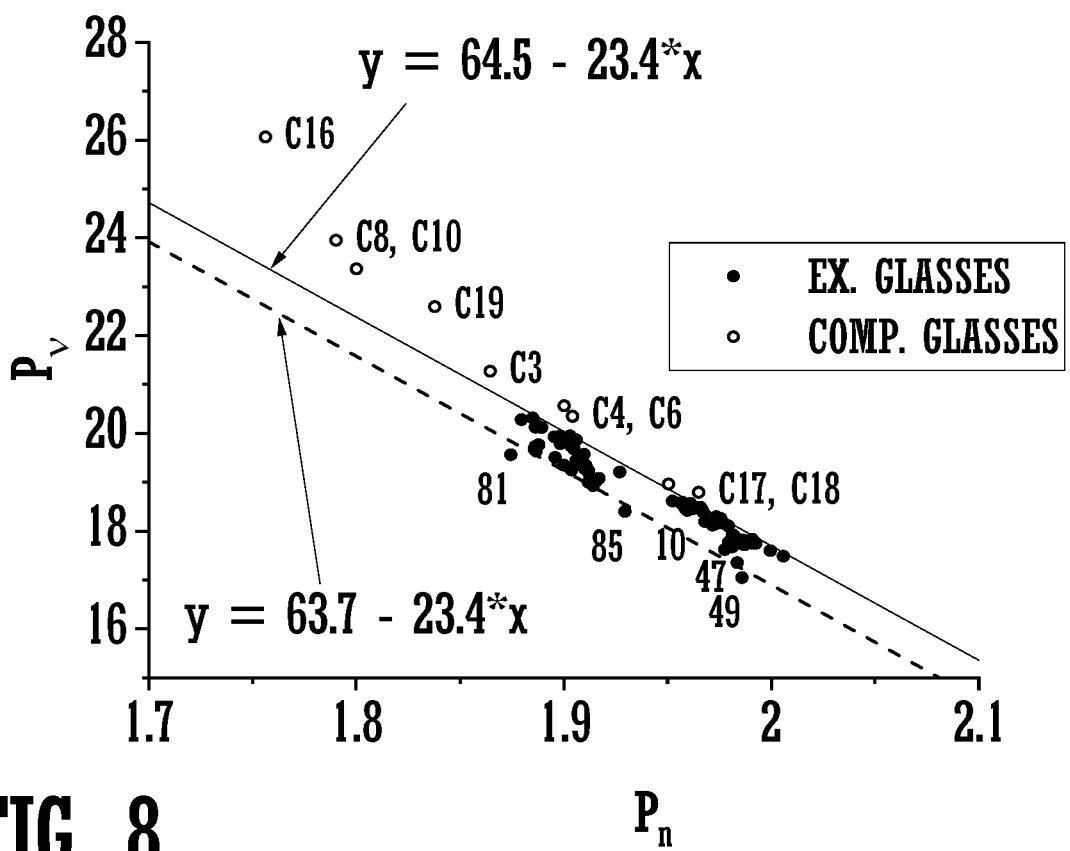
FIG. 8 is a plot illustrating the relationship between $P_n$ and $P_v$ for some Comparative Glasses and some Exemplary Glasses according to an embodiment of the present disclosure.

FIG. 8 is a plot showing the relationship between the refractive index parameter $P_n$ and the dispersion parameter $P_v$ for some of the Exemplary Glasses and some of the Comparative Glasses. The Exemplary Glasses (filled circles) are the Examples 6 to 10, 16 to 21, 26 to 29, 33 to 36, 38, 39, 42 to 77, 79 to 85, 87 to 89, 98, 99, 103, 104, 106 to 108, 110 to 117, 126 to 128, 130 to 133, 135 and 139 to 146 from Table 5. The Comparative Glasses (open circles) are the Examples C3 to C5, C7, C8, C10 and C17 to C20 from Table 6. The refractive index parameter $P_n$ that predicts refractive index at 587.56 nm was determined according to Formula (I). The dispersion parameter $P_v$ that predicts Abbe number was determined according to Formula (III) All of the Exemplary Glasses and Comparative Glasses shown in FIG. 8 have the features specified in Table 9. In Table 9, the specification "Not limited" refers to a limitation that was not considered when selecting the compositions. In FIG. 8, some of the above-enumerated compositions may be labeled for better visibility, some others may not, and some more glasses may not be shown, which does not affect the further conclusions.

TABLE 9

Limitations for glass compositions shown in FIG. 8

| Quantity | Unit | Min | Max |
|---|---|---|---|
| $P_2O_5$ | mol. % | 10 | 40 |
| $TiO_2$ | mol. % | 0.5 | 50 |
| $K_2O$ | mol. % | 0.5 | 35 |
| CaO | mol. % | 0.5 | 35 |
| $Nb_2O_5$ | mol. % | 0 | 50 |
| MgO | mol. % | 0 | 15 |
| $Al_2O_3$ | mol. % | 0 | 10 |
| $V_2O_5$ | mol. % | 0 | 1 |
| RO | mol. % | 4 | Not limited |
| $TeO_2 + SnO_2 + SnO$ | mol. % | 0 | 20 |
| $SiO_2 + GeO_2$ | mol. % | 0 | 15 |
| $P_n$ | | 1.75 | Not limited |

The above-enumerated Comparative Glasses were selected as having the lowest dispersion parameter $P_v$ at comparable values of refractive index parameter $P_n$ among the known glasses that have the features specified in Table 9.

The line corresponding to the formula y=64.5-23.4*x shown in FIG. 8 provides a visual representation of the differences between the Comparative Glasses having the features specified in Table 9 and the Exemplary Glasses 6 to 10, 16 to 21, 26 to 29, 33 to 36, 38, 39, 42 to 77, 79 to 85, 87 to 89, 98, 99, 103, 104, 106 to 108, 110 to 117, 126 to 128, 130 to 133, 135 and 139 to 146 according to the present disclosure. As can be seen in FIG. 8, the mentioned Exemplary Glasses (filled circles) and none of the Comparative Glasses (open circles) represented in FIG. 8 fall below the line y=64.5-23.4*x, where y corresponds to the dispersion parameter $P_v$ and x corresponds to the refractive index parameter $P_n$. In other words, some of the Exemplary Glasses and none of the Comparative Glasses represented in FIG. 8 satisfy the following formula (VII)(a):

$$P_v-(64.5-23.4*P_n)<0 \qquad (VII)(a)$$

As can also be seen in FIG. 8, some of Exemplary Glasses and none of the Comparative Glasses represented in FIG. 8 fall below the line y=63.7-23.4*x, where y corresponds to the dispersion parameter $P_v$ and x corresponds to the refractive index parameter $P_n$. In other words, some of the Exemplary Glasses and none of the Comparative Glasses represented in FIG. 8 satisfy the following formula (VII)(b):

$$P_v-(63.7-23.4*P_n)<0 \qquad (VII)(b)$$

This means that, under the conditions specified in Table 9, some of the Exemplary Glasses from the present disclosure have lower values of $P_v$ at comparable values of $P_n$ than the best of the Comparative Glasses satisfying the same conditions. In other words, these Exemplary Glasses, by prediction, have lower values of the Abbe number $v_d$ at comparable values of refractive index $n_d$ among the glasses, i.e. they are, by prediction, superior in terms of combination of the $n_d$ and $v_d$ to best known Comparative Glasses that have the features specified in Table 9.

Figure 9:
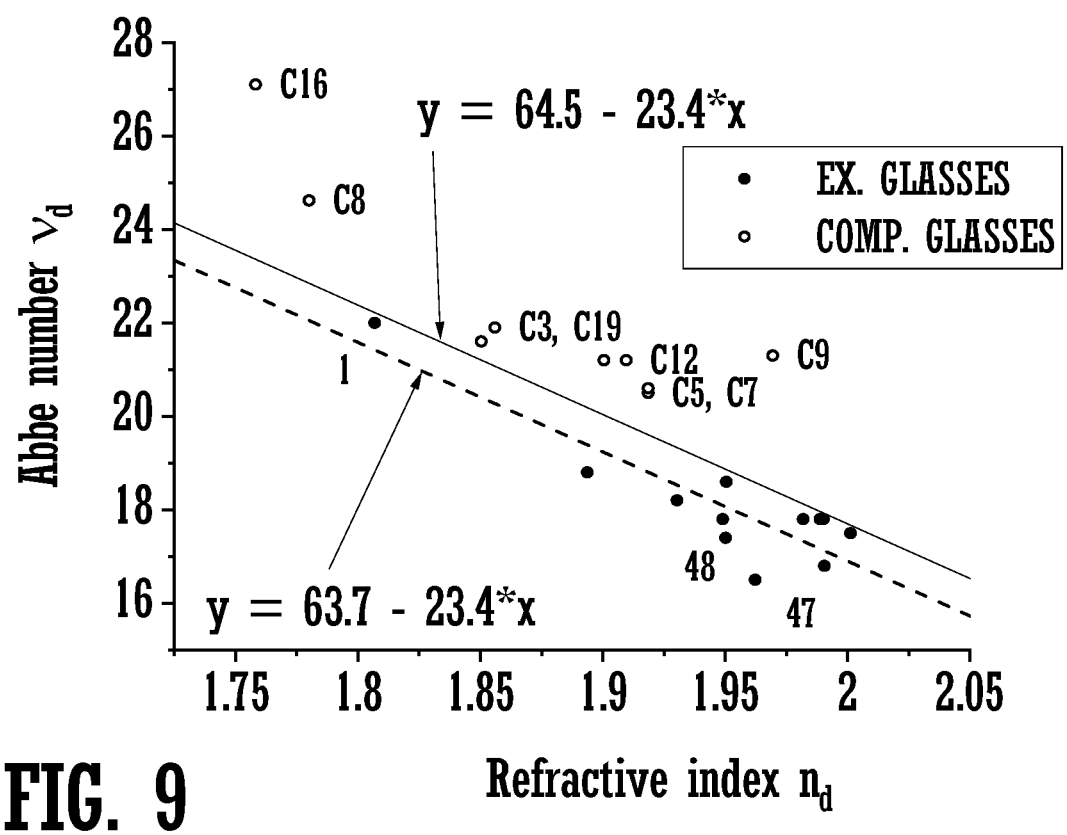
FIG. 9 is a plot illustrating the relationship between the refractive index $n_d$ and the Abbe number $v_d$ for some Comparative Glasses and some Exemplary Glasses according to an embodiment of the present disclosure.

FIG. 9 is a plot showing the relationship between the refractive index $n_d$ and the Abbe number $v_d$ for some of the Exemplary Glasses and some of the Comparative Glasses. The Exemplary Glasses (filled circles) are the Examples 1, 15, 22 to 25, 33 to 35, 47, 48, 55 and 57 from Table 5. The Comparative Glasses (open circles) are the Examples C3, C5, C7 to C9, C13, C17 and C20 to C22 from Table 6. All of the Exemplary Glasses and Comparative Glasses shown in FIG. 9 have the features specified in Table 10. In Table 10, the specification "Not limited" refers to a limitation that was not considered when selecting the compositions. In FIG. 9, some of the above-enumerated compositions may be labeled for better visibility, some others may not, and some more glasses may not be shown, which does not affect the further conclusions.

TABLE 10

Limitations for glass compositions shown in FIG. 9

| Quantity | Unit | Min | Max |
|---|---|---|---|
| $P_2O_5$ | mol. % | 10 | 40 |
| $TiO_2$ | mol. % | 0.5 | 50 |
| $K_2O$ | mol. % | 0.5 | 35 |

TABLE 10-continued

Limitations for glass compositions shown in FIG. 9

| Quantity | Unit | Min | Max |
|---|---|---|---|
| CaO | mol. % | 0.5 | 35 |
| $Nb_2O_5$ | mol. % | 0 | 50 |
| MgO | mol. % | 0 | 15 |
| $Al_2O_3$ | mol. % | 0 | 10 |
| $V_2O_5$ | mol. % | 0 | 1 |
| RO | mol. % | 4 | Not limited |
| $TeO_2 + SnO_2 + SnO$ | mol. % | 0 | 20 |
| $SiO_2 + GeO_2$ | mol. % | 0 | 15 |
| $n_d$ | | 1.75 | Not limited |

The above-enumerated Comparative Glasses were selected as having the lowest measured values of the Abbe number $v_d$ at comparable values of the measured refractive index $n_d$ among the known glasses that have the features specified in Table 10.

The line corresponding to the formula y=64.5-23.4*x shown in FIG. 9 provides a visual representation of the differences between the Comparative Glasses having the features specified in Table 10 and the Exemplary Glasses 1, 15, 22 to 25, 33 to 35, 47, 48, 55 and 57. As can be seen in FIG. 9, the mentioned Exemplary Glasses (filled circles) and none of the Comparative Glasses (open circles) represented in FIG. 9 fall below the line y=64.5-23.4*x, where y corresponds to $v_d$ and x corresponds to $n_d$. In other words, some of the Exemplary Glasses and none of the Comparative Glasses represented in FIG. 9 satisfy the following formula (VIII)(a):

$$v_d-(64.5-23.4*n_d)<0 \qquad (VIII)(a)$$

As can also be seen in FIG. 9, some of the Exemplary Glasses and none of the Comparative Glasses represented in FIG. 9 fall below the line y=63.7-23.4*x, where y corresponds to $v_d$ and x corresponds to $n_d$. In other words, some of the Exemplary Glasses and none of the Comparative Glasses represented in FIG. 9 satisfy the following formula (VIII)(b):

$$v_d-(63.7-23.4*n_d)<0 \qquad (VIII)(b)$$

This means that, under the conditions specified in Table 10, some of the Exemplary Glasses have lower measured values of the Abbe number $v_d$ at comparable measured values of the refractive index $n_d$ than the best of the Comparative Glasses satisfying the same conditions. This can be interpreted as these Exemplary Glasses, according to measurements, have lower values of $v_d$ at comparable values of $n_d$ among the glasses, i.e. they are, according to measurement, superior in terms of the combination of $n_d$ and $v_d$ to the best known Comparative Glasses that have the features specified in Table 10.

The values of all attributes specified in Tables 9 and 10 and Formulas (VII)(a), (VII)(b), (VIII)(a) and (VIII)(b) for the Comparative Glasses C3 to C5, C7 to C10, C13 and C17 to C22 plotted in FIGS. 8 and 9 are presented in Table 11 below. Full compositions of Comparative Glasses are presented in Table 6. Full compositions and above-mentioned attributes of the Exemplary Glasses are presented in Table 5.

TABLE 11

Attributes of Comparative Example Glasses Having the Features of Tables 9 and 10

| Ex. # | | C3 | C4 | C5 | C7 | C8 | C9 | C10 | C13 |
|---|---|---|---|---|---|---|---|---|---|
| Composition | | | | | | | | | |
| RO | mol. % | 13.67 | 17.88 | 17.86 | 18.37 | 4.30 | 33.62 | 12.24 | 26.04 |
| $TiO_2$ | mol. % | 14.74 | 16.00 | 15.98 | 15.06 | 10.72 | 3.33 | 9.92 | 21.97 |
| $K_2O$ | mol. % | 13.92 | 7.18 | 7.18 | 6.39 | 5.87 | 2.82 | 3.93 | 5.02 |
| CaO | mol. % | 13.67 | 2.68 | 2.68 | 2.68 | 4.30 | 1.58 | 7.07 | 1.00 |
| $Nb_2O_5$ | mol. % | 24.94 | 25.74 | 25.71 | 25.74 | 21.05 | 21.35 | 6.26 | 21.97 |
| MgO | mol. % | 0 | 0 | 0 | 0 | 0 | 0 | 0 | 0 |
| $Al_2O_3$ | mol. % | 0 | 0 | 0 | 0 | 0 | 0 | 0 | 0 |
| $V_2O_5$ | mol. % | 0 | 0 | 0 | 0 | 0 | 0 | 0 | 0 |
| $TeO_2 + SnO_2 + SnO$ | mol. % | 0 | 0 | 0 | 0 | 0 | 0 | 0 | 0 |
| $SiO_2 + GeO_2$ | mol. % | 0 | 0 | 0 | 0 | 0 | 4.24 | 5.05 | 0.0258 |
| Measured properties | | | | | | | | | |
| $n_d$ | | 1.8504 | 1.9186 | 1.9186 | 1.9186 | 1.780 | 1.9694 | 1.7991 | 1.9096 |
| $v_d$ | | 21.6 | 20.6 | 20.6 | 20.5 | 24.6 | 21.3 | 24.6 | 21.2 |
| $d_{RT}$ | g/cm³ | | | | | | 4.490 | | 3.957 |
| $n_d - (1.544 + 0.1 * d_{RT})$ | | | | | | | −0.0236 | | −0.0301 |
| $v_d - (64.5 - 23.4 * n_d)$ | | 0.3994 | 0.9952 | 0.9952 | 0.8952 | 1.772 | 2.884 | 2.1589 | 1.3846 |
| $v_d - (63.7 - 23.4 * n_d)$ | | 1.1994 | 1.7952 | 1.7952 | 1.6952 | 2.572 | 3.684 | 2.9589 | 2.1846 |
| Predicted properties | | | | | | | | | |
| $P_n$ | | 1.8645 | 1.9043 | 1.9042 | 1.9002 | 1.8001 | 1.9447 | 1.7903 | 1.9198 |
| $P_v$ | | 21.27 | 20.35 | 20.35 | 20.56 | 23.36 | 21.74 | 23.95 | 20.02 |
| $P_d$ | g/cm³ | 3.3889 | 3.8305 | 3.8307 | 3.8406 | 3.3212 | 4.8255 | 4.0806 | 4.0739 |
| $P_n - (1.544 + 0.1 * P_d)$ | | −0.0183 | −0.0227 | −0.0228 | −0.0278 | −0.076 | −0.0818 | −0.1618 | −0.0316 |
| $P_v - (64.5 - 23.4 * P_n)$ | | 0.4016 | 0.4073 | 0.4096 | 0.5276 | 0.9863 | 2.7436 | 1.3426 | 0.4415 |
| $P_v - (63.7 - 23.4 * P_n)$ | | 1.2016 | 1.2073 | 1.2096 | 1.3276 | 1.7863 | 3.5436 | 2.1426 | 1.2415 |

| Ex. # | | C17 | C18 | C19 | C20 | C21 | C22 |
|---|---|---|---|---|---|---|---|
| Composition | | | | | | | |
| RO | mol. % | 5.91 | 13.16 | 13.02 | 4.09 | 18.38 | 21.18 |
| $TiO_2$ | mol. % | 9.95 | 11.22 | 14.99 | 15.46 | 15.06 | 10.76 |
| $K_2O$ | mol. % | 8.21 | 5.01 | 5.02 | 3.92 | 6.39 | 7.60 |
| CaO | mol. % | 5.91 | 4.14 | 7.01 | 4.09 | 2.68 | 12.77 |
| $Nb_2O_5$ | mol. % | 16.12 | 35.71 | 32.00 | 14.75 | 25.75 | 25.38 |
| MgO | mol. % | 0 | 0 | 0 | 0 | 0 | 0 |
| $Al_2O_3$ | mol. % | 0 | 0 | 0 | 0 | 0 | 0 |
| $V_2O_5$ | mol. % | 0 | 0 | 0 | 0 | 0 | 0 |
| $TeO_2 + SnO_2 + SnO$ | mol. % | 0 | 0 | 0 | 0 | 0 | 0 |
| $SiO_2 + GeO_2$ | mol. % | 8.27 | 0.0269 | 0 | 0 | 0 | 0 |
| Measured properties | | | | | | | |
| $n_d$ | | 1.7582 | 1.971 | 1.966 | 1.8559 | 1.9186 | 1.9005 |
| $v_d$ | | 27.1 | | | 21.9 | 20.5 | 21.2 |
| $d_{RT}$ | g/cm³ | | 3.785 | 3.624 | | | |
| $n_d - (1.544 + 0.1 * d_{RT})$ | | | 0.0485 | 0.0596 | | | |
| $v_d - (64.5 - 23.4 * n_d)$ | | 3.7419 | | | 0.8281 | 0.8952 | 1.1717 |
| $v_d - (63.7 - 23.4 * n_d)$ | | 4.5419 | | | 1.6281 | 1.6952 | 1.9717 |
| Predicted properties | | | | | | | |
| $P_n$ | | 1.7563 | 1.965 | 1.9505 | 1.8379 | 1.9003 | 1.8707 |
| $P_v$ | | 26.06 | 18.79 | 18.96 | 22.59 | 20.56 | 22.20 |
| $P_d$ | g/cm³ | 3.1996 | 3.7414 | 3.7054 | 3.6359 | 3.8406 | 3.6232 |
| $P_n - (1.544 + 0.1 * P_d)$ | | −0.1076 | 0.0468 | 0.036 | −0.0697 | −0.0278 | −0.0356 |
| $P_v - (64.5 - 23.4 * P_n)$ | | 2.6590 | 0.2754 | 0.1042 | 1.0970 | 0.5271 | 1.4716 |
| $P_v - (63.7 - 23.4 * P_n)$ | | 3.4590 | 1.0754 | 0.9042 | 1.8970 | 1.3271 | 2.2716 |

As follows from FIGS. 8 and 9, both predicted and measured property data confirms that some Exemplary Glasses have better combination of density $d_{RT}$, refractive index $n_d$ and/or Abbe number $v_d$ than the best of the Comparative Glasses that have the features specified in Tables 9 and 10.

The following non-limiting aspects are encompassed by the present disclosure. To the extent not already described, any one of the features of the first through the forty-first aspect may be combined in part or in whole with features of any one or more of the other aspects of the present disclosure to form additional aspects, even if such a combination is not explicitly described.

According to a first aspect, the glass comprises a plurality of components, the glass having a composition of the components comprising greater than or equal 10.0 mol. % and less than or equal to 40.0 mol. % $P_2O_5$, greater than or equal to 0.5 mol. % and less than or equal to 50.0 mol. % $TiO_2$, greater than or equal to 0.5 mol. % and less than or equal to 35.0 mol. % $K_2O$, greater than or equal to 0.5 mol. % and less than or equal to 35.0 mol. % CaO, greater than or equal to 0.0 mol. % and less than or equal to 50.0 mol. % $Nb_2O_5$, greater than or equal to 0.0 mol. % and less than or equal to 15.0 mol. % MgO, greater than or equal to 0.0 mol. % and less than or equal to 10.0 mol. % $Al_2O_3$, greater than or equal to 0.0 mol. % and less than or equal to 4.5 mol. % Li$_2$O, greater than or equal to 0.0 mol. % and less than or equal to 1.0 mol. % V$_2$O$_5$, greater than or equal to 4.0 mol. % RO, greater than or equal to 0.0 mol. % and less than or equal to 20.0 mol. % for a sum of TeO$_2$+SnO$_2$+SnO, greater than or equal to 0.0 mol. % and less than or equal to 15.0 mol. % for a sum of SiO$_2$+GeO$_2$ and may optionally contain one or more components selected from Na$_2$O, WO$_3$, BaO, SrO, ZnO, PbO, Bi$_2$O$_3$, B$_2$O$_3$, ZrO$_2$, Tl$_2$O, Ag$_2$O, Cs$_2$O, Ga$_2$O$_3$, La$_2$O$_3$, MoO$_3$ and Ta$_2$O$_5$, the glass satisfying the condition: P$_n$−(1.54+0.1*P$_d$)>0.00, where P$_n$ is a refractive index parameter calculated from the glass composition in terms of mol. % of the components according to the Formula (I):

$$P_n = -0.0043794*P_2O_5 + 0.0072428*Nb_2O_5 + 0.0037304*TiO_2 - 0.00039553*BaO - 0.0032012*K_2O - 0.00060689*CaO - 0.0024218*Na_2O - 0.0014988*Li_2O + 0.0028587*WO_3 + 0.0083295*Bi_2O_3 - 0.0031637*B_2O_3 - 0.0030702*SiO_2 - 0.00030248*ZnO + 0.0020025*ZrO_2 - 0.0018173*MgO - 0.0032886*Al_2O_3 + 0.0024221*TeO_2 + 0.0038137*PbO - 0.0016392*GeO_2 + 0.0063024*Tl_2O + 0.0048765*Ag_2O + 1.81451, \quad (I)$$

P$_d$ is a density parameter calculated from the glass composition in terms of mol. % of the components according to the Formula (II):

$$P_d[g/cm^3] = 3.98457 - 0.015773*Al_2O_3 - 0.014501*B_2O_3 + 0.019328*BaO + 0.060758*Bi_2O_3 - 0.0012685*CaO + 0.023111*CdO + 0.0053184*Cs_2O + 0.011488*Ga_2O_3 - 0.0015416*GeO_2 - 0.013342*K_2O + 0.058319*La_2O_3 - 0.007918*Li_2O - 0.0021423*MgO - 0.0024413*MoO_3 - 0.0082226*Na_2O + 0.0084961*Nb_2O_5 - 0.020501*P_2O_5 + 0.038898*PbO - 0.012720*SiO_2 + 0.013948*SrO + 0.047924*Ta_2O_5 + 0.011248*TeO_2 - 0.0092491*V_2O_5 + 0.028913*WO_3 + 0.0074702*ZnO + 0.0096721*ZrO_2, \quad (II)$$

where RO is a total sum of divalent metal oxides, and a symbol "*" means multiplication.

According to a second aspect, the glass of the first aspect, wherein the glass satisfies the condition: n$_d$−(1.54+0.1*d$_{RT}$)>0.00, where n$_d$ a is a refractive index of the glass at 587.56 nm, d$_{RT}$[g/cm$^3$] is a density of the glass at room temperature.

According to a third aspect, the glass of any one of aspects 1-2, wherein the glass satisfies the condition: n$_d$−(1.58+0.1*d$_{RT}$)>0.00, where n$_d$ is a refractive index of the glass at 587.56 nm, d$_{RT}$ [g/cm$^3$] is a density of the glass at room temperature.

According to a fourth aspect, the glass of any one of aspects 1-3, wherein the glass satisfies the condition: P$_n$−(1.58+0.1*P$_d$)>0.00.

According to a fifth aspect, the glass of any one of aspects 1-4, wherein the glass further has predicted properties, calculated from chemical composition, that satisfy the following criteria satisfies the condition: P$_d$<4.2 g/cm$^3$.

According to a sixth aspect, the glass of any one of aspects 1-5, wherein the glass has a density at room temperature, d$_{RT}$, less than or equal to 4.2 g/cm$^3$.

According to a seventh aspect, the glass of the sixth aspect, wherein the density at room temperature, d$_{RT}$, is less than or equal to 3.8 g/cm$^3$.

According to an eighth aspect, the glass of any one of aspects 1-7, wherein the glass satisfies the condition: P$_n$>1.8.

According to a ninth aspect, the glass of any one of aspects 1-8, wherein the glass has a refractive index at 587.56 nm, n$_d$, greater than or equal to 1.8.

According to a tenth aspect, the glass of the ninth aspect, wherein the refractive index at 587.56 nm, n$_d$, is greater than or equal to 1.95.

According to an eleventh aspect, the glass satisfies the condition: P$_{ref}$>0.24 cm$^3$/g, where P$_{ref}$ is a refraction parameter calculated from the glass composition in terms of mol. % of the components according to the Formula (IV):

$$P_{ref}[cm^3/g] = 0.223637 + 0.0010703*Nb_2O_5 - 0.00041688*P_2O_5 + 0.00088482*TiO_2 + 0.000054956*CaO - 0.00029243*K_2O - 0.0008347*BaO - 0.00023739*Na_2O + 0.000082792*Li_2O - 0.0012487*WO_3 - 0.00042393*ZnO - 0.00059152*SrO - 0.00018266*MgO - 0.0014091*Bi_2O_3 - 0.0014895*Ta_2O_5 - 0.00021842*SiO_2 - 0.00024788*ZrO_2 - 0.00014801*B_2O_3 - 0.000060848*TeO_2 - 0.00085564*PbO - 0.00042429*GeO_2 - 0.0015439*Tl_2O - 0.0012936*Ag_2O - 0.00089356*Cu_2O - 0.00039278*CuO + 0.00017895*As_2O_3 - 0.00011802*Sb_2O_3. \quad (IV)$$

According to a twelfth aspect, the glass of any one of aspects 1-11, wherein the glass further has a refraction"), (n$_d$−1)/d$_{RT}$, greater than or equal to 0.24 cm$^3$/g.

According to a thirteenth aspect, the glass of the twelfth aspect, wherein the refraction"), (n$_d$−1)/d$_{RT}$, is greater than or equal to 0.25 cm$^3$/g.

According to a fourteenth aspect, the glass of any one of aspects 1-13, wherein the composition of the components comprises: greater than or equal to 15.0 mol. % and less than or equal to 35.0 mol. % P$_2$O$_5$, greater than or equal to 10.0 mol. % and less than or equal to 40.0 mol. % Nb$_2$O$_5$, greater than or equal to 0.5 mol. % and less than or equal to 40.0 mol. % TiO$_2$, greater than or equal to 0.5 mol. % and less than or equal to 30.0 mol. % CaO, greater than or equal to 0.5 mol. % and less than or equal to 20.0 mol. % K$_2$O, greater than or equal to 0.0 mol. % and less than or equal to 20.0 mol. % BaO, greater than or equal to 0.0 mol. % and less than or equal to 20.0 mol. % Na$_2$O, greater than or equal to 0.0 mol. % and less than or equal to 10.0 mol. % WO$_3$, greater than or equal to 0.0 mol. % and less than or equal to 4.0 mol. % Bi$_2$O$_3$ and greater than or equal to 0.0 mol. % and less than or equal to 2.0 mol. % Ta$_2$O$_5$.

According to a fifteenth aspect, the glass of any one of aspects 1-14, wherein the composition of the components comprises: greater than or equal to 21.0 mol. % and less than or equal to 30.0 mol. % P$_2$O$_5$, greater than or equal to 13.0 mol. % and less than or equal to 38.0 mol. % Nb$_2$O$_5$, greater than or equal to 9.0 mol. % and less than or equal to 37.0 mol. % TiO$_2$, greater than or equal to 4.0 mol. % and less than or equal to 23.0 mol. % CaO, greater than or equal to 4.0 mol. % and less than or equal to 16.0 mol. % K$_2$O, greater than or equal to 0.0 mol. % and less than or equal to 14.5 mol. % BaO, greater than or equal to 0.0 mol. % and less than or equal to 13.5 mol. % Na$_2$O, greater than or equal to 0.0 mol. % and less than or equal to 8.5 mol. % WO$_3$, greater than or equal to 0.0 mol. % and less than or equal to 3.4 mol. % Bi$_2$O$_3$, greater than or equal to 0.0 mol. % and less than or equal to 1.8 mol. % Ta$_2$O$_5$ and greater than or equal to 0.0 mol. % and less than or equal to 0.9 mol. % SiO$_2$.

According to a sixteenth aspect, the glass of any one of aspects 1-14, wherein the composition of the components comprises: greater than or equal to 22.0 mol. % and less than or equal to 29.0 mol. % P$_2$O$_5$, greater than or equal to 16.0 mol. % and less than or equal to 35.0 mol. % Nb$_2$O$_5$, greater than or equal to 12.0 mol. % and less than or equal to 34.0 mol. % TiO$_2$, greater than or equal to 5.5 mol. % and less than or equal to 20.5 mol. % CaO, greater than or equal to 5.0 mol. % and less than or equal to 14.5 mol. % K$_2$O, greater than or equal to 0.0 mol. % and less than or equal to 13.0 mol. % BaO, greater than or equal to 0.0 mol. % and less than or equal to 12.0 mol. % Na$_2$O, greater than or equal to 0.0 mol. % and less than or equal to 7.5 mol. % WO$_3$, greater than or equal to 0.0 mol. % and less than or equal to 4.0 mol. % Li$_2$O, greater than or equal to 0.0 mol. % and less than or equal to 3.0 mol. % Bi$_2$O$_3$, greater than or equal to 0.0 mol. % and less than or equal to 1.6 mol. % Ta$_2$O$_5$ and greater than or equal to 0.0 mol. % and less than or equal to 0.8 mol. % SiO$_2$.

According to a seventeenth aspect, the glass of any one of aspects 1-13, wherein the composition of the components comprises: greater than or equal to 21.7 mol. % and less than or equal to 24.7 mol. % P$_2$O$_5$, greater than or equal to 21.0 mol. % and less than or equal to 35.0 mol. % Nb$_2$O$_5$, greater than or equal to 13.0 mol. % and less than or equal to 33.0 mol. % TiO$_2$, greater than or equal to 6.0 mol. % and less than or equal to 17.0 mol. % BaO, greater than or equal to 2.0 mol. % and less than or equal to 13.5 mol. % K$_2$O, greater than or equal to 0.5 mol. % and less than or equal to 14.5 mol. % CaO, greater than or equal to 0.0 mol. % and less than or equal to 10.5 mol. % Na$_2$O, greater than or equal to 0.0 mol. % and less than or equal to 7.5 mol. % SrO, greater than or equal to 0.0 mol. % and less than or equal to 4.6 mol. % Bi$_2$O$_3$, greater than or equal to 0.0 mol. % and less than or equal to 4.6 mol. % WO$_3$, greater than or equal to 0.0 mol. % and less than or equal to 4.6 mol. % ZnO and greater than or equal to 0.0 mol. % and less than or equal to 2.5 mol. % MgO.

According to an eighteenth aspect, a glass of any one of aspects 1-17, wherein when cooled in air from 1100° C. to 500° C. in 2.5 minutes, the glass does not crystallize.

According to a nineteenth aspect, a method for manufacturing an optical element, the method comprising processing a glass of any one of aspects 1-18.

According to a twentieth aspect, an optical element comprising a glass of any one of aspects 1-19.

According to a twenty-first aspect, the glass contains greater than or equal to 10.0 mol. % and less than or equal to 40.0 mol. % P$_2$O$_5$, greater than or equal to 1.0 mol. % and less than or equal to 50.0 mol. % TiO$_2$, greater than or equal to 1.0 mol. % and less than or equal to 35.0 mol. % K$_2$O, greater than or equal to 1.0 mol. % and less than or equal to 35.0 mol. % CaO, greater than or equal to 0.0 mol. % and less than or equal to 50.0 mol. % Nb$_2$O$_5$, greater than or equal to 0.0 mol. % and less than or equal to 15.0 mol. % MgO, greater than or equal to 0.0 mol. % and less than or equal to 10.0 mol. % Al$_2$O$_3$, greater than or equal to 0.0 mol. % and less than or equal to 1.0 mol. % V$_2$O$_5$, greater than or equal to 4.0 mol. % RO, greater than or equal to 0.0 mol. % and less than or equal to 20.0 mol. % for a sum of TeO$_2$+SnO$_2$+SnO, greater than or equal to 0.0 mol. % and less than or equal to 15.0 mol. % for a sum of SiO$_2$+GeO$_2$ and may optionally contain one or more components selected from Na$_2$O, Li$_2$O, WO$_3$, BaO, SrO, ZnO, PbO, Bi$_2$O$_3$, B$_2$O$_3$, ZrO$_2$, Tl$_2$O, Ag$_2$O, Ga$_2$O$_3$, MoO$_3$ and Ta$_2$O$_5$, wherein the glass satisfies the conditions: P$_n$>1.75 and P$_v$−(64.5−23.4*P$_n$)<0.00, where P$_n$ is a refractive index parameter calculated from the glass composition in terms of mol. % of the components according to the Formula (I):

P$_n$=−0.0043794*P$_2$O$_5$+0.0072428*Nb$_2$O$_5$+
0.0037304*TiO$_2$−0.00039553*BaO−
0.0032012*K$_2$O−0.00060689*CaO−
0.0024218*Na$_2$O−0.0014988*Li$_2$O+
0.0028587*WO$_3$+0.0083295*Bi$_2$O$_3$−
0.0031637*B$_2$O$_3$−0.0030702*SiO$_2$−
0.00030248*ZnO+0.0020025*ZrO$_2$−
0.0018173*MgO−0.0032886*Al$_2$O$_3$+
0.0024221*TeO$_2$+0.0038137*PbO−
0.0016392*GeO$_2$+0.0063024*Tl$_2$O+
0.0048765*Ag$_2$O+1.81451, (I)

P$_v$ is a dispersion parameter, calculated from the glass composition in terms of mol. % of the components according to the Formula (III):

P$_v$=exp(2.11+0.0438*(exp(3.25980+
0.0072248*Al$_2$O$_3$+0.0055494*B$_2$O$_3$+
0.0024164*BaO−0.00849*Bi$_2$O$_3$+
0.0029812*CaO+0.0092768*CdO+
0.0099821*Ga$_2$O$_3$−0.0038579*GeO$_2$+
0.0028062*K$_2$O+0.0031951*Li$_2$O+
0.0027011*MgO+0.007976*MoO$_3$+
0.0028705*Na$_2$O−0.013374*Nb$_2$O$_5$+
0.0072007*P$_2$O$_5$−0.0049796*PbO+
0.0032241*SiO$_2$+0.0050024*SrO−
0.002136*Ta$_2$O$_5$−0.0032329*TeO$_2$−
0.009788*TiO$_2$+0.0074782*V$_2$O$_5$−
0.0057095*WO$_3$+0.0032826*ZnO+
0.009302*ZrO$_2$))), (III)

where RO is a total sum of divalent metal oxides and a symbol "*" means multiplication.

According to a twenty-second aspect, the glass of the twenty-first aspect, wherein the glass has a refractive index at 587.56 nm, n$_d$, greater than or equal to 1.75, wherein the glass satisfy satisfies the conditions: ν$_d$−(64.5−23.4*n$_d$)<0.00 and ν$_d$−(63.7−23.4*n$_d$)<0.00, where ν$_d$ is an Abbe number of the glass.

According to a twenty-third aspect, the glass of any one of aspects 21-22, wherein the glass satisfies the condition: ν$_d$−(63.7−23.4*n$_d$)<0.00, where ν$_d$ is an Abbe number of the glass, and n$_d$ is a refractive index of the glass at 587.56 nm.

According to a twenty-fourth aspect, the glass of any one of aspects 21-23, wherein the glass satisfies the condition: P$_v$−(63.7−23.4*P$_n$)<0.00.

According to a twenty-fifth aspect, the glass of any one of aspects 21-24, wherein the glass satisfies the condition: P$_d$<4.2 g/cm$^3$, where P$_d$ is a density parameter calculated from the glass composition in terms of mol. % of the components according to the Formula (II):

P$_d$[g/cm$^3$]=3.98457−0.015773*Al$_2$O$_3$−
0.014501*B$_2$O$_3$+0.019328*BaO+
0.060758*Bi$_2$O$_3$−0.0012685*CaO+
0.023111*CdO+0.0053184*Cs$_2$O+
0.011488*Ga$_2$O$_3$−0.0015416*GeO$_2$−
0.013342*K$_2$O+0.058319*La$_2$O$_3$−
0.007918*Li$_2$O−0.0021423*MgO−
0.0024413*MoO$_3$−0.0082226*Na$_2$O+
0.0084961*Nb$_2$O$_5$−0.020501*P$_2$O$_5$+
0.038898*PbO−0.012720*SiO$_2$+0.013948*SrO+
0.047924*Ta$_2$O$_5$+0.011248*TeO$_2$−
0.0092491*V$_2$O$_5$+0.028913*WO$_3$+
0.0074702*ZnO+0.0096721*ZrO$_2$. (II)

According to a twenty-sixth aspect, the glass of any one of aspects 21-25, wherein the glass has a density at room temperature, d$_{RT}$, less than or equal to 4.2 g/cm$^3$.

According to a twenty-seventh aspect, the density at room temperature, d$_{RT}$ is less than or equal to 3.8 g/cm$^3$.

According to a twenty-eighth aspect, the glass of any one of aspects 21-27, wherein the glass satisfies the condition: P$_n$>1.8.

According to a twenty-ninth aspect, the glass of any one of aspects 21-28, wherein the glass has a refractive index at 587.56 nm, n$_d$ greater than or equal to 1.8.

According to a thirtieth aspect, the glass of the twenty-ninth aspect, wherein the glass has a refractive index at 587.56 nm, n$_d$, greater than or equal to 1.95.

According to a thirty-first aspect, the glass of any one of aspects 21-30, wherein the glass satisfies the condition:

$P_{ref} > 0.24$ cm³/g, where $P_{ref}$ is a refraction parameter calculated from the glass composition in terms of mol. % of the components according to the Formula (IV):

$$P_{ref}[cm^3/g] = 0.223637 + 0.0010703*Nb_2O_5 - 0.00041688*P_2O_5 + 0.00088482*TiO_2 + 0.000054956*CaO - 0.00029243*K_2O - 0.0008347*BaO - 0.00023739*Na_2O + 0.000082792*Li_2O - 0.0012487*WO_3 - 0.00042393*ZnO - 0.00059152*SrO - 0.00018266*MgO - 0.0014091*Bi_2O_3 - 0.0014895*Ta_2O_5 - 0.00021842*SiO_2 - 0.00024788*ZrO_2 - 0.00014801*B_2O_3 - 0.000060848*TeO_2 - 0.00085564*PbO - 0.00042429*GeO_2 - 0.0015439*Tl_2O - 0.0012936*Ag_2O - 0.00089356*Cu_2O - 0.00039278*CuO + 0.00017895*As_2O_3 - 0.00011802*Sb_2O_3. \quad (IV)$$

According to a thirty-second aspect, the glass of any one of aspects 21-31, wherein the glass has a refraction, $(n_d-1)/d_{RT}$, greater than or equal to 0.24 cm³/g.

According to a thirty-third aspect, the glass of the thirty-second aspect, wherein the glass has a refraction, $(n_d-1)/d_{RT}$, greater than or equal to 0.25 cm³/g.

According to a thirty-fourth aspect, the glass of any one of aspects 21-33, wherein the composition of the components comprises: greater than or equal to 15.0 mol. % and less than or equal to 35.0 mol. % $P_2O_5$, greater than or equal to 10.0 mol. % and less than or equal to 40.0 mol. % $Nb_2O_5$, greater than or equal to 1.0 mol. % and less than or equal to 40.0 mol. % $TiO_2$, greater than or equal to 1.0 mol. % and less than or equal to 30.0 mol. % CaO, greater than or equal to 1.0 mol. % and less than or equal to 20.0 mol. % $K_2O$, greater than or equal to 0.0 mol. % and less than or equal to 20.0 mol. % BaO, greater than or equal to 0.0 mol. % and less than or equal to 20.0 mol. % $Na_2O$, greater than or equal to 0.0 mol. % and less than or equal to 10.0 mol. % $WO_3$, greater than or equal to 0.0 mol. % and less than or equal to 5.0 mol. % $Li_2O$, greater than or equal to 0.0 mol. % and less than or equal to 4.0 mol. % $Bi_2O_3$ and greater than or equal to 0.0 mol. % and less than or equal to 2.0 mol. % $Ta_2O_5$.

According to a thirty-fifth aspect, the glass of any one of aspects 21-34, wherein the composition of the components comprises: greater than or equal to 21.0 mol. % and less than or equal to 30.0 mol. % $P_2O_5$, greater than or equal to 13.0 mol. % and less than or equal to 38.0 mol. % $Nb_2O_5$, greater than or equal to 9.0 mol. % and less than or equal to 37.0 mol. % $TiO_2$, greater than or equal to 4.0 mol. % and less than or equal to 23.0 mol. % CaO, greater than or equal to 4.0 mol. % and less than or equal to 16.0 mol. % $K_2O$, greater than or equal to 0.0 mol. % and less than or equal to 14.5 mol. % BaO, greater than or equal to 0.0 mol. % and less than or equal to 13.5 mol. % $Na_2O$, greater than or equal to 0.0 mol. % and less than or equal to 8.5 mol. % $WO_3$, greater than or equal to 0.0 mol. % and less than or equal to 4.5 mol. % $Li_2O$, greater than or equal to 0.0 mol. % and less than or equal to 3.4 mol. % $Bi_2O_3$, greater than or equal to 0.0 mol. % and less than or equal to 1.8 mol. % $Ta_2O_5$ and greater than or equal to 0.0 mol. % and less than or equal to 0.9 mol. % $SiO_2$.

According to a thirty-sixth aspect, the glass of any one of aspects 21-35, wherein the composition of the components comprises: greater than or equal to 22.0 mol. % and less than or equal to 29.0 mol. % $P_2O_5$, greater than or equal to 16.0 mol. % and less than or equal to 35.0 mol. % $Nb_2O_5$, greater than or equal to 12.0 mol. % and less than or equal to 34.0 mol. % $TiO_2$, greater than or equal to 5.0 mol. % and less than or equal to 20.5 mol. % CaO, greater than or equal to 5.0 mol. % and less than or equal to 14.5 mol. % $K_2O$, greater than or equal to 0.0 mol. % and less than or equal to 13.0 mol. % BaO, greater than or equal to 0.0 mol. % and less than or equal to 12.0 mol. % $Na_2O$, greater than or equal to 0.0 mol. % and less than or equal to 7.5 mol. % $WO_3$, greater than or equal to 0.0 mol. % and less than or equal to 4.0 mol. % $Li_2O$, greater than or equal to 0.0 mol. % and less than or equal to 3.0 mol. % $Bi_2O_3$, greater than or equal to 0.0 mol. % and less than or equal to 1.6 mol. % $Ta_2O_5$ and greater than or equal to 0.0 mol. % and less than or equal to 0.8 mol. % $SiO_2$.

According to a thirty-seventh aspect, the glass of any one of aspects 21-33, wherein the composition of the components comprises: greater than or equal to 21.7 mol. % and less than or equal to 24.7 mol. % $P_2O_5$, greater than or equal to 21.0 mol. % and less than or equal to 35.0 mol. % $Nb_2O_5$, greater than or equal to 13.0 mol. % and less than or equal to 33.0 mol. % $TiO_2$, greater than or equal to 6.0 mol. % and less than or equal to 17.0 mol. % BaO, greater than or equal to 2.0 mol. % and less than or equal to 13.5 mol. % $K_2O$, greater than or equal to 1.0 mol. % and less than or equal to 14.5 mol. % CaO, greater than or equal to 0.0 mol. % and less than or equal to 10.5 mol. % $Na_2O$, greater than or equal to 0.0 mol. % and less than or equal to 7.5 mol. % SrO, greater than or equal to 0.0 mol. % and less than or equal to 6.0 mol. % $Li_2O$, greater than or equal to 0.0 mol. % and less than or equal to 4.6 mol. % $Bi_2O_3$, greater than or equal to 0.0 mol. % and less than or equal to 4.6 mol. % $WO_3$, greater than or equal to 0.0 mol. % and less than or equal to 4.6 mol. % ZnO and greater than or equal to 0.0 mol. % and less than or equal to 2.5 mol. % MgO.

According to a thirty-eighth aspect, the glass of any one of aspects 21-34 and 37, wherein the composition of the components comprises: greater than or equal to 0.0 mol. % and less than or equal to 4.5 mol. % $Li_2O$.

According to a thirty-ninth aspect, a glass of any one of aspects 21-38, wherein when cooled in air from 1100° C. to 500° C. in 2.5 minutes, the glass does not crystallize.

According to a fortieth aspect, a method for manufacturing an optical element, the method comprising processing a glass of any one of aspects 21-39.

According to a forty-first aspect, an optical element comprising a glass of any one of aspects 21-40.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

The invention claimed is:

1. A glass comprising a plurality of components, the glass having a composition of the components comprising the components in ranges that include:

greater than or equal to 21.0 mol. % and less than or equal to 30.0 mol. % $P_2O_5$, greater than or equal to 0.5 mol. % and less than or equal to 50.0 mol. % $TiO_2$, greater than or equal to 0.5 mol. % and less than or equal to 35.0 mol. % $K_2O$, greater than or equal to 0.5 mol. % and less than or equal to 35.0 mol. % CaO,
greater than or equal to 0.0 mol. % and less than or equal to 50.0 mol. % $Nb_2O_5$,
greater than or equal to 0.0 mol. % and less than or equal to 15.0 mol. % MgO,
greater than or equal to 0.0 mol. % and less than or equal to 10.0 mol. % $Al_2O_3$,
greater than or equal to 0.0 mol. % and less than or equal to 4.5 mol. % $Li_2O$,
greater than or equal to 0.0 mol. % and less than or equal to 13.5 mol. % $Na_2O$,
greater than or equal to 0.0 mol. % and less than or equal to 1.0 mol. % $V_2O_5$,
greater than or equal to 4.0 mol. % RO,
greater than or equal to 0.0 mol. % and less than or equal to 20.0 mol. % for a sum of $TeO_2+SnO_2+SnO$,
greater than or equal to 0.0 mol. % and less than or equal to 15.0 mol. % for a sum of $SiO_2+GeO_2$ and
optionally comprising one or more components selected from $Na_2O$, $WO_3$, BaO, SrO, ZnO, PbO, $Bi_2O_3$, $B_2O_3$, $ZrO_2$, $Tl_2O$, $Ag_2O$, $Cs_2O$, $Ga_2O_3$, $La_2O_3$, $MoO_3$ and $Ta_2O_5$,
wherein none of the ranges are modified by the term "about"; and
wherein the glass satisfies the condition:

$$P_n-(1.54+0.1*P_d)>0.00,$$

where $P_n$ is a refractive index parameter calculated from the glass composition in terms of mol. % of the components according to the Formula (I):

$$P_n=-0.0043794*P_2O_5+0.0072428*Nb_2O_5+\\0.0037304*TiO_2-0.00039553*BaO-\\0.0032012*K_2O-0.00060689*CaO-\\0.0024218*Na_2O-0.0014988*Li_2O+\\0.0028587*WO_3+0.0083295*Bi_2O_3-\\0.0031637*B_2O_3-0.0030702*SiO_2-\\0.00030248*ZnO+0.0020025*ZrO_2-\\0.0018173*MgO-0.0032886*Al_2O_3+\\0.0024221*TeO_2+0.0038137*PbO-\\0.0016392*GeO_2+0.0063024*Tl_2O+\\0.0048765*Ag_2O+1.81451, \quad (I)$$

$P_d$ is a density parameter calculated from the glass composition in terms of mol. % of the components according to the Formula (II):

$$P_d[g/cm^3]=3.98457-0.015773*Al_2O_3-\\0.014501*B_2O_3+0.019328*BaO+\\0.060758*Bi_2O_3-0.0012685*CaO+\\0.023111*CdO+0.0053184*Cs_2O+\\0.011488*Ga_2O_3-0.0015416*GeO_2-\\0.013342*K_2O+0.058319*La_2O_3-\\0.007918*Li_2O-0.0021423*MgO-\\0.0024413*MoO_3-0.0082226*Na_2O+\\0.0084961*Nb_2O_5-0.020501*P_2O_5+\\0.038898*PbO-0.012720*SiO_2+0.013948*SrO+\\0.047924*Ta_2O_5+0.011248*TeO_2-\\0.0092491*V_2O_5+0.028913*WO_3+\\0.0074702*ZnO+0.0096721*ZrO_2, \quad (II)$$

where RO is a total sum of divalent metal oxides, and a symbol "*" means multiplication.

2. The glass of claim 1, wherein the ranges include:
greater than or equal to 10.0 mol. % and less than or equal to 40.0 mol. % $Nb_2O_5$,
greater than or equal to 0.5 mol. % and less than or equal to 40.0 mol. % $TiO_2$,
greater than or equal to 0.5 mol. % and less than or equal to 30.0 mol. % CaO,
greater than or equal to 0.5 mol. % and less than or equal to 20.0 mol. % $K_2O$,
greater than or equal to 0.0 mol. % and less than or equal to 20.0 mol. % BaO,
greater than or equal to 0.0 mol. % and less than or equal to 10.0 mol. % $WO_3$,
greater than or equal to 0.0 mol. % and less than or equal to 4.0 mol. % $Bi_2O_3$ and
greater than or equal to 0.0 mol. % and less than or equal to 2.0 mol. % $Ta_2O_5$.

3. The glass of claim 1, wherein the ranges include:
greater than or equal to 13.0 mol. % and less than or equal to 38.0 mol. % $Nb_2O_5$,
greater than or equal to 9.0 mol. % and less than or equal to 37.0 mol. % $TiO_2$,
greater than or equal to 4.0 mol. % and less than or equal to 23.0 mol. % CaO,
greater than or equal to 4.0 mol. % and less than or equal to 16.0 mol. % $K_2O$,
greater than or equal to 0.0 mol. % and less than or equal to 14.5 mol. % BaO,
greater than or equal to 0.0 mol. % and less than or equal to 8.5 mol. % $WO_3$,
greater than or equal to 0.0 mol. % and less than or equal to 3.4 mol. % $Bi_2O_3$,
greater than or equal to 0.0 mol. % and less than or equal to 1.8 mol. % $Ta_2O_5$ and
greater than or equal to 0.0 mol. % and less than or equal to 0.9 mol. % $SiO_2$.

4. The glass of claim 1, wherein the ranges include:
greater than or equal to 22.0 mol. % and less than or equal to 29.0 mol. % $P_2O_5$,
greater than or equal to 16.0 mol. % and less than or equal to 35.0 mol. % $Nb_2O_5$,
greater than or equal to 12.0 mol. % and less than or equal to 34.0 mol. % $TiO_2$,
greater than or equal to 5.5 mol. % and less than or equal to 20.5 mol. % CaO,
greater than or equal to 5.0 mol. % and less than or equal to 14.5 mol. % $K_2O$,
greater than or equal to 0.0 mol. % and less than or equal to 13.0 mol. % BaO,
greater than or equal to 0.0 mol. % and less than or equal to 12.0 mol. % $Na_2O$,
greater than or equal to 0.0 mol. % and less than or equal to 7.5 mol. % $WO_3$,
greater than or equal to 0.0 mol. % and less than or equal to 4.0 mol. % $Li_2O$,
greater than or equal to 0.0 mol. % and less than or equal to 3.0 mol. % $Bi_2O_3$,
greater than or equal to 0.0 mol. % and less than or equal to 1.6 mol. % $Ta_2O_5$ and
greater than or equal to 0.0 mol. % and less than or equal to 0.8 mol. % $SiO_2$.

5. The glass of claim 1, wherein the glass satisfies the condition:

$$P_n-(1.58+0.1*P_d)>0.00.$$

6. The glass of claim 1, wherein the glass satisfies the condition:

$$P_n>1.8.$$

7. The glass of claim 1, wherein the glass satisfies the condition:

$$P_d<4.2 \text{ g/cm}^3.$$

8. The glass of claim 1, wherein the glass satisfies the condition:

$$P_{ref}>0.24 \text{ cm}^3/\text{g},$$

where
- $P_{ref}$ is a refraction parameter calculated from the glass composition in terms of mol. % of the components according to the Formula (IV):

$$P_{ref}[cm^3/g]=0.223637+0.0010703*Nb_2O_5- \\
0.00041688*P_2O_5+0.00088482*TiO_2+ \\
0.000054956*CaO-0.00029243*K_2O- \\
0.0008347*BaO-0.00023739*Na_2O+ \\
0.000082792*Li_2O-0.0012487*WO_3- \\
0.00042393*ZnO-0.00059152*SrO- \\
0.00018266*MgO-0.0014091*Bi_2O_3- \\
0.0014895*Ta_2O_5-0.00021842*SiO_2- \\
0.00024788*ZrO_2-0.00014801*B_2O_3- \\
0.000060848*TeO_2-0.00085564*PbO- \\
0.00042429*GeO_2-0.0015439*Tl_2O- \\
0.0012936*Ag_2O-0.00089356*Cu_2O- \\
0.00039278*CuO+0.00017895*As_2O_3- \\
0.00011802*Sb_2O_3 \quad (IV).$$

9. The glass of claim 1, wherein when cooled in air from 1100° C. to 500° C. in 2.5 minutes, the glass does not crystallize.

10. A glass comprising a plurality of components, the glass having a composition of the components comprising the components in ranges that include:
- greater than or equal to 21.0 mol. % and less than or equal to 30.0 mol. % $P_2O_5$,
- greater than or equal to 1.0 mol. % and less than or equal to 50.0 mol. % $TiO_2$,
- greater than or equal to 0.0 mol. % and less than or equal to 13.5 mol. % $Na_2O$,
- greater than or equal to 1.0 mol. % and less than or equal to 35.0 mol. % $K_2O$,
- greater than or equal to 1.0 mol. % and less than or equal to 35.0 mol. % CaO,
- greater than or equal to 0.0 mol. % and less than or equal to 50.0 mol. % $Nb_2O_5$,
- greater than or equal to 0.0 mol. % and less than or equal to 15.0 mol. % MgO,
- greater than or equal to 0.0 mol. % and less than or equal to 10.0 mol. % $Al_2O_3$,
- greater than or equal to 0.0 mol. % and less than or equal to 1.0 mol. % $V_2O_5$,
- greater than or equal to 4.0 mol. % RO,
- greater than or equal to 0.0 mol. % and less than or equal to 20.0 mol. % for a sum of $TeO_2+SnO_2+SnO$,
- greater than or equal to 0.0 mol. % and less than or equal to 15.0 mol. % for a sum of $SiO_2+GeO_2$ and
- optionally comprising one or more components selected from $Na_2O$, $Li_2O$, $WO_3$, BaO, SrO, ZnO, PbO, $Bi_2O_3$, $B_2O_3$, $ZrO_2$, $Tl_2O$, $Ag_2O$, $Ga_2O_3$, $MoO_3$ and $Ta_2O_5$,
- wherein none of the ranges are modified by the term "about"; and
- wherein the glass satisfies the conditions:

$$P_n > 1.75 \text{ and}$$

$$P_v - (64.5 - 23.4 * P_n) < 0.00,$$

where
- $P_n$ is a refractive index parameter calculated from the glass composition in terms of mol. % of the components according to the Formula (I):

$$P_n = -0.0043794*P_2O_5+0.0072428*Nb_2O_5+ \\
0.0037304*TiO_2-0.00039553*BaO- \\
0.0032012*K_2O-0.00060689*CaO- \\
0.0024218*Na_2O-0.0014988*Li_2O+ \\
0.0028587*WO_3+0.0083295*Bi_2O_3- \\
0.0031637*B_2O_3-0.0030702*SiO_2- \\
0.00030248*ZnO+0.0020025*ZrO_2- \\
0.0018173*MgO-0.0032886*Al_2O_3+ \\
0.0024221*TeO_2+0.0038137*PbO- \\
0.0016392*GeO_2+0.0063024*Tl_2O+ \\
0.0048765*Ag_2+1.81451, \quad (I)$$

- $P_v$ is a dispersion parameter calculated from the glass composition in terms of mol. % of the components according to the Formula (III):

$$P_v=\exp(2.11+0.0438*(\exp(3.25980+ \\
0.0072248*Al_2O_3+0.0055494*B_2O_3+ \\
0.0024164*BaO-0.00849*Bi_2O_3+ \\
0.0029812*CaO+0.0092768*CdO+ \\
0.0099821*Ga_2O_3-0.0038579*GeO_2+ \\
0.0028062*K_2O+0.0031951*Li_2O+ \\
0.0027011*MgO+0.007976*MoO_3+ \\
0.0028705*Na_2O-0.013374*Nb_2O_5+ \\
0.0072007*P_2O_5-0.0049796*PbO+ \\
0.0032241*SiO_2+0.0050024*SrO- \\
0.002136*Ta_2O_5-0.0032329*TeO_2- \\
0.009788*TiO_2+0.0074782*V_2O_5- \\
0.0057095*WO_3+0.0032826*ZnO+ \\
0.009302*ZrO_2))), \quad (III)$$

where RO is a total sum of divalent metal oxides, and a symbol "*" means multiplication.

11. The glass of claim 10, wherein the ranges include:
- greater than or equal to 10.0 mol. % and less than or equal to 40.0 mol. % $Nb_2O_5$,
- greater than or equal to 1.0 mol. % and less than or equal to 40.0 mol. % $TiO_2$,
- greater than or equal to 1.0 mol. % and less than or equal to 30.0 mol. % CaO,
- greater than or equal to 1.0 mol. % and less than or equal to 20.0 mol. % $K_2O$,
- greater than or equal to 0.0 mol. % and less than or equal to 20.0 mol. % BaO,
- greater than or equal to 0.0 mol. % and less than or equal to 10.0 mol. % $WO_3$,
- greater than or equal to 0.0 mol. % and less than or equal to 5.0 mol. % $Li_2O$,
- greater than or equal to 0.0 mol. % and less than or equal to 4.0 mol. % $Bi_2O_3$ and
- greater than or equal to 0.0 mol. % and less than or equal to 2.0 mol. % $Ta_2O_5$.

12. The glass of claim 10, wherein the ranges include:
- greater than or equal to 13.0 mol. % and less than or equal to 38.0 mol. % $Nb_2O_5$,
- greater than or equal to 9.0 mol. % and less than or equal to 37.0 mol. % $TiO_2$,
- greater than or equal to 4.0 mol. % and less than or equal to 23.0 mol. % CaO,
- greater than or equal to 4.0 mol. % and less than or equal to 16.0 mol. % $K_2O$,
- greater than or equal to 0.0 mol. % and less than or equal to 14.5 mol. % BaO,
- greater than or equal to 0.0 mol. % and less than or equal to 13.5 mol. % $Na_2O$,
- greater than or equal to 0.0 mol. % and less than or equal to 8.5 mol. % $WO_3$,
- greater than or equal to 0.0 mol. % and less than or equal to 4.5 mol. % $Li_2O$,
- greater than or equal to 0.0 mol. % and less than or equal to 3.4 mol. % $Bi_2O_3$,
- greater than or equal to 0.0 mol. % and less than or equal to 1.8 mol. % $Ta_2O_5$ and
- greater than or equal to 0.0 mol. % and less than or equal to 0.9 mol. % $SiO_2$.

13. The glass of claim 10, wherein the ranges include:
- greater than or equal to 0.0 mol. % and less than or equal to 4.5 mol. % $Li_2O$.

14. The glass of claim 10, wherein the glass has a refractive index at 587.56 nm, $n_d$, greater than or equal to 1.75, and
wherein the glass satisfies the condition:

$$v_d - (63.7 - 23.4 * n_d) < 0.00,$$

where
$v_d$ is an Abbe number of the glass.

15. The glass of claim 10, wherein the glass satisfies the condition:

$$v_d - (63.7 - 23.4 * n_d) < 0.00,$$

where
$v_d$ is an Abbe number of the glass, and
$n_d$ is a refractive index of the glass at 587.56 nm.

16. The glass of claim 10, wherein the glass satisfies the condition:

$$P_v - (63.7 - 23.4 * P_n) < 0.00.$$

17. The glass of claim 10, wherein the glass satisfies the condition:

$$P_d < 4.2 \text{ g/cm}^3,$$

where
$P_d$ is a density parameter calculated from the glass composition in terms of mol. % of the components according to the Formula (II):

$$\begin{aligned}P_d[\text{g/cm}^3] = &\, 3.98457 - 0.015773*Al_2O_3 - \\&0.014501*B_2O_3 + 0.019328*BaO + \\&0.060758*Bi_2O_3 - 0.0012685*CaO + \\&0.023111*CdO + 0.0053184*Cs_2O + \\&0.011488*Ga_2O_3 - 0.0015416*GeO_2 - \\&0.013342*K_2O + 0.058319*La_2O_3 - \\&0.007918*Li_2O - 0.0021423*MgO - \\&0.0024413*MoO_3 - 0.0082226*Na_2O + \\&0.0084961*Nb_2O_5 - 0.020501*P_2O_5 + \\&0.038898*PbO - 0.012720*SiO_2 + 0.013948*SrO + \\&0.047924*Ta_2O_5 + 0.011248*TeO_2 - \\&0.0092491*V_2O_5 + 0.028913*WO_3 + \\&0.0074702*ZnO + 0.0096721*ZrO_2\end{aligned} \quad \text{(II)}.$$

18. The glass of claim 10, wherein the glass satisfies the condition:

$$P_n > 1.8.$$

19. The glass of claim 10, wherein the glass satisfies the condition:

$$P_{ref} > 0.24 \text{ cm}^3/\text{g},$$

where
$P_{ref}$ is a refraction parameter calculated from the glass composition in terms of mol. % of the components according to the Formula (IV):

$$\begin{aligned}P_{ref}[\text{cm}^3/\text{g}] = &\, 0.223637 + 0.0010703*Nb_2O_5 - \\&0.00041688*P_2O_5 + 0.00088482*TiO_2 + \\&0.000054956*CaO - 0.00029243*K_2O - \\&0.0008347*BaO - 0.00023739*Na_2O + \\&0.000082792*Li_2O - 0.0012487*WO_3 - \\&0.00042393*ZnO - 0.00059152*SrO - \\&0.00018266*MgO - 0.0014091*Bi_2O_3 - \\&0.0014895*Ta_2O_5 - 0.00021842*SiO_2 - \\&0.00024788*ZrO_2 - 0.00014801*B_2O_3 - \\&0.000060848*TeO_2 - 0.00085564*PbO - \\&0.00042429*GeO_2 - 0.0015439*Tl_2O - \\&0.0012936*Ag_2O - 0.00089356*Cu_2O - \\&0.00039278*CuO + 0.00017895*As_2O_3 - \\&0.00011802*Sb_2O_3\end{aligned} \quad \text{(IV)}.$$

20. The glass of claim 10, wherein when cooled in air from 1100° C. to 500° C. in 2.5 minutes, the glass does not crystallize.

* * * * *

UNITED STATES PATENT AND TRADEMARK OFFICE
CERTIFICATE OF CORRECTION

| | |
|---|---|
| PATENT NO. | : 11,479,499 B2 |
| APPLICATION NO. | : 17/576078 |
| DATED | : October 25, 2022 |
| INVENTOR(S) | : Bruce Gardiner Aitken et al. |

It is certified that error appears in the above-identified patent and that said Letters Patent is hereby corrected as shown below:

On the Title Page

Item (56), in Column 2, under "Other Publications", Line 5, delete "Na2B407" and insert -- $Na_2B_4O_7$ --.

Item (56), in Column 2, under "Other Publications", Line 7, delete "semiconductiong" and insert -- semiconducting --.

In the Claims

In Column 68, Line 3, in Claim 10, delete "$Ag_2$" and insert -- $Ag_2O$ --.

Signed and Sealed this
Twenty-eighth Day of February, 2023

Katherine Kelly Vidal
*Director of the United States Patent and Trademark Office*